(12) United States Patent
Jeffries

(10) Patent No.: US 12,467,092 B2
(45) Date of Patent: Nov. 11, 2025

(54) PERIPHERAL BLOOD DNA METHYLATION MODELS AS PREDICTORS OF KNEE OSTEOARTHRITIS RADIOGRAPHIC PROGRESSION

(71) Applicants: Oklahoma Medical Research Foundation, Oklahoma City, OK (US); The Board of Regents of the University of Oklahoma, Norman, OK (US)

(72) Inventor: Matlock Jeffries, Oklahoma City, OK (US)

(73) Assignees: The Board of Regents of the University of Oklahoma, Norman, OK (US); Oklahoma Medical Research Foundation, Oklahoma City, OK (US)

(*) Notice: Subject to any disclaimer, the term of this patent is extended or adjusted under 35 U.S.C. 154(b) by 346 days.

(21) Appl. No.: 17/517,431

(22) Filed: Nov. 2, 2021

(65) Prior Publication Data

US 2022/0145393 A1     May 12, 2022

Related U.S. Application Data

(60) Provisional application No. 63/112,973, filed on Nov. 12, 2020.

(51) Int. Cl.
*C12Q 1/68* (2018.01)
*C12P 19/34* (2006.01)
*C12Q 1/6883* (2018.01)

(52) U.S. Cl.
CPC ...... *C12Q 1/6883* (2013.01); *C12Q 2600/118* (2013.01); *C12Q 2600/154* (2013.01)

(58) Field of Classification Search
CPC ............ C12Q 1/6883; C12Q 2600/154; C12Q 2600/156; C12Q 2600/118
See application file for complete search history.

(56) References Cited

PUBLICATIONS

Cecilia Lövkvist, et al. "DNA methylation in human epigenomes depends on local topology of CpG sites " Nucleic Acids Research, vol. 44, Issue 11, Jun. 20, 2016, pp. 5123-5132 (Year: 2016).*
Miceli-Richard C, Le Bars M, Schmidely N, et al. "Paracetamol in osteoarthritis of the knee" Annals of the Rheumatic Diseases 2004;63:923-930. (Year: 2004).*
M. Jeffries, et al. "392—A Differential Peripheral Blood DNA Methylation Pattern Predictive of Radiographic OA Progression" Abstracts / Osteoarthritis and Cartilage 24 (2016) p. S230. (Year: 2016).*
Christopher M. Dunn, et al. "A pilot study of peripheral blood DNA methylation models as predictors of knee osteoarthritis radiographic progression: data from the Osteoarthritis Initiative (OAI)" Published: Nov. 14, 2019, Scientific Reports vol. 9, Article No. 16880 (2019) (Year: 2019).*
M. Jeffries, et al. "48—Rapid Knee OA Progression is Associated With Decelerated Peripheral Blood DNA Methylation Aging: Data From the Osteoarthritis Initiative" Abstracts / Osteoarthritis and Cartilage 25 (2017) p. S39 (Year: 2017).*
Louise N. Reynard "Analysis of genetics and DNA methylation in osteoarthritis: What have we learnt about the disease?" Seminars in Cell & Developmental Biology 62 (2017) 57-66 (Year: 2017).*
J. Perren Cobb, et al. "Sepsis gene expression profiling: Murine splenic compared with hepatic responses determined by using complementary DNA microarrays" Crit Care Med 2002 Vol. 30, No. 12, p. 2711-2721 (Year: 2002).*
Vivian G. Cheung, et al. "Natural variation in human gene expression assessed in lymphoblastoid cells" Nature Genetics, vol. 33 , Mar. 2003. (Year: 2003).*
Hoshikawa, Y. et al. "Hypoxia induces different genes in the lungs of rats compared with mice" Physiol Genomics 12: 209-219, 2003. (Year: 2003).*
Jeffries, M., Nevitt, M., Humphrey, M., James, J. and Sawalha, A., 2016. A differential peripheral blood DNA methylation pattern predictive of radiographic OA progression. Osteoarthritis and Cartilage, 24, pp. S230-S231. (Year: 2016).*
Zhang, W., Robertson, W.B., Zhao, J., Chen, W. and Xu, J., 2019. Emerging trend in the pharmacotherapy of osteoarthritis. Frontiers in endocrinology, 10, p. 431. (Year: 2019).*
Illumina 450k manifest, https://support.illumina.com/downloads/infinium_humanmethylation450_product_files.html. (Year: 2008).*
Aref-Eshghi, E., et al. Genome-wide DNA methylation study of hip and knee cartilage reveals embryonic organ and skeletal system morphogenesis as major pathways involved in osteoarthritis. BMC Musculoskelet Disord. 2015;16: 287.
Caramés B, et al., Autophagy is a protective mechanism in normal cartilage, and its aging-related loss is linked with cell death and osteoarthritis. Arthritis & Rheumatism. 2010. pp. 791-801. doi:10. 1002/art.27305.
Centers for Disease Control and Prevention (CDC). Prevalence of doctor-diagnosed arthritis and arthritis-attributable activity limitation—United States, 2010-2012. MMWR Morb Mortal Wkly Rep. Nov. 8, 2013;62: 869-873.

(Continued)

*Primary Examiner* — Stephen T Kapushoc
*Assistant Examiner* — Geneva York
(74) *Attorney, Agent, or Firm* — Edwin S. Flores; Daniel J. Chalker; Chalker Flores, LLP

(57) ABSTRACT

The present invention includes a method for determining whether a subject diagnosed with osteoarthritis is at increased risk for progression to severe osteoarthritis within 12-24 months, the method comprising the steps of: (a) preparing a blood sample; (b) measuring in the blood sample prepared in step (a) a level of DNA methylation; (c) comparing the DNA methylation level(s) measured in step (b) to a control blood sample level(s) of DNA methylation, and (d) identifying the subject as being at increased risk for progression to severe osteoarthritis within 12-24 months when the DNA methylation is increased by at least 2 fold as compared to the control blood level(s) of DNA methylation.

8 Claims, 4 Drawing Sheets

(56) References Cited

PUBLICATIONS

Chen Q, et al., Identification and characterization of microRNAs controlled by the osteoblast-specific transcription factor Osterix. PLoS One. Mar. 5, 2013;8: e58104.

Collins JE, et al. Semi-Quantitative Imaging Biomarkers of Knee Osteoarthritis Progression: Data From the Foundation for the National Institutes of Health Osteoarthritis Biomarkers Consortium. Arthritis Rheumatol. Oct. 2016;68: 2422-2431.

Daghestani HN, et al., Soluble macrophage biomarkers indicate inflammatory phenotypes in patients with knee osteoarthritis. Arthritis Rheumatol. Apr. 2015;67: 956-965.

Davidson E, et al., Elevated extracellular matrix production and degradation upon bone morphogenetic protein-2 (BMP-2) stimulation point toward a role for BMP-2 in cartilage repair and remodeling. Arthritis Research & Therapy. Oct. 8, 2007. p. R102. doi:10.1186/ar2305.

De Andres MC, et al. Assessment of global DNA methylation in peripheral blood cell subpopulations of early rheumatoid arthritis before and after methotrexate. Arthritis Res Ther. 2015;17: 233.

Den Hollander W, Ramos YFM, Bos SD, Bomer N, van der Breggen R, Lakenberg N, et al. Knee and hip articular cartilage have distinct epigenomic landscapes: implications for future cartilage regeneration approaches. Ann Rheum Dis. Sep. 26, 2014;73: 2208-2212.

Dong Y, et al. VEGF promotes cartilage angiogenesis by phospho-ERK1/2 activation of Dll4 signaling in temporomandibular joint osteoarthritis caused by chronic sleep disturbance in Wistar rats. Oncotarget. Jan. 28, 2017;8: 17849.

Du P, Zhang X, Huang C-C, Jafari N, Kibbe WA, Hou L, et al. Comparison of Beta-value and M-value methods for quantifying methylation levels by microarray analysis. BMC Bioinformatics. 2010;11: 587.

Duan, R., et al., The Role of Autophagy in Osteoarthritis, Frontiers in Cell and Developmental Biology, Review, Nov. 25, 2020, vol. 8, Art. 608388, pp. 9.

Eckstein F, et al. Brief Report: Cartilage Thickness Change as an Imaging Biomarker of Knee Osteoarthritis Progression: Data From the Foundation for the National Institutes of Health Osteoarthritis Biomarkers Consortium. Arthritis Rheumatol. Dec. 2015;67: 3184-3189.

Fernandez-Moreno, M., et al., Mitochondrial haplogroups define two phenotypes of osteoarthritis, Frontiers in Physiology, May 11, 2012, vol. 3, Article 129, pp. 1-8.

Fernandez-Moreno, M., et al., Mitochondrial DNA haplogroups influence the risk of incident knee osteoarthritis in OAI and CHECK cohorts. A meta-analysis and functional study, Basic and translational research, 2017, vol. 76, pp. 1114-1122.

Fernandez-Tajes, Juan, Genome-wide DNA methylation analysis of articular chondrocytes reveals a cluster of osteoarthritic patients, Clinical and Epidemiological research, Mar. 16, 2013, Vol., pp. 668-677.

Halilaj E, et al., Modeling and predicting osteoarthritis progression: data from the osteoarthritis initiative. Osteoarthritis Cartilage. Dec. 2018;26(12), pp. 1643-1650.

Hicks JJ, et al. Sustained Release of Bone Morphogenetic Protein 2 via Coacervate improves Muscle Derived Stem Cell Mediated Cartilage Regeneration in MIA-induced Osteoarthritis. Orthopaedic Journal of Sports Medicine. 2016. p. 2325967116S0015. doi:10.1177/2325967116s00152.

Houseman EA, et al. DNA methylation arrays as surrogate measures of cell mixture distribution. BMC Bioinformatics. May 8, 2012;13: 86.

Huang ZY, et al., Biomarkers of inflammation—LBP and TLR—predict progression of knee osteoarthritis in the DOXY clinical trial. Osteoarthritis Cartilage. Dec. 2018. doi:10.1016/j.joca.2018.08.005.

Hunter D, et al. Longitudinal validation of periarticular bone area and 3D shape as biomarkers for knee OA progression? Data from the FNIH OA Biomarkers Consortium. Ann Rheum Dis. 2016;75: 1607-1614.

Hunter DJ, et al., Biomarkers for osteoarthritis: current position and steps towards further validation. Best Pract Res Clin Rheumatol. Feb. 2014;28: 61-71.

Inanir A, et al. IL-4 and MTHFR gene polymorphism in rheumatoid arthritis and their effects. Immunol Lett. May 15, 2013;152: 104-108.

Inanir A, et al., MTHFR gene C677T mutation and ACE gene I/D polymorphism in Turkish patients with osteoarthritis. Dis Markers. 2013;34: 17-22.

Janvier T, et al. Subchondral tibial bone texture analysis predicts knee osteoarthritis progression: data from the Osteoarthritis Initiative: Tibial bone texture & knee OA progression. Osteoarthritis Cartilage. 2017;25: 259-266.

Jeffries MA, et al., Genome-Wide DNA Methylation Study Identifies Significant Epigenomic Changes in Osteoarthritic Subchondral Bone and Similarity to Overlying Cartilage. Arthritis. Jun. 2016, vol. 68(6), pp. 1403-1414.

Jeffries MA, et al., Genome-wide DNA methylation study identifies significant epigenomic changes in osteoarthritic cartilage. Arthritis. Oct. 2014, vol. 66, No. 10, pp. 2804-2815.

Jones SW, et al. The identification of differentially expressed microRNA in osteoarthritic tissue that modulate the production of TNF-alpha and MMP13. Osteoarthritis Cartilage. 2009;17: 464-472.

Joseph GB, et al. Tool for osteoarthritis risk prediction (TOARP) over 8 years using baseline clinical data, X-ray, and MRI: Data from the osteoarthritis initiative. J Magn Reson Imaging. Jun. 2018;47: 1517-1526.

Kaushal A, et al. Comparison of different cell type correction methods for genome-scale epigenetics studies. BMC Bioinformatics. 2017;18: 216.

Kraus VB, et al. Predictive validity of biochemical biomarkers in knee osteoarthritis: data from the FNIH OA Biomarkers Consortium. Ann Rheum Dis. Jan. 2017, 76(1), pp. 186-195.

Kraus VB, et al. Predictive Validity of Radiographic Trabecular Bone Texture in Knee Osteoarthritis: The Osteoarthritis Research Society International/Foundation for the National Institutes of Health Osteoarthritis Biomarkers Consortium. Arthritis Rheumatol. Jan. 2018, vol. 70(1), pp. 80-87.

Kraus VB, et al. Application of biomarkers in the development of drugs intended for the treatment of osteoarthritis. Osteoarthritis Cartilage. May 2011;19: 515-542.

Kraus VB, et al. Direct in vivo evidence of activated macrophages in human osteoarthritis. Osteoarthritis Cartilage. Sep. 2016, vol. 24(9), pp. 1613-1621.

Krstajic D, et al., Cross-validation pitfalls when selecting and assessing regression and classification models. J Cheminform. 2014;6:10, pp. 1-15.

LaValley MP, et al. Development of a clinical prediction algorithm for knee osteoarthritis structural progression in a cohort study: value of adding measurement of subchondral bone density. Arthritis Res Ther. 2017;19: 95.

Li J, et al. Identification and Analysis of Blood Gene Expression Signature for Osteoarthritis With Advanced Feature Selection Methods. Front Genet. Aug. 30, 2018;9: 246, 8 pp.

Lin, Q., et al., DNA methylation levels at individual age-associated CpG sites can be indicative for life expectancy, Aging, Feb. 2016, vol. 8, No. 2, pp. 394-401.

Lodewyckx L, et al., Tight regulation of wingless-type signaling in the articular cartilage—subchondral bone biomechanical unit: transcriptomics in Frzb-knockout mice. Arthritis Res Ther. 2012;14: R16.

McGregor K, et al. An evaluation of methods correcting for cell type heterogeneity in DNA methylation studies, 2016, vol. 17:84, 17 pp.

Minogue BM, et al., Transcriptional profiling of bovine intervertebral disc cells: implications for identification of normal and degenerate human intervertebral disc cell phenotypes. Arthritis Res Ther. 2010;12: R22.

Nakatochi M, et al. Epigenome-wide association of myocardial infarction with DNA methylation sites at loci related to cardiovascular disease. Clin Epigenetics. 2017;9: 54.

(56) References Cited

PUBLICATIONS

Ornetti P, et al. OARSI-OMERACT definition of relevant radiological progression in hip/knee osteoarthritis. Osteoarthritis Cartilage. 2009;17: 856-863.

Park S, et al., Suppression of ABCD2 dysregulates lipid metabolism via dysregulation of miR-141:ACSL4 in human osteoarthritis. Cell Biochemistry and Function. 2018. pp. 366-376. doi:10.1002/cbf.3356.

Parker HS, et al., Removing batch effects for prediction problems with frozen surrogate variable analysis. PeerJ. 2014;2: e561.

Ramos YFM, et al. Genes expressed in blood link osteoarthritis with apoptotic pathways. Ann Rheum Dis. 2014;73: 1844-1853.

Reynard LN. Analysis of genetics and DNA methylation in osteoarthritis: What have we learnt about the disease? Semin Cell Dev Biol. 2016. doi:10.1016/j.semcdb.2016.04.017.

Richardson D, et al. Characterisation of the cannabinoid receptor system in synovial tissue and fluid in patients with osteoarthritis and rheumatoid arthritis. Arthritis Res Ther. 2008;10: R43, pp. 1-14.

Ruhdorfer A., et al. Between-group differences in infra-patellar fat pad size and signal in symptomatic and radiographic progression of knee osteoarthritis vs non-progressive controls and healthy knees—data from the FNIH Biomarkers Consortium Study and the Osteoarthritis Initiative. Osteoarthritis Cartilage. Jul. 2017;25: 1114-1121.

Rushton MD, et al. Characterization of the cartilage DNA methylome in knee and hip osteoarthritis. Arthritis Rheumatol. Sep. 2014;66: 2450-2460.

Singh JA, et al. 2015 American College of Rheumatology Guideline for the Treatment of Rheumatoid Arthritis. Arthritis Rheumatol. 2016;68: 1-26.

Soto-Hermida A, et al. Mitochondrial DNA (mtDNA) haplogroups influence the progression of knee osteoarthritis. Data from the Osteoarthritis Initiative (OAI). PLoS One. 2014;9: e112735.

Titus AJ, et al., Cell-type deconvolution from DNA methylation: a review of recent applications. Hum Mol Genet. 2017;26: R216-R224.

Toperoff G, et al. Genome-wide survey reveals predisposing diabetes type 2-related DNA methylation variations in human peripheral blood. Hum Mol Genet. 2012;21: 371-383.

Tornero-Esteban P, et al. Altered Expression of Wnt Signaling Pathway Components in Osteogenesis of Mesenchymal Stem Cells in Osteoarthritis Patients. PLoS One. 2015;10: e0137170.

Vos T, et al. Years lived with disability (YLDs) for 1160 sequelae of 289 diseases and injuries 1990-2010: a systematic analysis for the Global Burden of Disease Study 2010. Lancet. 2012;380: 2163-2196.

Wang C, et al., Distinct metabolic programs induced by TGF-β1 and BMP2 in human articular chondrocytes with osteoarthritis. J Orthop Translat. Jan. 2018;12: 66-73.

Wang L, et al. Puerarin Attenuates Osteoarthritis via Upregulating AMP-Activated Protein Kinase/Proliferator-Activated Receptor-γ Coactivator-1 Signaling Pathway in Osteoarthritis Rats. Pharmacology. 2018. pp. 117-125.

Wirth W, et al. Direct comparison of fixed flexion, radiography and MRI in knee osteoarthritis: responsiveness data from the Osteoarthritis Initiative. Osteoarthritis Cartilage. 2013;21: 117-125.

Wirth W, et al. Predictive and concurrent validity of cartilage thickness change as a marker of knee osteoarthritis progression: data from the Osteoarthritis Initiative. Osteoarthritis Cartilage. 2017;25: 2063-2071.

Yamashita R, et al. Genome-wide analysis reveals strong correlation between CpG islands with nearby transcription start sites of genes and their tissue specificity. Gene. 2005. pp. 129-136. doi:10.1016/j.gene.2005.01.012.

Yang Q, et al., MicroRNA-143-5p targeting eEF2 gene mediates intervertebral disc degeneration through the AMPK signaling pathway. Arthritis Res Ther. 2019;21: 97.

Zhang H, et al., Downregulation of microRNA-9 increases matrix metalloproteinase-13 expression levels and facilitates osteoarthritis onset. Mol Med Rep. 2018;17: 3708-3714.

Zhang L, et al. Inhibition of Synovial Macrophage Pyroptosis Alleviates Synovitis and Fibrosis in Knee Osteoarthritis. Mediators Inflamm. 2019;2019: 2165918.

Zhang Y, et al. Identification of DNA methylation changes associated with disease progression in subchondral bone with site-matched cartilage in knee osteoarthritis. Sci Rep. 2016;6: 34460.

Zhang Y, et al. A program of microRNAs controls osteogenic lineage progression by targeting transcription factor Runx2. Proc Natl Acad Sci U S A. 2011;108: 9863-9868.

Zhang Y, et al. Cartilage-specific deletion of mTOR upregulates autophagy and protects mice from osteoarthritis. Ann Rheum Dis. 2015;74: 1432-1440.

Zhao M, et al. IFI44L promoter methylation as a blood biomarker for systemic lupus erythematosus. Ann Rheum Dis. 2016;75: 1998-2006.

Zhou S, et al. AMPK deficiency in chondrocytes accelerated the progression of instability-induced and ageing-associated osteoarthritis in adult mice. Sci Rep. 2017;7: 43245.

Jordan, J., et al., "Prevalence of Knee Symptoms and Radiographic and Symptomatic Knee Osteoarthritis in African Americans and Caucasians: The Johnston County Osteoarthritis Project," The Journal of Rheumatology, 2007, vol. 34:1, pp. 172-180.

Murphy, L.B., et al., "Annual Incidence of Knee Symptoms and Four Knee Osteoarthritis Outcomes in the Johnston County Osteoarthritis Project," Arthritis Care Res (Hoboken), Jan. 16, 2016, vol. 68(1), pp. 55-65.

Dunn, et al., "A pilot study of peripheral blood DNA methylation models as predictors of knee osteoarthritis radiographic progression: data from the Osteoarthritis Initiative (OAI)," Nature Scientific Reports, 2019, 9:16880, 11 pp.

\* cited by examiner

PERIPHERAL BLOOD DNA METHYLATION MODELS AS PREDICTORS OF KNEE OSTEOARTHRITIS RADIOGRAPHIC PROGRESSION

CROSS-REFERENCE TO RELATED APPLICATIONS

This application claims priority based on U.S. Provisional Application No. 63/112,973, filed Nov. 12, 2021. The contents of which is incorporated by reference in its entirety.

STATEMENT OF FEDERALLY FUNDED RESEARCH

This invention was made with government support under K08AR070891, P30AR053483, and R01AR076440 awarded by the National Institutes of Health. The government has certain rights in the invention.

TECHNICAL FIELD OF THE INVENTION

The present invention relates in general to the field of peripheral blood DNA methylation, and more particularly, a novel method of predicting knee osteoarthritis radiographic progression from peripheral blood DNA methylation.

BACKGROUND OF THE INVENTION

Without limiting the scope of the invention, its background is described in connection with Knee osteoarthritis (OA).

Osteoarthritis (OA) is the leading cause of chronic disability in the United States, and is the third most rapidly rising chronic medical condition associated with disability worldwide [1,2]. Despite its importance and economic impact, there are no disease-modifying antiosteoarthritic drugs (DMOADs) approved by the US Food and Drug Administration (FDA) or European Medicines Agency, in stark contrast to the multitude of biologic and nonbiologic disease-modifying treatments available in other forms of arthritis [3]. This lag in the development of DMOADs is due in no small part to a lack of easily accessible radiographic and/or biochemical biomarkers to diagnose OA and discriminate patient phenotypes, including prediction of future progressors.

Accordingly, much attention has recently been focused on the development of diagnostic and prognostic biomarkers for OA. Several groups have described biomarker candidates for OA diagnosis, discriminating OA patients from healthy controls based on peripheral blood analytes. In 2014, Ramos et al. described an mRNA-based peripheral blood signature which could discriminate OA patients from matched controls [4], with a c-statistic of 0.97. In 2018, Li et al. published a reanalysis of these data using a different machine learning technique that performed at an equally high sensitivity and specificity on a reduced subset genes [5]. In 2018, Huang and colleagues used data and biospecimens from the DOXY (doxycycline for treatment of OA) clinical trial to examine four plasma biomarkers [6] and found baseline levels of lipopolysaccharide binding protein (LBP) were associated with future radiographic progression (TIC over 18 months OR=1.418).

A more difficult but perhaps more clinically relevant biomarker task, however, is the classification of OA patients into distinct phenotypes. The largest study yet to take on the task of OA phenotype discrimination was an analysis of serum and urine biochemical biomarkers performed by the Foundation for the National Institutes of Health (FNIH) OA Biomarkers Consortium (OABC-FNIH), using data and biospecimens from the longitudinal, US-based Osteoarthritis Initiative (OAI) study [7,8]. In this study, the authors produced a model combining three serum and urine biomarkers that could discriminate radiographic and pain progressors from nonprogressors with a receiver operator characteristic area under the curve (AUC-ROC, c-statistic) of 0.631[9]. Baseline values of these parameters did not offer substantial predictive capability; rather, models utilized a time-integrated concentration (TIC) approach tracking analyte measurements over a period of years.

A drawback of traditional biochemical biomarkers such as those used in the OABC-FNIH is their inherent variability. Epigenetic assays offer theoretical advantages as biomarkers. Most notably, an epigenetics-based assay has the potential to offer prognostic information based on a single time point reflecting early, relatively stable gene regulatory changes that precede gene transcription and subsequent protein translation. Early epigenetic changes in peripheral blood have been found to be useful biomarkers in several rheumatic diseases including rheumatoid arthritis [10] and systemic lupus erythematosus [11], as well as several chronic low-level inflammatory diseases, including type-2 diabetes mellitus risk [12] and cardiovascular disease [13]. Several recent studies, including our own, have demonstrated alterations in joint tissue epigenetic patterns associated with OA development and progression [14-18]; however, no analyses of blood epigenetic changes have yet been published.

Despite these advances, what is needed is a rapid, inexpensive, and widely available method and system to identify OA disease progression from easily accessible biological samples.

SUMMARY OF THE INVENTION

In one embodiment, the present invention includes a method for determining whether a subject diagnosed with osteoarthritis is at increased risk for progression to severe osteoarthritis within 12-24 months, the method comprising the steps of: (a) preparing a blood sample; (b) measuring in the blood sample prepared in step (a) a level of DNA methylation, e.g., by differentiation of bisulfite-generated polymorphisms; (c) comparing the DNA methylation level (s) measured in step (b) to a control blood sample level(s) of DNA methylation in a subject without osteoarthritis, and (d) identifying the subject as being at increased risk for progression to severe osteoarthritis within 12-24 months when the DNA methylation is increased by at least 2 fold as compared to the control blood level(s) of DNA methylation. In one aspect, the blood sample comprises peripheral blood mononuclear cells or cell-free DNA. In another aspect, the control blood level of the DNA methylation in a similarly processed blood sample from a control subject or a mean level of several control subjects. In another aspect, the control subject (i) is matched to the tested subject by at least one of: age category, sex, BMI category, ethnicity, or baseline KL radiographic grade; and (ii) does not have osteoarthritis as determined by both radiographic and symptomatic examination. In another aspect, the control blood level of the DNA methylation is a predetermined standard. In another aspect, the DNA methylation is determined with a 450k, or 850k array, or CpG sites associates with at least one of: an antigen presentation pathway, adenosine monophosphate kinase (AMPK) signaling pathway, or a sonic hedgehog signaling pathway, or one or more top upstream regulators identified by IPA selected from transcription factor PITX2, histone H3, histone H4, miR-141, miR-9, miR-137, bone morphogenic protein 2, a TGF-β superfamily member, or 1, 2, 3, 4, 5, 6, 7, 8, 9, 10, 11, 12, or 13 markers selected from cg04195161, cg22064129, cg04985016, cg12692919, cg04043957, cg08872579, cg02019955, cg01333532, cg23705082, cg05042110, cg00715363, cg01307007 and cg09239099. In another aspect, the subject is human. In another aspect, the osteoarthritis is a knee osteoarthritis. In another aspect, the subject has a Kellgren-Lawrence (KL) score of 1-3 in at least one knee. In another aspect, the method further comprises the step of treating the osteoarthritis wherein the treatment is at least one of acetaminophen, steroids, hyaluronic acid, nonsteroidal anti-inflammatory drugs (NSAIDs), or Duloxetine.

In another embodiment, the present invention includes a method for treating osteoarthritis in a subject, wherein the subject has been diagnosed with osteoarthritis but does not have severe osteoarthritis, the method comprising the steps of: (a) measuring in a blood plasma sample obtained from the subject the plasma level of DNA methylation, e.g., by differentiation of bisulfite-generated polymorphisms; and (b) if the plasma level DNA methylation is increased by at least 2 fold as compared to a control plasma level(s) of the DNA methylation in a subject without osteoarthritis, administering an osteoarthritis treatment to the subject. In one aspect, the subject has been diagnosed with knee osteoarthritis and has a Kellgren-Lawrence (KL) score of 1-3 in at least one knee. In another aspect, the subject is human. In another aspect, the blood plasma sample obtained from the subject has been prepared in the presence of heparin. In another aspect, the DNA methylation is determined with a 450k, or 850k array, or CpG sites associates with at least one of: an antigen presentation pathway, adenosine monophosphate kinase (AMPK) signaling pathway, or a sonic hedgehog signaling pathway, or one or more top upstream regulators identified by IPA selected from transcription factor PITX2, histone H3, histone H4, miR-141, miR-9, miR-137, bone morphogenic protein 2, a TGF-β superfamily member, or 1, 2, 3, 4, 5, 6, 7, 8, 9, 10, 11, 12, or 13 markers selected from cg04195161, cg22064129, cg04985016, cg12692919, cg04043957, cg08872579, cg02019955, cg01333532, cg23705082, cg05042110, cg00715363, cg01307007 and cg09239099. In another aspect, the control blood level of the DNA methylation is a level of DNA methylation in a similarly processed blood sample from a control subject or a mean level of several control subjects. In another aspect, the control subject (i) is matched to the tested subject by at least one of: age category, sex, BMI category, ethnicity, or baseline KL radiographic grade; and (ii) does not have osteoarthritis as determined by both radiographic and symptomatic examination. In another aspect, the control plasma level of the DNA methylation is a predetermined standard. In another aspect, the osteoarthritis treatment is at least one of acetaminophen, steroids, hyaluronic acid, nonsteroidal anti-inflammatory drugs (NSAIDs), or Duloxetine.

In another embodiment, the present invention includes a method for treating osteoarthritis in a subject, the method comprising administering an osteoarthritis treatment to a subject with elevated plasma levels of DNA methylation, wherein the subject does not have severe osteoarthritis. In one aspect, the subject has been diagnosed with knee osteoarthritis and has a Kellgren-Lawrence (KL) score of 1-3 in at least one knee. In another aspect, the subject is human. In another aspect, the osteoarthritis treatment is at least one of acetaminophen, steroids, hyaluronic acid, nonsteroidal anti-inflammatory drugs (NSAIDs), or Duloxetine.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Figure 1:
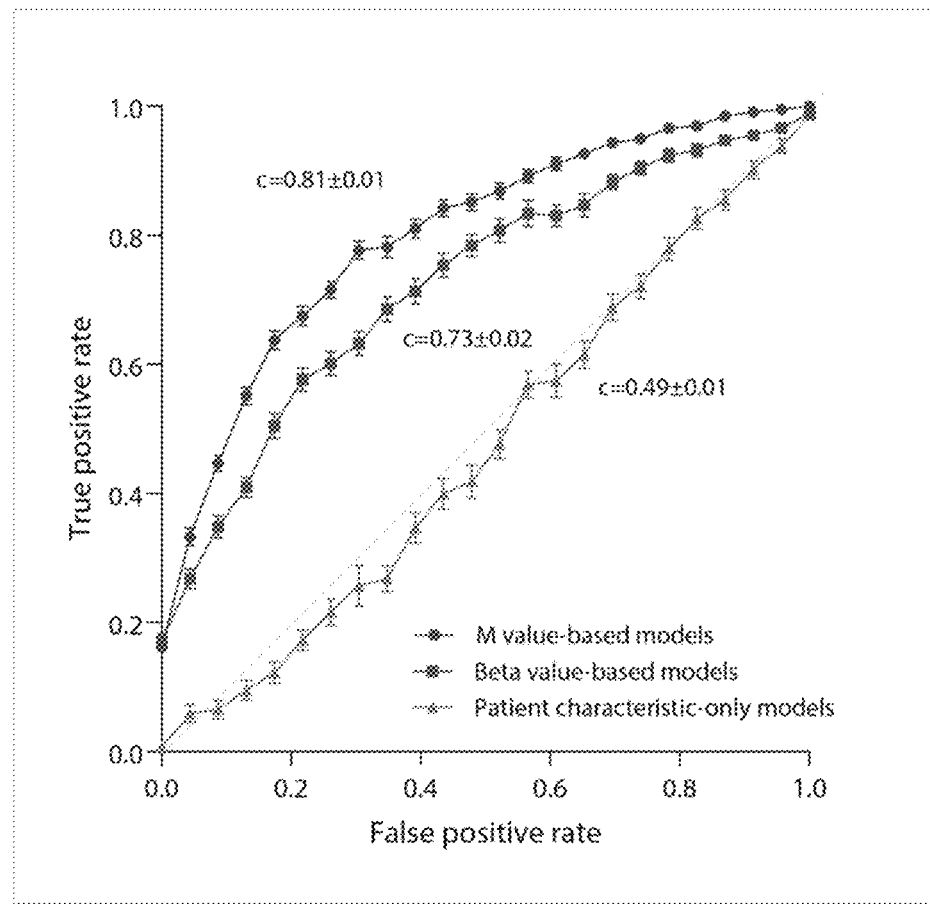
FIG. 1 is a graph that shows the mean receiver operator characteristic (ROC) curves for patient characteristic-only models, DNA methylation-based models using Beta values, and DNA methylation-based models using M values models when tested on previously untested samples. Curves represent mean values over 40 cycles of development, error bars represent SEM. ROC-AUC (c-statistic) values are given as mean±SEM.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The present invention uses peripheral blood mononuclear cell (PBMC)-based epigenetic models to predict future knee OA radiographic progression in a well-matched cohort of patients from the Osteoarthritis Initiative (OAI), using similar definitions to those previously published in OABC-FNIH studies[9].

Baseline patient demographic, disease, and PBMC composition characteristics were well matched. Models developed using only patient characteristics were not predictive of future progression.

The inventors first identified a group of 58 OA radiographic progressors with baseline Kellergren-Lawrence (K/L) radiographic grade 2-3, symptomatic knee OA who exhibited ≥0.7 mm of joint space width (JSW) loss over the first 24 months of follow-up and persistent JSW loss at 48 months from the longitudinal, US-based Osteoarthritis Initiative (OAI) study. The inventors then matched 58 nonprogressors with ≤0.5 mm of joint space width loss over 48 months of follow-up by age category, sex, BMI category, ethnicity, and baseline KL radiographic grade (Table 1). Although not included in the initial matching criteria, there were no statistical differences in baseline JSW, NSAID use, or smoking history between the two groups. The inventors did note a statistically significant increase in baseline Western Ontario and McMaster (WOMAC) pain subscale among progressors (21.5±2 mean±SEM vs. 17.0±1.5 points on a 0-100 point normalized scale, P=0.05).

TABLE 1

Patient group characteristics

|  | Radiographic progressors (cases) (n = 58), mean ± SEM | Nonprogressors (controls) (n = 58), mean ± SEM | 2-tailed P value |
|---|---|---|---|
| Baseline characteristics | | | |
| Age | 60 ± 1 | 60 ± 1 | 0.90 |
| Sex (% female) | 53.4% | 60.3% | 0.13 |
| BMI | 30.5 ± 0.5 | 30.9 ± 0.6 | 0.61 |
| Ethnicity (% Caucasian) | 88% | 88% | 1.00 |
| Smoking (% positive) | 46% | 43% | 0.71 |
| NSAID use (% positive) | 29% | 17% | 0.13 |
| Mean WOMAC pain (0-100 point normalized scale) | 21.5 ± 2 | 17.0 ± 1.5 | 0.05 |
| Mean JSW (mm) | 3.9 ± 0.1 | 4.0 ± 0.1 | 0.34 |
| Baseline K/L grade 2 | 25 | 35 | 0.09 |
| Baseline K/L grade 3 | 33 | 23 | |
| Baseline estimated PBMC composition | | | |
| CD8+ T cells | 8.5 ± 0.7% | 8.6 ± 0.6% | 0.9 |
| CD4+ T cells | 21 ± 0.9% | 21 ± 1% | 0.9 |
| NK cells | 7.4 ± 0.5% | 7.6 ± 0.6% | 0.9 |
| B cells | 9.6 ± 0.5% | 9.8 ± 0.5% | 0.8 |
| Monocytes | 7.4 ± 0.3% | 6.7 ± 0.3% | 0.12 |
| Granulocytes | 51 ± 1% | 51 ± 1% | 0.9 |
| Baseline comorbidities | | | |
| Type 2 diabetes | 4 (patients/58) | 6 (# patients/58) | 0.74 |
| History of heart attack | 0 | 0 | n/a |
| History of heart failure | 2 | 3 | 1.0 |
| History of stroke | 2 | 4 | 0.68 |
| History of lung disease | 0 | 0 | n/a |
| History of cancer | 1 | 4 | 0.36 |

Recent studies have reported that clinical characteristics alone can be used to model future GA progression[19]. To ensure that these models were not being affected by patient characteristics, the inventors first developed models using baseline patient characteristics data alone, without including DNA methylation data. These models included age, sex, BMI, baseline JSW, baseline WOMAC pain, smoking history, and NSAID use. Baseline models were not able to discriminate the two groups (receiver operator characteristic area under the curve ROC-AUC, c-statistic=0.49±0.01 mean±SEM, accuracy=50±0.7%) (FIG. 1). Although infrequent, the inventors then added data regarding comorbidities to these baseline models, including history of heart attack, heart failure, diabetes, lung disease, and cancer (Table 1). This did not improve the discriminatory capability of baseline patient characteristic models (p=0.28 for comparison with models not including comorbidity data).

DNA methylation data from mixed PBMC samples can be skewed by underlying differences in cellular composition among groups[20]. As the OAI dataset does not include data on individual blood sample cellular composition, the inventors estimated this using a computational approach[21]. There were no statistically significant differences in estimated PBMC composition between the two groups; however, the inventors did note a trend towards increased monocyte counts in cases (progressors 7.4±0.3% mean±SEM vs. nonprogressors 6.7±0.3%, P=0.12) (Table 1). Accordingly, the inventors corrected the dataset for PBMC composition differences using frozen surrogate variable analysis (FSVA), a technique previously demonstrated to be robust in correcting cellular composition differences in genome-wide DNA methylation data[22,23], before developing these epigenetic models.

Figure 2:
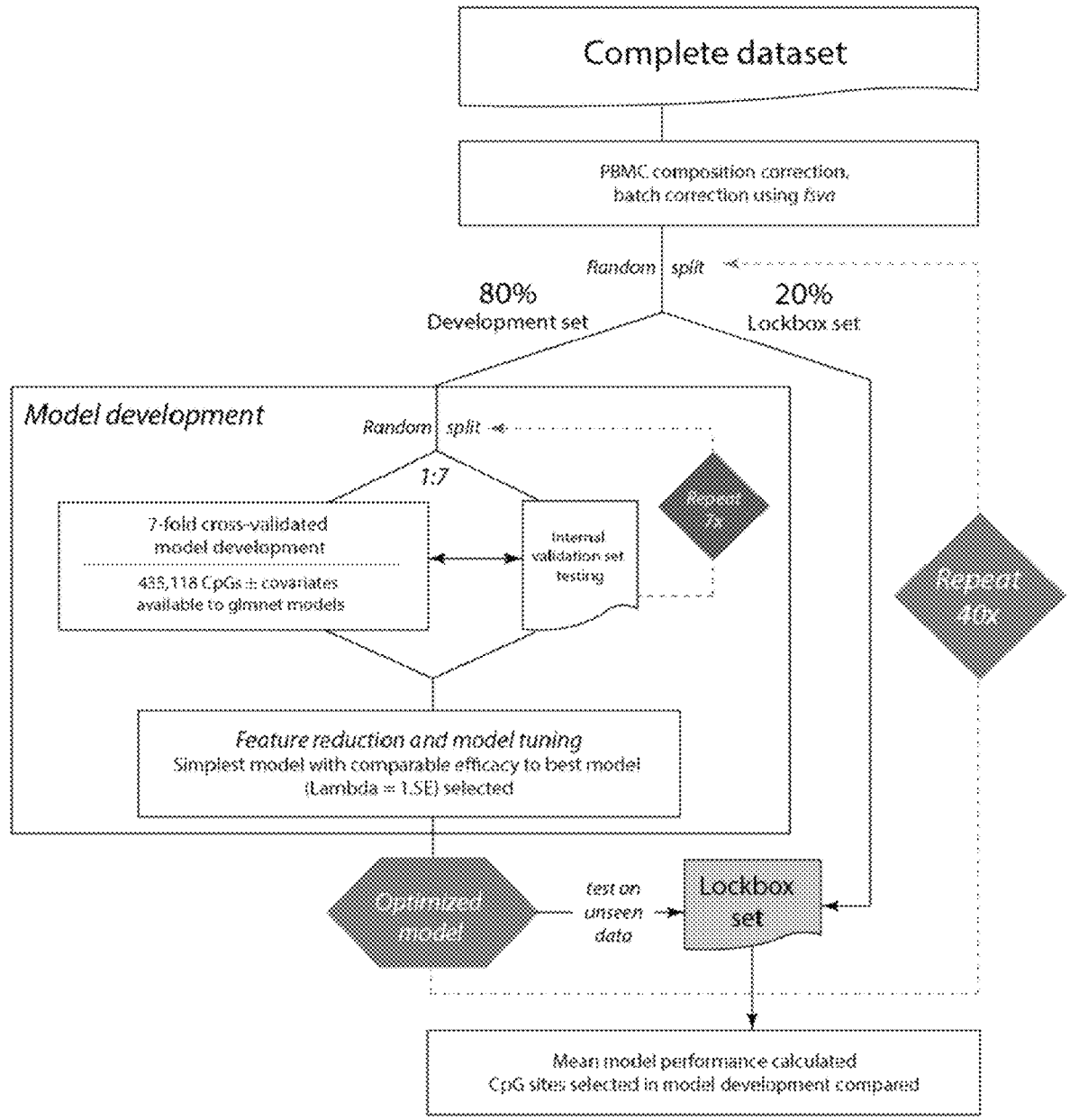
FIG. 2 is a flowchart that shows the Osteoarthritis (OA) rapid progressor PBMC DNA methylation-based machine learning discriminant model development plan.
Figure 3:
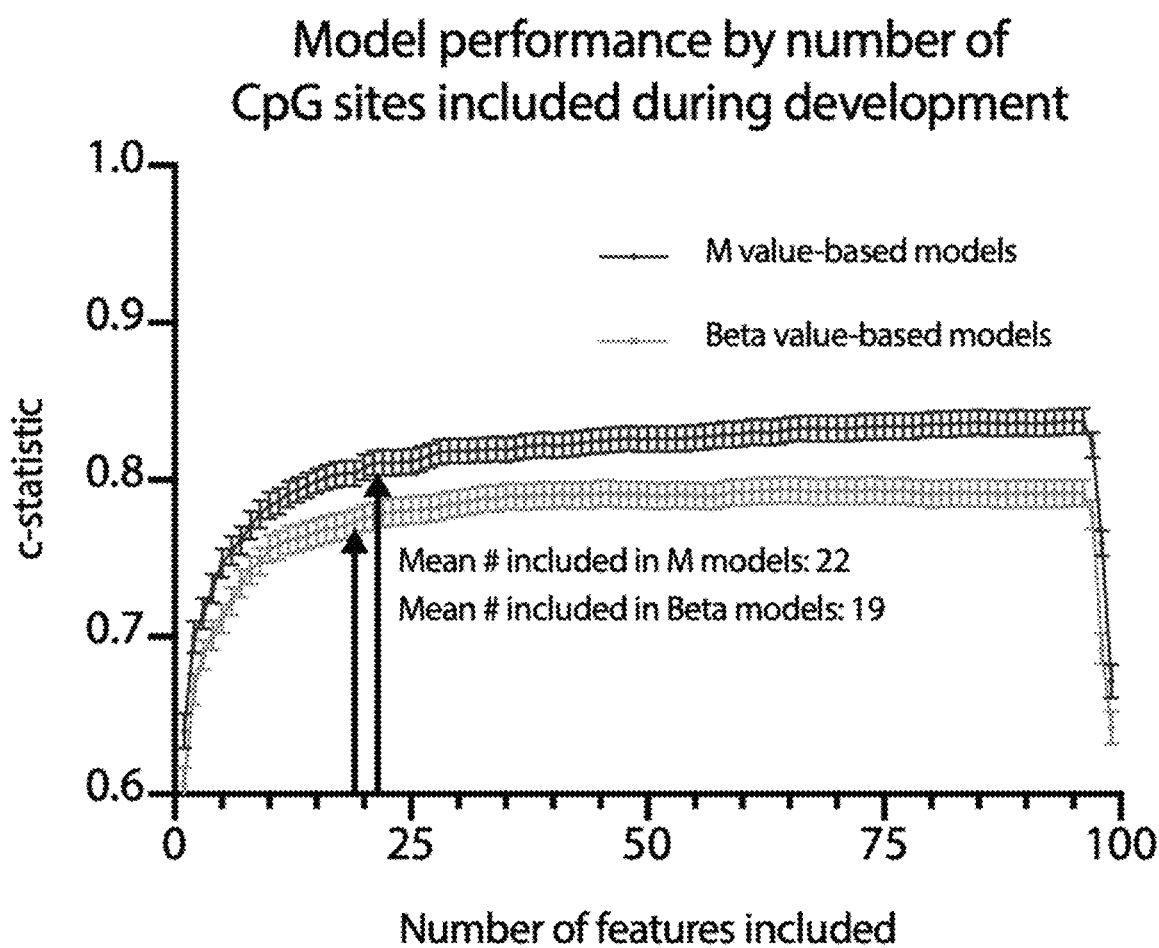
FIG. 3 is a graph that shows a model performance by number of CpG sites included during development, including the mean number of CpGs selected for inclusion during model development and optimization was 22±2 (mean±SEM) for M-based and 19±2 for beta value-based assays.

Models developed based on PBMC DNA methylation data are predictive of radiographic progression. Traditionally, epigenome-wide association studies have reported DNA methylation data as beta values, defined as the fraction methylation (0-1 scale) of each CpG site included in the array. However, beta values are characterized by high heteroscedasticity (most beta values fall within extreme high- and low-percent methylation levels). Therefore, the inventors also analyzed M values (the log base-2 ratio of methylated:unmethylated probe intensities for a given CpG site), which are approximately homoscedastic, in these models [24]. In this analysis, models based on PBMC DNA methylation data were consistently capable of discriminating those patients who would go on to experience radiographic progression from nonprogressors (FIG. 1, FIG. 2, Table 2). Models based on M values outperformed those based on beta values (M value models c=0.81±0.01, mean±SEM, vs. beta value models 0.75±0.01, comparison p=0.002), with corresponding accuracies of 73±1%, mean±SEM, for M and 69±1% for beta based models. The mean number of CpGs selected for inclusion during model development and optimization was 22±2 (mean±SEM) for M-based and 19±2 for beta value-based assays (FIG. 3), this was not statistically significantly different between the two DNA methylation measures (p=0.32).

The inventors then added patient characteristic covariate data to model development, including age, sex, BMI, baseline JSW, baseline WOMAC pain, smoking history, and NSAID use. Including these data did not alter model performance (M value models c=0.80±0.01, beta value models c=0.78±0.01, both nonsignificant compared to models without covariates). Finally, as this analysis included data from two methylation assay types, the inventors then analyzed model performance for 450k and 850k chips separately; both types demonstrated equivalent performance in these models (p=0.27).

TABLE 2

Performance of PBMC DNA methylation models to predict future radiographic progression in OA patients when evaluating previously unseen data.

|  | M-value based models (mean ± SEM) | Beta value-based models (mean ± SEM) |
|---|---|---|
| ROC-AUC (c-statistic) | 0.81 ± 0.01 | 0.75 ± 0.01 |
| Accuracy | 73 ± 1% | 69 ± 1% |
| Odds ratio | 11 ± 2 | 9 ± 2 |
| Sensitivity | 74 ± 1% | 73 ± 2% |
| Specificity | 70 ± 1% | 70 ± 1% |

A subset of DNA methylation CpG sites were selected frequently in multiple rounds of model development and were enriched in functional pathways previously associated with OA development. Although 969 CpGs were selected in at least one round of model development in either M or Beta based models, a subset of CpG sites were selected several times (Table 3, complete list of CpGs selected in Table 4). Many of these most frequently selected CpGs in both M value-based and Beta value-based model development were shared; for example, 7 of the top 20 most frequently selected CpGs in both M- and Beta-models were identical. The majority of the top 20 CpGs selected during modeling were associated with CpG islands (13 of 20 M- and 16 of 20 Beta-based models), including all but one of the CpG sites shared among the two methylation measures, suggesting these sites may play a role in gene regulation.

TABLE 3

Top 20 CpGs selected for supervised model development. CpGs shared by both Beta-value-based and M-value-based models are highlighted in bold (n = 7).

| M value-based algorithm feature | # of development rounds selected (out of 40) | Associated gene | CpG location (regulatory region) | Location within CpG island | Beta value-based algorithm feature | # of development rounds selected (out of 40) | Associated gene | CpG location (regulatory region) | Location within CpG island |
|---|---|---|---|---|---|---|---|---|---|
| cg15974085 | 15 | C18orf55; FBXO15 | TSS200 | Island | cg11865413 | 15 | | | N_Shelf |
| cg26384229 | 14 | ALG10B | TSS200 | Island | cg21643086 | 15 | | | |
| cg21643086 | 12 | | | | cg17745251 | 11 | C10orf140 | Body | Island |
| cg03687650 | 11 | OSBPL5 | Body | S_Shelf | cg06409741 | 11 | RASA3 | Body | Island |
| cg06409741 | 11 | RASA3 | Body | Island | cg03870777 | 10 | KRT18 | TSS200 | N_Shore |
| cg18111500 | 10 | | | | cg17956079 | 10 | PLEKHB1 | TSS200 | |
| cg07772660 | 9 | MST1P9 | Body | Island | cg26384229 | 9 | ALG10B | TSS200 | Island |
| cg11865413 | 9 | | | N_Shelf | cg03687650 | 7 | OSBPL5 | Body | S_Shelf |
| cg03212634 | 9 | | | | cg10306485 | 7 | RASA5 | Body | S_Shelf |
| cg00142933 | 8 | LIMS2 | Body | N_Shore | cg19559392 | 7 | MORN2; DHX57 | 5'UTR; TSS1500 | S_Shore |
| cg16001460 | 8 | PRIM2 | TSS1500 | | cg05587853 | 7 | MSL2 | TSS1500 | Island |
| cg17745251 | 7 | C10orf140 | Body | Island | cg14616423 | 7 | | | |
| cg14330460 | 7 | | | | cg08728848 | 6 | | | |
| cg03870777 | 6 | KRT18 | TSS200 | N_Shore | cg07379140 | 5 | ALG14 | TSS200 | Island |
| cg02215141 | 6 | | gl | N_Shore | cg02962630 | 5 | DLL4 | Body | Island |
| cg20200361 | 6 | THADA | Body | | cg16790849 | 5 | NEU1 | Body | N_Shore |
| cg07258847 | 6 | | | | cg00143249 | 5 | MNX1 | Body | Island |
| cg23226134 | 5 | CLCN6; MTHFR | 1st Exon | Island | cg10609068 | 4 | ANO6 PLEKHA9 | TSS1500; 5'UTR | N_Shore |
| cg16121685 | 5 | UHMK1 | TSS200 | Island | cg14710040 | 4 | EEF2 | TSS200 | Island |
| cg10966582 | 5 | MST1P9 | Body | Island | cg17310773 | 4 | SLC25A17 | 1stExon | Island |

Although a differential methylation analysis was not performed in the traditional sense, it was reasoned that CpG sites chosen for inclusion in these models might still clustered in functional pathways important in OA. To investigate this, the inventors performed gene ontology analysis using the Ingenuity Pathway Analysis (IPA) system of genes associated with CpG sites chosen in at least one round of model development. The most significantly enriched canonical pathways enriched in this gene set included the antigen presentation pathway (n=6 genes, p=7E-4), adenosine monophosphate kinase (AMPK) signaling (n=15, p=1E-3, and sonic hedgehog signaling (n=4 genes, p=9E-3), among others (Table 4). The top upstream regulators identified by IPA include the transcription factor PITX2 (n=14 genes, p=1E-5), histone H3 (n=29 genes, p=7E-5) and H4 (n=14, p=9.6E-5), miR-141 (n=9, p=1.9E-4), miR-9 (n=5, p=3.4E-4), miR-137 (n=2, p=8.2E-4), and bone morphogenic protein 2 (BMP2, n=15, p=9.0E-4), a TGF-β superfamily member, among others (Table 4).

TABLE 4

Ontology analysis of genes associated with rapid OA progressor DNA methylation models.

| Canonical pathway | p-value | Genes associated |
|---|---|---|
| Antigen presentation | 7.08E-04 | CIITA, HLA-DPA1, HLA-DPB1, PSMB8, PSMB9, TAP2 |
| AMPK signaling | 1.05E-03 | AK8, CFTR, CHRM2, CHRNA2, CHRNA9, EEF2, FOXG1, INS, PDPK1, PPM1E, PRKACB, RAB7A, RPTOR, SMARCA4, SMARCD3 |
| Sonic hedgehog signaling | 9.33E-03 | GLIS1, GLIS2, PRKACB, SUFU |

TABLE 4-continued

Ontology analysis of genes associated with rapid OA progressor DNA methylation models.

| | | |
|---|---|---|
| Synaptogenesis Signaling Pathway | 1.58E-02 | AP2A2, CACNB4, CDH22, CDH23, CDH4, EIF4EBP3, EPHA8, EPHB3, FGR, GRIN2B, PRKACB, SHC2, STX1B, SYN2, SYT15, SYT5 |
| Aryl Hydrocarbon Receptor Signaling | 1.95E-02 | ALDH1A3, ARNT, CDK6, CDKN2A, NCOA2, NR2F1, RXRG, SMARCA4, TP73 |
| Endocannabinoid Neuronal Synapse Pathway | 2.75E-02 | CACNB4, CACNG3, CACNG8, CNR2, GNG7, GRIN2B, PRKACB, PTGS2 |
| Autophagy | 2.82E-02 | ATG7, CTSO, LAMP1, SQSTM1, WIPI1 |

TABLE 4-continued

Ontology analysis of genes associated with rapid OA progressor DNA methylation models.

| Upstream regulator | Molecule type | p-value | Number of associated genes |
|---|---|---|---|
| PITX2 | transcription regulator | 1.34E−05 | 14 |
| Bvht | long noncoding RNA | 5.48E−05 | 10 |
| histone H3 | group | 6.93E−05 | 29 |
| histone H4 | group | 9.63E−05 | 14 |
| miR-141 | microRNA | 1.91E−04 | 9 |
| ASCL1 | transcription regulator | 3.09E−04 | 10 |
| miR-9 | microRNA | 3.37E−04 | 5 |
| LHX6 | transcription regulator | 4.42E−04 | 5 |
| miR-137 | microRNA | 8.23E−04 | 2 |
| BMP2 | growth factor | 8.96E−04 | 15 |

Biomarkers hold great potential for improving clinical outcomes in common chronic diseases including OA. The early identification of OA patients who are likely to progress radiographically, clinically, or both, will allow for the enrichment of clinical trials of disease-modifying antiosteoarthritic drugs (DMOADs) with appropriate patients. Biomarkers of progression may also allow clinicians to stratify early OA patients, offering personalized care by taking into account an individual's likelihood to respond to a particular therapy. In this pilot study, the inventors sought to test whether baseline peripheral blood mononuclear cell DNA methylation data could be used to develop models to discriminate those patients who would go on to experience radiographic progression from nonprogressors. While based on a relatively small number of patients from a single cohort, these results nonetheless suggest that peripheral blood-based epigenetic models may be useful for OA subtype discrimination and should be evaluated in future larger studies of heterogeneous OA patients from additional cohorts.

Several groups have previously investigated biomarkers predictive of future OA progression. The largest biochemical study in this regard was the OAI biomarker studies including the osteoarthritis biomarker consortium of the Foundation for the National Institutes of Health (OABC-FNIH) which investigated a targeted set of biochemical biomarkers as predictors of OA pain and radiographic progression. Their analysis identified a combination of three biochemical biomarkers for discrimination of pain and radiographic progression from nonprogressors with a c-statistic of 0.631[9], although they used a time-integrated concentration (TIC) approach, requiring multiple biomarker measurements over time as input into their prognostic model. This same study also evaluated the predictive capability of baseline biomarkers alone, but these not demonstrate robust differentiation of progressors (c=0.586)[9].

Radiographic biomarkers predicting future disease progression have also been evaluated. In 2016, Collins et al. reported models based on changes in MRI semi-quantitative markers over 24 months to predict the likelihood of radiographic progression at 48 months as part of the OABC-FNIH study[26]; the best model achieved a c-statistic of 0.74. Like the OABC-FNIH biochemical biomarker study, this study leveraged changes in imaging parameters over time to predict future progression. Trabecular bone texture (TBT) is perhaps the best-studied single imaging biomarker for prediction of future OA progression. Kraus et al evaluated this in FNIH patients, with a best composite model using baseline TBT to predict future radiographic progression with a c-statistic of 0.624[27]. This is somewhat lower than previous reports using TBT, Janvier and colleagues, for example, reported a c-statistic of AUC 0.77 in 2017[28].

There have also been recent reports using machine learning to model future progression based on combinations of baseline imaging and demographic data. Joseph and colleagues in 2018 published the results of three such models, with a maximum c-statistic of 0.72 to predict progression to moderate-severe OA over 8 years including demographic data, risk factors, K/L score, cartilage WORMS score, meniscal tear, and cartilage MRI T2 imaging data[29] from the OAI cohort. Also in 2018, Halilaj and colleagues published the results of a mixed-effects mixture model within the OAI cohort to predict joint space narrowing in 1243 subjects. They described an impressive c-statistic of 0.86 for prediction of future progression using a combination of baseline and year 1 follow-up variables, using a 10-cycle, 90% development/10% lockbox validation data splitting approach with 10-fold internal cross-validation, not unlike the methodology of the present invention. Models based solely on baseline data, however, did not predict future radiographic progression (c≤0.6)[30].

Several recent studies have also identified mitochondrial haplotypes as biomarkers which can discriminate OA phenotypes. For example, in 2012 Fernandez-Moreno et al. identified significant increases in cartilage-specific biomarkers of OA in patients carrying mitochondrial haplogroup H associated with the onset of OA [31]. Similarly, this group later identified a decrease in incident OA risk in patients with mitochondrial haplogroup J compared to haplogroup H (HR 0.7, p<0.05) in both the OAI and CHECK cohorts [32], as well as slowing of the rates of radiographic progression rate among OA patients with haplogroup T compared to other haplogroups within the OAI cohort [33]. Future studies should investigate potential complementarity between mitochondrial haplogroups and DNA methylation as predictive OA biomarkers.

Much work has been done over the past several years linking epigenetic changes, particularly DNA methylation, with OA. The present inventors and others have noted differential DNA methylation in inflammatory cell pathways in both cartilage and subchondral bone from OA patients [14-17,34,35]. A subgroup of end-stage OA patients' cartilage demonstrates a fingerprint of epigenetic changes within inflammatory genes[18,36]. Given chondrocyte and subchondral bone DNA methylation aberrancy in both knee and hip OA, along with the known contributions of chronic inflammation and inflammatory gene epigenetic changes to OA, the DNA methylation patterns within PBMCs associated with OA progression the inventors describe in this report are intuitively consistent with previously published data.

The PBMC DNA methylation-based approach taught herein has several advantages over previously published biomarkers. Most notably, this approach offers predictive capability based on a single baseline blood draw. Further, this model demonstrated higher c-statistic values than previously described biochemical biomarkers. A traditional DNA methylation analysis of progressors and nonprogressors was performed and did not identify significantly differentially methylated positions (DMPs) with a false data rate-corrected p-value≤0.05. This is not particularly surprising given the mixed PBMC population. This approach utilized the combined effects of multiple CpG sites when developing DNA methylation-based predictive models.

Gene ontology analysis revealed several canonical gene pathways and upstream regulators. Unfortunately, there have not been previous epigenetic analyses of peripheral blood cells in OA in humans or mice to compare these data to. However, many pathways and regulators previously described in articular tissues overlap with these findings. For example, AMP kinase (AMPK) deficiency in chondrocytes accelerates both age- and trauma-associated OA in mice[44], whereas a pharmacological stimulator of AMPK attenuates post-traumatic OA in rats[45]. The endocannabinoid system within synovial tissue has been associated with OA pain [46]. Autophagy has been widely associated with OA. Age-related loss of autophagy has been linked with OA severity in human [47] and murine [48] joint tissue. Furthermore, cartilage-specific deletion of mammalian target of rapamycin (mTOR) increases autophagy signaling and protects against post-traumatic OA induction in mice [49]. Among the upstream regulators identified in this ontology analysis was PITX2, a component of the Wnt signaling pathway key to mesenchymal stem cell function which is altered in OA patients [50]. MicroRNA-141 is dysregulated in human OA and contributes to pathogenesis by augmentation of lipid metabolism [51], and is important in maintaining the appropriate expression of key osteoblast differentiation proteins including Runx2, Sclerostin, ALP, and Dlx5[52]. MicroRNA-9 has been shown to directly augment the expression of the key catabolic enzyme matrix metalloproteinase-13 (MMP13) in OA patients [53] and animal models[54]. MicroRNA-137 regulates chondrocyte metabolism via targeting Runx2[55]. Finally, bone morphogenic protein-2 (BMP2) upregulation has been linked to OA development and increased matrix turnover [56]. It is a key regulator of chondrocyte metabolism [57] and has been suggested as a novel OA therapeutic[58].

A major concern with machine learning is generally the problem of overfitting. The inventors reduced this possibility through extensive cross-validation and report the accuracy of models when tested on data unseen during model development. The inventors included in the analysis data from both ILLUMINA® 450k and 850k chips. All data from 850k chips were subset to only those sites included on the 450k array and were batch corrected. The inventors saw no evidence for differences in predictive capability with the two chip types (see above). The inventors did see differences comparing M value-based to beta value-based models; however, this is not unsurprising given previous reports of variations in statistical measures of these values [24] owing to differences in scedasticity. There is an emerging literature in the OA field which has demonstrated the importance of activated macrophages in disease development and progression [63-65]. It is important to highlight that the gene ontology analyses performed herein were based on CpG sites selected following PBMC cell composition correction. Thus, the present invention can be used to perform predictive and/or prognostic biomarker analysis, which can include DNA from mixed PBMCs and/or whole blood.

These results demonstrate for the first time the use of peripheral blood epigenetic patterns as predictive models for knee OA radiographic progression. The use of linear modeling applied to a large genome-wide DNA methylation dataset from well-matched case and control cohorts offer the first glimpse into the potential of future OA epigenetic classification. The present invention offers significant advantages over traditional biochemical biomarkers, including requiring a single baseline blood sample. Thus, the present invention provides an easily accessible predictive biomarkers to personalize and improve the care of adults with knee OA.

Study Design. This nested case-control study (116 total patients, 58 progressors, 58 nonprogressors) used data and biospecimens from the Osteoarthritis Initiative (OAI) database, which is available for public access at https://data-archive.nimh.nih.gov/oai/. All Osteoarthritis Initiative (OAI) participants provided written informed consent, and the study was carried out in accordance with the OAI data user agreement, approved by the Committee on Human Research of the Institutional Review Board (IRB) for the University of California, San Francisco (UCSF).

The IRBs of the University of Oklahoma Health Sciences Center and Oklahoma Medical Research Foundation also reviewed and approved the project. Detailed case and control criteria are presented herein below. Participants had baseline and yearly follow-up knee radiographs and PBMC DNA available. Kellgren-Lawrence Grade (KLG) and quantitative joint space width (JSW) [59] were assessed by the central reading site using non-fluoroscopic fixed-flexion knee radiographs with a Synaflexer positioning device (Synaflexor, Synarc, Newark, CA). All participants had baseline KLG of 2-3 in at least one knee without a history of total knee joint replacement through 48-months. Participants with a tibial plateau rim distance of 6.5 mm at baseline, or with a change in the rim distance of >2.0 mm between baseline and follow-up were excluded due to unreliable radiographic positioning.

Definition of radiographic progression, case and control group characteristics. The definition of radiographic progression was similar to the case definitions of the OABC-FNIH[9]. Cases had radiographic progression in the medial tibiofemoral compartment by a longitudinal loss in the minimum JSW of at least 0.7 mm from baseline to 24-month follow-up in one index knee, with persistent narrowing in the same index knee at 48 months based on radiographs obtained from a non-fluoroscopic fixed flexion protocol (Synaflexor, Synarc, Newark, CA). In each case, the contralateral (non-index) knee had less progression than the index knee, or no progression over the follow-up period. Participants with a tibial plateau rim distance of 6.5 mm at baseline, or with a change in the rim distance of >2.0 mm between baseline and follow-up were excluded due to inappropriate and/or unreliable radiographic positioning. Nonprogressors were defined as those with ≤0.5 mm of JSW loss from baseline to 48 months in either knee. These thresholds were set to coincide with previous OAI biomarker studies [9,60,62,66], as defined in the Foundation for the National Institutes of Health biomarker consortium project (OABC-FNIH) and were set based on the distribution of 1-month change in minimum JSW in normal knees of OAI control participants and estimated to have ≤10% probability of change due to measurement error[8,67].

Controls were frequency matched with cases by age category, sex, race, and BMI category as shown in Table 1 and were also frequency matched with the larger OAI cohort to broaden the applicability of these findings. Group differences were calculated using a Student t-test and statistically analyzed using a 2-tailed P value. There were no differences among the two groups in any demographic category with the exception of mean baseline Western Ontario and McMaster (WOMAC) pain subscale (Table 1), although it should be noted that there was a trend towards fewer females included among cases (53% vs. 60%, p=0.13), more NSAID use at baseline among cases (29% vs. 17%, p=0.13), and an increased mean baseline K/L grade among cases (2.2 vs. 2.0, p=0.09), although no difference in mean baseline JSW was noted in cases (3.9 vs. 4.0, p=0.34). The inventors also evaluated the presence of various comorbid conditions among data collected by the OAI, including history of heart attack, failure, stroke, pulmonary disease, diabetes, and cancer (Table 1). The inventors adjusted these models for these variables as part of the analysis (see below).

DNA methylation assays, PBMC composition assessment and adjustment. Five hundred nanograms of DNA was treated with sodium bisulfite (EZ DNA methylation kit, [Zymo]] ZYMO®) and loaded onto ILLUMINA® Infinium HumanMethylation450k (n=62 samples: 30 cases, 32 controls) or 850k (n=54 samples: 28 cases, 26 controls) arrays. As no direct measures of PBMC cell type composition were available from the OAI, these data were estimated using the estimate Cell Counts function of minfi. No statistically significant differences in estimated PBMC cell composition were found between groups (Table 1, Table 5), although there was a trend towards increased monocytes among cases (7.4±0.3% vs. 6.7±0.3%, cases vs. controls mean±SEM, p=0.12). DNA methylation data were corrected for cell count variation using frozen surrogate variable analysis [22] via the sva package (v. 3.28.0). This method has been previously shown to robustly correct for cell count variation and other batch effects in large-scale epigenomic studies [22,23,68].

TABLE 5

| TargetID | Beta counts | M counts | GENOME BUILD | CHR | MAPINFO | UCSC_REFGENE_NAME | UCSC_REFGENE_ACCESSION | UCSC_REFGENE_GROUP | UCSC_CPG_ISLANDS_NAME | RELATION TO UCSC CPG ISLAND |
|---|---|---|---|---|---|---|---|---|---|---|
| cg00002464 | | 1 | 37 | 8 | 120428418 | NOV | NM_002514 | TSS200 | chr8: 120428398-120429178 | Island |
| cg00027745 | | 2 | 37 | 7 | 1452678 | | | | chr7: 1452417-1452794 | Island |
| cg00089154 | | | 37 | 16 | 57352732 | | | | | |
| cg00105102 | 2 | | 37 | 1 | 156217178 | PAQR6; PAQR6 | NM_024897; NM_198406 | 5UTR; 5UTR | chr1: 156215368-156215899 | S_Shore |
| cg00105102 | | 2 | 37 | 1 | 156217178 | PAQR6; PAQR6 | NM_024897; NM_198406 | 5UTR; 5UTR | chr1: 156215368-156215899 | S_Shore |
| cg00107890 | 1 | | 37 | 15 | 71492746 | THSD4 | NM_024817 | Body | | |
| cg00125544 | 1 | | 37 | 2 | 236865931 | AGAP1; AGAP1 | NM_014914; NM_001037131 | Body; Body | chr2: 236867652-236867906 | N_Shore |
| cg00142933 | 1 | | 37 | 2 | 128420784 | LIMS2; LIMS2; LIMS2; LIMS2 | NM_001136037; NM_017980; NM_001161403; NM_001161404 | Body; Body; Body; 5UTR | chr2: 128421719-128422182 | N_Shore |
| cg00142933 | | 8 | 37 | 2 | 128420784 | LIMS2; LIMS2; LIMS2; LIMS2 | NM_001136037; NM_017980; NM_001161403; NM_001161404 | Body; Body; Body; 5UTR | chr2: 128421719-128422182 | N_Shore |
| cg00143249 | 5 | | 37 | 7 | 156798810 | MNX1; MNX1 | NM_001165255; NM_005515 | Body; Body | chr7: 156795355-156799394 | Island |
| cg00143249 | | 1 | 37 | 7 | 156798810 | MNX1; MNX1 | NM_001165255; NM_005515 | Body; Body | chr7: 156795355-156799394 | Island |
| cg00152637 | 1 | | 37 | 6 | 28104690 | | | | chr6: 28104781-28105240 | N_Shore |
| cg00180559 | 1 | | 37 | 1 | 233496768 | KIAA1804 | NM_032435 | Body | chr1: 233497707-233497917 | N_Shore |
| cg00192026 | 1 | | 37 | 4 | 174411279 | | | | | |
| cg00278028 | 3 | | 37 | 22 | 28196834 | MN1; MN1 | NM_002430; NM_002430 | 5UTR; 1stExon | chr22: 28192793-28198592 | Island |
| cg00290605 | 1 | | 37 | 22 | 32366707 | | | | chr22: 32366492-32367061 | Island |
| cg00308618 | | 1 | 37 | 2 | 152831903 | CACNB4; CACNB4; CACNB4; CACNB4 | NM_000726; NM_001145798; NM_001005747; NM_001005746 | Body; Body; TSS1500; Body | | |
| cg00335286 | 2 | | 37 | 18 | 13916355 | MC2R | NM_000529 | TSS1500 | | |
| cg00336071 | 1 | | 37 | 15 | 63449943 | RPS27L | NM_015920 | TSS1500 | chr15: 63449418-63449874 | S_Shore |
| cg00355514 | 1 | | 37 | 13 | 24914782 | | | | chr13: 24914548-24915100 | Island |
| cg00386663 | | 1 | 37 | 16 | 692659 | FAM195A | NM_138418 | Body | chr16: 691597-692700 | Island |
| cg00388154 | 1 | | 37 | 15 | 68498857 | CALML4; CALML4 | NM_001031733; NM_033429 | TSS1500; TSS1500 | | |
| cg00401433 | | | 37 | 8 | 106674239 | ZFPM2 | NM_012082 | Body | | |
| cg00409636 | 1 | | 37 | 2 | 75720541 | FAM176A; FAM176A | NM_001135032; NM_032181 | Body; Body | | |
| cg00466544 | 1 | | 37 | 14 | 57046243 | C14orf101 | NM_017799 | TSS1500 | chr14: 57046472-57046804 | N_Shore |
| cg00491335 | 1 | | 37 | 2 | 224705654 | | | | chr2: 224701962-224702790 | S_Shelf |
| cg00496805 | 1 | | 37 | 19 | 57901154 | ZNF548 | NM_152909 | TSS200 | chr19: 57901091-57901517 | Island |
| cg00497251 | 1 | | 37 | 2 | 241508725 | RNPEPL1 | NM_018226 | 5UTR | chr2: 241507463-241507669 | S_Shore |
| cg00510552 | 2 | | 37 | 16 | 4511987 | NMRAL1 | NM_020677 | Body | | |
| cg00551143 | 1 | | 37 | 7 | 28998860 | TRIL | NM_014817 | TSS1500 | chr7: 28995305-28998541 | S_Shore |
| cg00562641 | | | 37 | 5 | 68789255 | OCLN | NM_002538 | 5UTR | chr5: 68788151-68789823 | Island |
| cg00572243 | 1 | | 37 | 8 | 28458806 | | | | | |
| cg00587472 | 1 | | 37 | 2 | 6952860 | | | | | |
| cg00607154 | 1 | | 37 | 5 | 6754116 | POLS | NM_006999 | Body | chr5: 6755104-6755387 | N_Shore |
| cg00618507 | 1 | | 37 | 7 | 102096322 | ORAI2; ORAI2 | NM_032831; NM_001126340 | 3UTR; 3UTR | chr7: 102097927-102098384 | N_Shore |
| cg00704844 | 1 | | 37 | 6 | 32821621 | PSMB9; TAP1; PSMB9; TAP1 | NM_002800; NM_000593; NM_148954; NM_000593 | TSS1500; 5UTR; TSS1500; 1stExon | chr6: 32820849-32822370 | Island |
| cg00704844 | | 1 | 37 | 6 | 32821621 | PSMB9; TAP1; PSMB9; TAP1 | NM_002800; NM_000593; NM_148954; NM_000593 | TSS1500; 5UTR; TSS1500; 1stExon | chr6: 32820849-32822370 | Island |
| cg00708678 | 1 | | 37 | 10 | 91294839 | SLC16A12 | NM_213606 | 5UTR | chr10: 91294947-91295925 | N_Shore |
| cg00712762 | 2 | | 37 | 1 | 36351470 | EIF2C1 | NM_012199 | Body | chr1: 36348501-36349731 | S_Shelf |
| cg00796164 | 1 | | 37 | 19 | 57654968 | ZIM3 | NM_052882 | 5UTR | | |
| cg00819788 | 1 | | 37 | 17 | 7308579 | C17orf61 | NM_152766 | TSS1500 | chr17: 7307206-7308626 | Island |
| cg00859178 | 1 | | 37 | 1 | 162467208 | UHMK1 | NM_175866 | TSS1500 | chr1: 162467599-162468027 | N_Shore |

TABLE 5-continued

| TargetID | Beta counts | M counts | GENOME BUILD | CHR | MAPINFO | UCSC_REFGENE_NAME | UCSC_REFGENE_ACCESSION | UCSC_REFGENE_GROUP | UCSC_CPG_ISLANDS_NAME | RELATION_TO_UCSC_CPG_ISLAND |
|---|---|---|---|---|---|---|---|---|---|---|
| cg00878038 | | 1 | 37 | 7 | 151107807 | WDR86 | NM_198285 | TSS1500 | chr7: 151106244-151107808 | Island |
| cg00886571 | 1 | | 37 | 14 | 105293199 | | | | chr14: 105293183-105293395 | Island |
| cg00891611 | | 1 | 37 | 1 | 108066602 | | | | | |
| cg00943060 | | 1 | 37 | 7 | 65211784 | | | | chr7: 65215732-65216495 | N_Shelf |
| cg00989986 | | 1 | 37 | 8 | 49746558 | | | | chr8: 49747395-49747621 | N_Shore |
| cg01022859 | | 1 | 37 | 17 | 60767314 | MRC2 | NM_006039 | Body | | |
| cg01029669 | 1 | | 37 | 19 | 46999840 | PNMAL2 | NM_020709 | TSS1500 | chr19: 46996327-46998437 | S_Shore |
| cg01062913 | | | 37 | 1 | 149169973 | | | | | |
| cg01090026 | | 1 | 37 | 6 | 39692382 | KIF6 | NM_145027 | Body | chr6: 39692743-39692966 | N_Shore |
| cg01110552 | 2 | 2 | 37 | 10 | 103578627 | MGEA5; MGEA5 | NM_001142434; NM_012215 | TSS1500; TSS1500 | chr10: 103577394-103578256 | S_Shore |
| cg01120851 | | | 37 | 1 | 6657644 | KLHL21 | NM_014851 | Body | chr1: 6659125-6659505 | N_Shore |
| cg01125463 | 1 | | 37 | 6 | 42946178 | PEX6 | NM_000287 | 1stExon | chr6: 42946310-42947127 | N_Shore |
| cg01138671 | 1 | | 37 | 6 | 32130686 | PPT2; PPT2 | NM_005155; NM_138717 | Body; Body | chr6: 32134460-32135196 | N_Shelf |
| cg01144965 | 1 | | 37 | 8 | 1811760 | ARHGEF10 | NM_014629 | Body | | |
| cg01166564 | | 1 | 37 | 2 | 26987492 | C2orf18 | NM_017877 | Body | chr2: 26987030-26987500 | Island |
| cg01198033 | 1 | | 37 | 7 | 155302342 | CNPY1 | NM_001103176 | 5UTR | chr7: 155302253-155303158 | Island |
| cg01232267 | 1 | | 37 | 3 | 47398209 | | | | chr3: 47397811-47398210 | Island |
| cg01263999 | 1 | | 37 | 13 | 108435129 | FAM155A | NM_001080396 | Body | | |
| cg01309395 | 1 | | 37 | 6 | 33091795 | HLA-DPB2 | NR_001435 | Body | | |
| cg01316857 | | 2 | 37 | 19 | 48685724 | | | | chr19: 48685723-48686085 | Island |
| cg01333080 | 1 | | 37 | 3 | 183994568 | ECE2; ECE2; ECE2; ECE2 | NM_001100120; NM_001037324; NM_014693; NM_001100121 | Body; Body; Body; Body | chr3: 183993905-183994347 | S_Shore |
| cg01338043 | | 1 | 37 | 7 | 100136013 | AGFG2 | NM_006076 | TSS1500 | chr7: 100136448-100136919 | N_Shore |
| cg01392841 | 1 | | 37 | 19 | 47016869 | | | | chr19: 47016848-47017118 | Island |
| cg01427750 | | 1 | 37 | 12 | 131529339 | GPR133 | NM_198827 | Body | chr12: 131529297-131529887 | Island |
| cg01514015 | 1 | | 37 | 1 | 236318427 | GPR137B | NM_003272 | Body | | |
| cg01515114 | | | 37 | 4 | 4139730 | | | | | |
| cg01543583 | 1 | | 37 | 14 | 59947673 | C14orf149 | NM_144581 | Body | chr14: 59950460-59951527 | Island |
| cg01548562 | 1 | | 37 | 9 | 71836408 | TJP2; TJP2; TJP2; TJP2 | NM_001170414; NM_001170630; NM_001170415; NM_201629; NM_004817; NM_001170416 | Body; Body; Body; Body | chr9: 71835913-71836409 | N_Shelf |
| cg01565438 | 2 | | 37 | 17 | 33776554 | SLFN13 | NM_144682 | TSS1500 | chr17: 33776553-33776888 | Island |
| cg01591416 | | | 37 | 8 | 30601572 | UBXN8 | NM_005671 | TSS200 | | |
| cg01620570 | 1 | | 37 | 17 | 15165908 | PMP22; PMP22 | NM_153321; NM_000304 | TSS200; 5UTR | chr17: 15165796-15166506 | Island |
| cg01709473 | 1 | | 37 | 6 | 12010960 | | | | chr6: 120125431-12013379 | N_Shore |
| cg01709473 | 1 | | 37 | 6 | 12010960 | | | | chr6: 120125431-12013379 | N_Shore |
| cg01721429 | | 1 | 37 | 16 | 47007486 | DNAJA2; DNAJA2 | NM_005880; NM_005880 | 5UTR; 1stExon | chr16: 47006827-47008029 | Island |
| cg01771479 | 1 | | 37 | 8 | 144198810 | | | | | |
| cg01867419 | | | 37 | 6 | 30421515 | | | | chr6: 30418844-30419630 | S_Shore |
| cg01872216 | 1 | | 37 | 14 | 54430382 | | | | chr14: 54430154-54430670 | Island |
| cg01900413 | 1 | | 37 | 11 | 128419356 | ETS1 | NM_001143820 | Body | chr11: 128419198-128419513 | Island |
| cg01962086 | 1 | | 37 | 3 | 195637027 | TNK2 | NM_005781 | TSS1500 | chr3: 195635359-195636895 | S_Shore |
| cg02055540 | | | 37 | 5 | 165510804 | | | | | |
| cg02071447 | 1 | | 37 | 5 | 151304542 | GLRA1; GLRA1 | NM_000171; NM_001146040 | TSS200; TSS1500 | chr5: 151304226-151304824 | Island |
| cg02148547 | | 1 | 37 | 14 | 21457502 | METT11D1; METT11D1 | NM_001029991; NM_022734 | TSS1500; TSS1500 | chr14: 21458389-21458608 | N_Shore |
| cg02192318 | 1 | | 37 | 16 | 89500212 | ANKRD11 | NM_013275 | 5UTR | chr16: 89500025-89500226 | Island |
| cg02205746 | | | 37 | 16 | 2732724 | KCTD5 | NM_018992 | 1stExon | chr16: 2732272-2732940 | Island |
| cg02215141 | 2 | | 37 | 4 | 132663979 | | | | chr4: 132664263-132664658 | N_Shore |
| cg02215141 | | 6 | 37 | 4 | 132663979 | | | | chr4: 132664263-132664658 | N_Shore |

TABLE 5-continued

| TargetID | Beta counts | M counts | GENOME BUILD | CHR | MAPINFO | UCSC_REFGENE_NAME | UCSC_REFGENE_ACCESSION | UCSC_REFGENE_GROUP | UCSC_CPG_ISLANDS_NAME | RELATION_TO_UCSC_CPG_ISLAND |
|---|---|---|---|---|---|---|---|---|---|---|
| cg02216246 | 2 | | 37 | 11 | 128564756 | FLI1; FLI1 | NM_002017; NM_001167681 | Body; 5UTR | chr11: 128562671-128865011 | Island |
| cg02216246 | | 1 | 37 | 11 | 128564756 | FLI1; FLI1 | NM_002017; NM_001167681 | Body; 5UTR | chr11: 128562671-128865011 | Island |
| cg02241363 | 2 | | 37 | 17 | 78450357 | NPTX1; NPTX1 | NM_002522; NM_002522 | 5UTR; 1stExon | chr17: 78449507-78452783 | Island |
| cg02268171 | | 2 | 37 | 13 | 24477610 | | | | chr13: 24477426-24478053 | Island |
| cg02275394 | 1 | | 37 | 13 | 80917432 | | | | chr13: 80914013-80915574 | S_Shore |
| cg02275622 | 1 | | 37 | 2 | 207773017 | | | | | |
| cg02286547 | | 2 | 37 | 11 | 75920278 | | | | chr11: 75918741-75922084 | Island |
| cg02301193 | | | 37 | 1 | 90267201 | | | | | |
| cg02301193 | 1 | | 37 | 1 | 90267201 | | | | | |
| cg02309335 | | | 37 | 6 | 30227294 | HLA-L | NR_027822 | | chr6: 30227320-30228255 | N_Shore |
| cg02339418 | 1 | | 37 | 12 | 123717776 | C12orf65; C12orf65 | NM_152269; NM_001143905 | TSS200; TSS1500 | chr12: 123717367-123718388 | Island |
| cg02358630 | 1 | | 37 | 10 | 71993457 | PPA1 | NM_021129 | TSS1500 | chr10: 71992414-71993467 | Island |
| cg02368096 | 2 | | 37 | 7 | 98248993 | NPTX2 | NM_002523 | Body | chr7: 98245805-98247759 | S_Shore |
| cg02398007 | 2 | | 37 | 12 | 67616546 | | | | | |
| cg02398007 | | 1 | 37 | 12 | 67616546 | | | | | |
| cg02444810 | | 1 | 37 | 17 | 27055702 | NEK8 | NM_178170 | TSS200 | chr17: 27055187-27056056 | Island |
| cg02448190 | 2 | | 37 | 1 | 156030535 | RAB25 | NM_020387 | TSS1500 | | |
| cg02448190 | | 1 | 37 | 1 | 156030535 | RAB25 | NM_020387 | TSS1500 | | |
| cg02491138 | 1 | | 37 | 20 | 51589616 | TSHZ2; TSHZ2 | NM_173485; NM_173485 | 1stExon; 5UTR | chr20: 51589707-51590020 | N_Shore |
| cg02506646 | | 1 | 37 | 3 | 52444059 | PHF7; PHF7; BAP1 | NM_173341; NM_016483; NM_004656 | TSS1500; TSS1500; TSS200 | chr3: 52443677-52445104 | Island |
| cg02504716 | | 1 | 37 | 11 | 124071642 | | | | | |
| cg02529035 | 1 | | 37 | 2 | 220377885 | ACCN4; ACCN4 | NM_182847; NM_018674 | TSS1500; TSS1500 | chr2: 220377743-220377946 | Island |
| cg02554361 | 1 | | 37 | 16 | 11001757 | CIITA | NM_000246 | Body | chr16: 11001646-11001872 | Island |
| cg02558537 | | 1 | 37 | 11 | 107328586 | CWF19L2 | NM_152434 | TSS200 | chr11: 107328441-107328691 | Island |
| cg02574502 | 1 | | 37 | 19 | 54486058 | CACNG8 | NM_031895 | Body | chr19: 54485303-54486322 | Island |
| cg02625590 | | 1 | 37 | 19 | 41880276 | TMEM91 | NM_001098825 | 5UTR | chr19: 41882507-41882773 | N_Shelf |
| cg02633148 | | | 37 | 4 | 46391476 | GABRA2; GABRA2 | NM_001114175; NM_000807 | TSS200; 5UTR | chr4: 46391903-46392572 | N_Shore |
| cg02653364 | 1 | | 37 | 16 | 58283706 | CCDC113; CCDC113 | NM_001142302; NM_014157 | TSS200; TSS200 | chr16: 58283703-58284084 | Island |
| cg02704217 | | 1 | 37 | 17 | 12568507 | MYOCD; MYOCD | NM_153604; NM_001146312 | TSS1500; TSS1500 | chr17: 12568667-12569335 | N_Shore |
| cg02721947 | | | 37 | 5 | 39719620 | | | | chr5: 39721548-39721835 | N_Shore |
| cg02734521 | | | 37 | 6 | 108326291 | | | | | |
| cg02804100 | 1 | | 37 | 19 | 720993 | PALM; PALM | NM_002579; NM_001040134 | Body; Body | chr19: 719098-720953 | S_Shore |
| cg02811702 | 1 | | 37 | 13 | 24901961 | | | | chr13: 24902292-24902696 | N_Shore |
| cg02846648 | | 1 | 37 | 12 | 129416689 | GLT1D1 | NM_144669 | Body | | |
| cg02862879 | | 1 | 37 | 6 | 131895102 | ARG1 | NM_000045 | Body | | |
| cg02894027 | 1 | | 37 | 2 | 173751562 | | | | | |
| cg02904235 | | 1 | 37 | 14 | 91527369 | RPS6KA5; RPS6KA5 | NM_182398; NM_004755 | TSS1500; TSS1500 | chr14: 91526233-91527552 | Island |
| cg02947232 | | 1 | 37 | 20 | 42937544 | FITM2 | NM_001080472 | Body | chr20: 42939 450-42940043 | N_Shore |
| cg02962630 | 5 | | 37 | 15 | 41222776 | DLL4 | NM_019074 | Body | chr15: 41217789-41223180 | Island |
| cg02962630 | | 4 | 37 | 15 | 41222776 | DLL4 | NM_019074 | Body | chr15: 41217789-41223180 | Island |
| cg02991338 | 1 | | 37 | 14 | 29236017 | FOXG1 | NM_005249 | TSS1500 | chr14: 29236835-29237832 | N_Shore |
| cg03003722 | 2 | | 37 | 6 | 38035488 | ZFAND3 | NM_021943 | Body | | |
| cg03004273 | | | 37 | 18 | 7568265 | PTPRM; PTPRM | NM_002845; NM_001105244 | Body; Body | chr18: 7566557-7568830 | Island |
| cg03054162 | 1 | | 37 | 2 | 70485230 | PCYOX1; PCYOX1 | NM_016297; NM_016297 | 1stExon; 5UTR | chr2: 70485231-70485679 | N_Shore |
| cg03069383 | | 1 | 37 | 2 | 18741691 | RDH14 | NM_020905 | 1stExon | chr2: 18741356-18741964 | Island |
| cg03069736 | 1 | | 37 | 17 | 72542117 | CD300C; CD300C | NM_006678; NM_006678 | Body | | |
| cg03088705 | | 1 | 37 | 10 | 111624928 | XPNPEP1; XPNPEP1; XPNPEP1 | NR_030724; NM_001167604; NM_020383 | Body; 3UTR; 3UTR | | |

TABLE 5-continued

| TargetID | Beta counts | M counts | GENOME BUILD | CHR | MAPINFO | UCSC_REFGENE_NAME | UCSC_REFGENE_ACCESSION | UCSC_REFGENE_GROUP | UCSC_CPG_ISLANDS_NAME | RELATION_TO_UCSC_CPG_ISLAND |
|---|---|---|---|---|---|---|---|---|---|---|
| cg03103023 | | 1 | 37 | 1 | 25088406 | CLIC4 | NM_013943 | Body | | |
| cg03119288 | | 1 | 37 | 19 | 10829265 | DNM2; DNM2; DNM2; DNM2 | NM_004945; NM_001005361; NM_001005362; NM_001005360 | Body; Body; Body; Body | chr19: 10828657-10829340 | Island |
| cg03124231 | | | 37 | 4 | 174255570 | HMGB2; HMGB2; HMGB2 | NM_001130689; NM_002129; NM_001130688; NM_002129 | TSS1500; 1stExon; TSS200; 5UTR | chr4: 174254683-174256538 | Island |
| cg03212634 | 4 | 9 | 37 | 19 | 54292238 | | | | | |
| cg03212634 | | 9 | 37 | 19 | 54292238 | | | | | |
| cg03243450 | 1 | 5 | 37 | 5 | 1800782 | NDUFS6; MRPL36 | NM_004553; NM_032479 | TSS1500; TSS1500 | chr5: 1799461-1801905 | Island |
| cg03243450 | | 5 | 37 | 5 | 1800782 | NDUFS6; MRPL36 | NM_004553; NM_032479 | TSS1500; TSS1500 | chr5: 1799461-1801905 | Island |
| cg03249986 | 1 | | 37 | 11 | 66383717 | RBM14 | NM_006328 | TSS1500 | chr11: 66383571-66385047 | Island |
| cg03290040 | 1 | | 37 | 22 | 24110355 | CHCHD10 | NM_213720 | TSS1500 | chr22: 24110029-24110995 | Island |
| cg03290752 | 1 | | 37 | 3 | 176915082 | TBL1XR1 | NM_024665 | TSS200 | chr3: 176915511-176915854 | N_Shore |
| cg03318904 | 1 | | 37 | 22 | 39801522 | MAP3K7IP1; MAP3K7IP1 | NM_006116; NM_153497 | Body; Body | | |
| cg03331282 | 1 | | 37 | 9 | 36056567 | TFAP2E | NM_178548 | Body | | |
| cg03382797 | 1 | | 37 | 9 | 135755363 | C9orf98; C9orf9 | NM_152572; NM_018956 | TSS1500; 5UTR | chr9: 135753347-135754384 | S_Shore |
| cg03396103 | 1 | | 37 | 12 | 116946354 | | | | chr12: 116946195-116946607 | Island |
| cg03396325 | 1 | | 37 | 15 | 87876345 | | | | | |
| cg03414134 | 2 | | 37 | 3 | 187462086 | BCL6 | NM_001706 | 5UTR | chr3: 187461974-187462197 | Island |
| cg03440588 | 3 | | 37 | 1 | 47900320 | FOXD2; MGC12982 | NM_004474; NR026878 | TSS1500; TSS1500 | chr1: 47899661-47900385 | Island |
| cg03440588 | | 3 | 37 | 1 | 47900320 | FOXD2; MGC12982 | NM_004474; NR026878 | TSS1500; TSS1500 | chr1: 47899661-47900385 | Island |
| cg03448396 | 1 | | 37 | 3 | 38495949 | LOC100128640; ACVR2B | NR_028389; NM_001106 | Body; Body | chr3: 38495088-38497151 | Island |
| cg03539051 | | 1 | 37 | 19 | 56418660 | NLRP13 | NM_176810 | Body | | |
| cg03558399 | 2 | | 37 | 3 | 67022555 | | | | | |
| cg03558805 | 1 | | 37 | 7 | 73184883 | CLDN3 | NM_001306 | TSS1500 | chr7: 73183379-73185115 | Island |
| cg03586240 | | 1 | 37 | 7 | 1966361 | MAD1L1; MAD1L1; MAD1L1 | NM_003550; NM_001013837; NM_001013836 | Body; Body; Body | chr7: 1967664-1967994 | N_Shore |
| cg03593908 | 1 | | 37 | 13 | 60842299 | | | | | |
| cg03597540 | | 1 | 37 | 1 | 149857491 | HIST2H2BE; HIST2H2AC; HIST2H2BE | NM_003528; NM_003517; NM_003528 | 1stExon; TSS1500; 3UTR | chr1: 149857769-149859470 | N_Shore |
| cg03623968 | 1 | | 37 | 3 | 128523333 | RAB7A | NM_004637 | Body | | |
| cg03632289 | | | 37 | 11 | 71301062 | | | | | |
| cg03657549 | 1 | 2 | 37 | 7 | 128116813 | METTL2B; METTL2B | NM_018396; NM_018396 | 5UTR; 1stExon | chr7: 128116667-128117312 | Island |
| cg03672997 | | 1 | 37 | 10 | 7859623 | TAF3 | NM_031923 | TSS1500 | chr10: 7860261-7861107 | N_Shore |
| cg03677929 | 1 | | 37 | 12 | 7342174 | PEX5; PEX5; PEX5; PEX5; PEX5 | NM_000319; NM_001131023; NM_001131024; NM_001131026 | TSS1500; TSS200; TSS200; TSS200; 5UTR | chr12: 7342074-7342417 | Island |
| cg03677929 | | | 37 | 12 | 7342174 | PEX5; PEX5; PEX5; PEX5; PEX5 | NM_000319; NM_001131025; NM_001131024; NM_001131026 | TSS1500; TSS200; TSS200; TSS200; 5UTR | chr12: 7342074-7342417 | Island |
| cg03687650 | 7 | | 37 | 11 | 3144685 | OSBPL5; OSBPL5; OSBPL5 | NM_020896; NM_001144063; NM_145638 | Body; Body; Body | chr11: 3141642-3141877 | S_Shelf |
| cg03687650 | | 11 | 37 | 11 | 3144685 | OSBPL5; OSBPL5; OSBPL5 | NM_020896; NM_001144063; NM_145638 | Body; Body; Body | chr11: 3141642-3141877 | S_Shelf |
| cg03703325 | 1 | | 37 | 3 | 50606864 | HEMK1 | NM_016173 | TSS200 | chr3: 50606345-50606972 | Island |
| cg03733229 | 2 | | 37 | 21 | 46824701 | COL18A1 | NM_130445 | TSS1500 | chr21: 46824531-46826234 | Island |
| cg03799405 | 2 | | 37 | 4 | 1595726 | | | | chr4: 1595293-1595539 | S_Shore |
| cg03822003 | | 1 | 37 | 16 | 30569878 | ZNF764 | NM_033410 | TSS1500 | chr16: 30569181-30570049 | Island |
| cg03870777 | 10 | | 37 | 12 | 53342755 | KRT18; KRT18 | NM_000224; NM_199187 | TSS200; 5UTR | chr12: 53342805-53343162 | N_Shore |
| cg03870777 | | 6 | 37 | 12 | 53342755 | KRT18; KRT18 | NM_000224; NM_199187 | TSS200; 5UTR | chr12: 53342805-53343162 | N_Shore |

TABLE 5-continued

| TargetID | GENOME BUILD | Beta counts | M counts | CHR | MAPINFO | UCSC_REFGENE NAME | UCSC_REFGENE ACCESSION | UCSC_REFGENE GROUP | UCSC_CPG_ISLANDS_NAME | RELATION TO UCSC CPG ISLAND |
|---|---|---|---|---|---|---|---|---|---|---|
| cg03916104 | 37 |   |   | 1 | 6314748 | GPR153 | NM_207370 | Body | chr1: 6313761-6314139 | S_Shore |
| cg03928690 | 37 | 1 |   | 2 | 198381209 | MOBKL3; MOBKL3; MOBKL3 | NM_199482; NM_001100819; NM_015387 | 5UTR; Body; Body | chr2: 198380423-198381301 | Island |
| cg03937591 | 37 | 1 |   | 4 | 899553 | GAK | NM_005255 | Body | chr4: 899774-899985 | N_Shore |
| cg04016326 | 37 |   | 1 | 12 | 141132940 | GRIN2B; GRIN2B | NM_000834; NM_000834 | 1stExon; 5UTR | chr12: 14134626-14135242 | N_Shore |
| cg04035728 | 37 | 1 |   | 8 | 27323467 | CHRNA2 | NM_000742 | Body | chr8: 27320914-27321276 | S_Shelf |
| cg04072156 | 37 | 1 |   | 3 | 148544962 | CPB1 | NM_001871 | TSS1500 |   |   |
| cg04083921 | 37 | 2 |   | 5 | 130915922 | RAPGEF6; RAPGEF6; RAPGEF6; RAPGEF6 | NM_001164388; NM_001164386; NM_001164390; NM_001164389; NM_001164387; NM_016340 | Body; Body; Body; Body; Body |   |   |
| cg04101351 | 37 | 1 |   | 12 | 20522672 | PDE3A | NM_000921 | 1stExon | chr12: 20521616-20523122 | Island |
| cg04113418 | 37 | 1 |   | 19 | 49646093 | PPFIA3 | NM_003660 | Body | chr19: 49646092-49646308 | Island |
| cg04120546 | 37 | 1 |   | 8 | 125740895 | MTSS1 | NM_014751 | TSS200 | chr8: 125739685-125741266 | Island |
| cg04166812 | 37 | 1 |   | 14 | 61122051 |   |   |   | chr14: 61123613-61124613 | N_Shore |
| cg04171803 | 37 | 1 |   | 2 | 233561907 | GIGYF2; GIGYF2; GIGYF2 | NM_015575; NM_001103148; NM_001103147 | TSS200; TSS200 | chr2: 233562005-233562547 | N_Shore |
| cg04186622 | 37 | 1 |   | 1 | 148556562 |   |   |   | chr1: 148556540-148556626 | Island |
| cg04199621 | 37 |   | 1 | 6 | 30955712 | MUC21 | NM_001010909 | Body |   |   |
| cg04215672 | 37 | 1 |   | 4 | 4108791 |   |   |   | chr4: 4108734-4109499 | Island |
| cg04223160 | 37 | 1 |   | 14 | 23755398 | HOMEZ | NM_020834 | TSS200 | chr14: 23755121-23755456 | Island |
| cg04254690 | 37 | 1 |   | 4 | 25031951 | LGI2 | NM_018176 | Body | chr4: 25032028-25032311 | N_Shore |
| cg04262428 | 37 | 2 |   | 11 | 70673256 | SHANK2 | NM_012309 | Body | chr11: 70672834-70673055 | S_Shore |
| cg04285141 | 37 | 2 |   | 16 | 57872427 |   |   |   |   |   |
| cg04293489 | 37 |   | 1 | 16 | 57872427 |   |   |   |   |   |
| cg04357082 | 37 | 1 |   | 6 | 49917881 | DEFB133 | NM_001166478 | TSS1500 | chr16: 979785-980198 | Island |
| cg04357082 | 37 |   | 1 | 16 | 980022 | LMF1 | NM_022773 | Body | chr16: 979785-980198 | Island |
| cg04360049 | 37 |   | 1 | 16 | 980022 | LMF1 | NM_022773 | Body | chr1: 158150620-158151503 | Island |
| cg04381865 | 37 |   | 1 | 1 | 158150797 | CD1D | NM_001766 | 5UTR | chr6: 15221568-15222202 | N_Shore |
| cg04406981 | 37 |   | 1 | 16 | 15219673 |   |   |   |   |   |
| cg04427003 | 37 |   | 4 | 19 | 48453315 | SNAR-C3 | NR_024221 | 1stExon | chr5: 63256548-63257886 | Island |
| cg04441477 | 37 |   | 4 | 5 | 63257499 | HTR1A | NM_000524 | 1stExon; 5UTR | chr16: 24267040-24267527 | Island |
| cg04493430 | 37 |   | 1 | 16 | 24267399 | CACNG3; CACNG3 | NM_006539; NM_006539 | TSS1500 | chr16: 1029878-1035327 | Island |
| cg04498153 | 37 | 1 |   | 16 | 1030388 | SOX8 | NM_014587 | Body; Body; Body | chr7: 157690559-157690770 | N_Shore |
| cg04498153 | 37 |   | 3 | 7 | 157690139 | PTPRN2; PTPRN2; PTPRN2 | NM_002847; NM_130842; NM_002847; NM_130843 | Body; Body; Body | chr7: 157690559-157690770 | N_Shore |
| cg04529860 | 37 | 2 |   | 19 | 39900650 |   |   |   | chr19: 39900139-39900888 | Island |
| cg04544058 | 37 |   | 1 | 3 | 13609195 | FBLN2; FBLN2; FBLN2 | NM_001165035; NM_001004019; NM_001998 | TSS1500; 5UTR; 5UTR | chr3: 13611923-13612435 | N_Shelf |
| cg04574459 | 37 | 1 |   | 21 | 47010768 |   |   |   | chr21: 47009996-47011163 | Island |
| cg04691540 | 37 | 1 |   | 1 | 179198414 | ABL2; ABL2; ABL2; ABL2; ABL2 | NM_001136001; NM_001168236; NM_007314; NM_001168237 | 1stExon; 1stExon; 1stExon | chr1: 179198163-179199200 | Island |
| cg04706600 | 37 | 2 |   | 5 | 178741004 | ADAMTS2; ADAMTS2 | NM_021599; NM_014244 | Body; Body |   |   |
| cg04706600 | 37 |   | 4 | 5 | 178741004 | ADAMTS2; ADAMTS2 | NM_021599; NM_014244 | Body; Body |   |   |
| cg04723723 | 37 | 1 |   | 1 | 67966270 |   |   |   |   |   |
| cg04729004 | 37 | 1 |   | 7 | 128550932 | KCP; KCP | NM_001135914; NM_199349 | TSS200; TSS200 | chr7: 128550409-128550903 | S_Shore |
| cg04737185 | 37 | 1 |   | 11 | 1445041 | BRSK2 | NM_003957 | Body |   |   |

TABLE 5-continued

| TargetID | Beta counts | M counts | GENOME BUILD | CHR | MAPINFO | UCSC_REFGENE NAME | UCSC_REFGENE ACCESSION | UCSC_REFGENE GROUP | UCSC_CPG ISLANDS_NAME | RELATION TO_UCSC CPG_ISLAND |
|---|---|---|---|---|---|---|---|---|---|---|
| cg04786330 | | 1 | 37 | 12 | 27091356 | C12orf11; FGFR1OP2; FGFR1OP2 | NM_018164; NM_015633; NM_015633 | TSS200; 5UTR; 1stExon | chr12: 27091158-27091857 | Island |
| cg04819714 | 1 | | 37 | 11 | 100861375 | | | | | |
| cg04821026 | 1 | | 37 | 21 | 15068553 | FLJ32810; TMEM133 | NM_152432; NM_032021 | 3UTR; TSS1500 | chr21: 15068825-15070104 | N_Shore |
| cg04837170 | | 1 | 37 | 16 | 1494876 | CCDC154 | NM_001143980 | TSS1500 | chr16: 1495039-1495366 | N_Shore |
| cg04884908 | | 2 | 37 | 2 | 72374840 | CYP26B1 | NM_019885 | 1stExon | chr2: 72371121-72375004 | Island |
| cg04891086 | 1 | | 37 | 12 | 5018513 | KCNA1 | NM_000217 | TSS1500 | chr12: 5018585-5021171 | N_Shore |
| cg04899500 | | 1 | 37 | 19 | 48965791 | KCNJ14; KCNJ14 | NM_170720; NM_013348 | Body; Body | chr19: 48965002-48965792 | Island |
| cg05025392 | 1 | | 37 | 17 | 14738114 | | | | | |
| cg05070971 | 2 | | 37 | 21 | 43239518 | PRDM15; PRDM15 | NM_022115; NM_001040424 | Body; Body | chr21: 43240351-43240586 | N_Shore |
| cg05070971 | | 1 | 37 | 21 | 43239518 | PRDM15; PRDM15 | NM_022115; NM_001040424 | Body; Body | chr21: 43240351-43240586 | N_Shore |
| cg05088794 | | 1 | 37 | 18 | 33081137 | | | | chr18: 33077545-33078063 | S_Shelf |
| cg05101846 | 1 | | 37 | 17 | 72580962 | C17orf77; CD300LD | NM_152460; NM_001115152 | TSS200; Body | | |
| cg05157470 | | 1 | 37 | 6 | 28937310 | | | | | |
| cg05229450 | | 1 | 37 | 6 | 169465101 | | | | | |
| cg05240017 | 2 | | 37 | 5 | 40756081 | TTC33 | NM_012382 | TSS200 | chr5: 40755537-40756257 | Island |
| cg05240017 | | 1 | 37 | 5 | 40756081 | TTC33 | NM_012382 | TSS200 | chr5: 40755537-40756257 | Island |
| cg05242257 | 1 | | 37 | 16 | 2588092 | PDPK1; PDPK1; PDPK1 | NM_031268; NM_002613; NM_031268; NM_002613 | 5UTR; 1stExon; 1stExon; 5UTR | chr16: 2588034-2588556 | Island |
| cg05304037 | | 1 | 37 | 19 | 50094202 | PRR12; PRRG2 | NM_020719; NM_000951 | TSS1500; 3UTR | chr19: 50093657-50095507 | Island |
| cg05377387 | | 1 | 37 | 16 | 84328658 | WFDC1 | NM_021197 | 1stExon | chr16: 84328519-84328720 | Island |
| cg05388057 | 1 | | 37 | 1 | 78226545 | USP33; USP33; USP33 | NM_015017; NM_201626; NM_201624 | TSS1500; TSS1500; TSS1500 | chr1: 78224843-78225650 | S_Shore |
| cg05436007 | 1 | | 37 | 6 | 147213060 | | | | | |
| cg05436007 | | 1 | 37 | 6 | 147213060 | | | | | |
| cg05553502 | 1 | | 37 | 5 | 92924091 | NR2F1 | NM_005654 | Body | chr5: 92923487-92924497 | Island |
| cg05587853 | 7 | | 37 | 3 | 135914748 | MSL2; MSL2 | NM_001145417; NM_018133 | TSS1500; TSS200 | chr3: 135914197-135916090 | Island |
| cg05592114 | 1 | | 37 | 12 | 7244104 | C1R | NM_001733 | Body | | |
| cg05597349 | 1 | | 37 | 10 | 102882978 | TLX1NB | NM_001085398 | 5UTR | chr10: 102882977-102883551 | Island |
| cg05634255 | | 1 | 37 | 4 | 138864033 | | | | | |
| cg05668926 | 1 | | 37 | 7 | 39609343 | C7orf36 | NM_020192 | Body | chr7: 39605776-39606376 | S_Shelf |
| cg05743054 | 2 | | 37 | 3 | 158288903 | MLF1; MLF1; MLF1 | NM_001130156; NM_022443; NM_001130157 | TSS200; TSS200; TSS200 | chr3: 158288800-158289271 | Island |
| cg05757007 | 1 | | 37 | 6 | 101053555 | ASCC3 | NM_006828 | Body | | |
| cg05835009 | | 1 | 37 | 4 | 710272 | PCGF3 | NM_006315 | 5UTR | | |
| cg05851240 | 1 | | 37 | 18 | 72201663 | CNDP1 | NM_032649 | TSS200 | chr4: 713927-714137 | N_Shelf |
| cg05852760 | | 1 | 37 | 7 | 23508224 | IGF2BP3 | NM_006547 | Body | chr7: 23508184-23509712 | Island |
| cg05854114 | | 1 | 37 | 12 | 77719408 | | | | chr12: 77718453-77719440 | Island |
| cg05907237 | 1 | | 37 | 10 | 126849609 | CTBP2; CTBP2 | NM_001083914; NM_001329 | 1stExon; 5UTR | chr10: 126847224-126851327 | Island |
| cg05931119 | 1 | | 37 | 6 | 168569742 | | | | | |
| cg05936555 | 2 | | 37 | 6 | 30539508 | ABCF1; ABCF1 | NM_001090; NM_001025091 | Body; Body | chr6: 30538983-30539487 | S_Shore |
| cg05952475 | 1 | | 37 | 6 | 163681845 | PACRG; PACRG; PACRG | NM_152410; NM_001080378; NM_001080379 | Body; Body; Body | | |
| cg05963872 | 1 | | 37 | 7 | 63652631 | | | | chr7: 63652630-63652962 | Island |
| cg06016354 | 3 | | 37 | 6 | 32163966 | GPSM3; NOTCH4 | NM_022107; NM_004557 | TSS1500; Body | chr6: 32163292-32164383 | Island |

TABLE 5-continued

| TargetID | Beta counts | M counts | GENOME BUILD | CHR | MAPINFO | UCSC_REFGENE_NAME | UCSC_REFGENE_ACCESSION | UCSC_REFGENE_GROUP | UCSC_CPG_ISLANDS_NAME | RELATION_TO_UCSC_CPG_ISLAND |
|---|---|---|---|---|---|---|---|---|---|---|
| cg06039161 | 1 |   | 37 | 11 | 70672835 | SHANK2 | NM_012309 | Body | chr11: 70672834-70673055 | Island |
| cg06079468 |   | 1 | 37 | 10 | 81839181 |   | NR_027430; NR_027431; NR_027428; NR_025125; NR_027432; NR_027429 | TSS1500; TSS1500; TSS1500; Body; TSS1500; TSS1500 | chr10: 81838359-81839078 | S_Shore |
| cg06081199 |   |   | 37 | 7 | 117120064 | CFTR; CFTR | NM_000492; NM_000492 | 1stExon; 5UTR |   |   |
| cg06087019 |   | 1 | 37 | 3 | 27771670 |   |   |   | chr3: 27771638-27771942 | N_Shore |
| cg06090383 |   | 1 | 37 | 4 | 174292579 | SAP30 | NM_003864 | 1stExon | chr4: 174291879-174293273 | Island |
| cg06098215 | 2 |   | 37 | 10 | 51575702 | NCOA4; NCOA4; NCOA4; NCOA4 | NM_005437; NM_001145263; NM_001145261; NM_001145262; NM_001145260 | 5UTR; 5UTR; Body; TSS1500; Body | chr10: 51572198-51572620 | S_Shelf |
| cg06153883 | 1 |   | 37 | 7 | 136683107 | CHRM2; CHRM2; CHRM2; CHRM2; CHRM2 | NM_001006631; NM_000739; NM_001006627; NM_001006628; NM_001006629; NM_001006632; NM_001006630; NM_001006626 | 5UTR; 5UTR; 5UTR; 5UTR; 5UTR; 5UTR; 5UTR; 5UTR |   |   |
| cg06166932 | 1 |   | 37 | 8 | 143530800 |   |   |   | chr8: 143530645-143530872 | Island |
| cg06180519 | 2 |   | 37 | 10 | 32800689 | CCDC7; CCDC7 | NM_145023; NM_001026383 | Body; Body |   |   |
| cg06180519 |   | 3 | 37 | 10 | 32800689 | CCDC7; CCDC7 | NM_145023; NM_001026383 | Body; Body |   |   |
| cg06212297 |   | 1 | 37 | 16 | 48079666 |   |   |   |   |   |
| cg06254801 | 2 |   | 37 | 9 | 79379216 | PCA3; PRUNE2 | NR_015342; NM_015225 | TSS200; Body |   |   |
| cg06319785 | 1 |   | 37 | 2 | 75437207 |   |   |   |   |   |
| cg06326713 |   | 1 | 37 | 17 | 20745278 | SPAG5 | NM_006461 | TSS1500 | chr17: 20746783-20747635 | N_Shore |
| cg06339022 |   | 5 | 37 | 17 | 26926511 | FGR; FGR; FGR | NM_005248; NM_001042729; NM_001042747 | 3UTR; 3UTR; 3UTR | chr17: 26925742-26926512 | Island |
| cg06354519 |   | 1 | 37 | 1 | 27939417 |   |   |   | chr1: 27941865-27942324 | N_Shelf |
| cg06409741 | 11 |   | 37 | 13 | 114767222 | RASA3 | NM_007368 | Body | chr13: 114766710-114767223 | Island |
| cg06409741 |   | 11 | 37 | 13 | 114767222 | RASA3 | NM_007368 | Body | chr13: 114766710-114767223 | Island |
| cg06444730 | 1 |   | 37 | 1 | 84544284 | PRKACB; PRKACB | NM_002731; NM_207578 | Body; Body | chr1: 84543146-84544261 | S_Shore |
| cg06452419 | 1 |   | 37 | 17 | 55938940 |   |   |   | chr17: 55939088-55939591 | N_Shore |
| cg06456389 | 2 |   | 37 | 10 | 99052468 | ARHGAP19 | NM_032900 | Body; TSS1500 | chr10: 99051934-99052490 | Island |
| cg06466917 |   | 1 | 37 | 5 | 17216259 | LOC285696; BASP1 | NR_027253; NM_006317 | 1stExon | chr5: 17216489-17217036 | N_Shore |
| cg06483559 | 1 |   | 37 | 11 | 123624914 | OR6X1 | NM_001005188 | TSS200 |   |   |
| cg06502456 | 2 |   | 37 | 15 | 25304609 | SNORD116-4 | NR_003319 | TSS200 |   |   |
| cg06502456 |   |   | 37 | 15 | 25304609 | SNORD116-4 | NR_003319 | TSS200 |   |   |
| cg06515771 | 1 |   | 37 | 6 | 26614168 |   |   |   | chr6: 26614013-26614851 | Island |
| cg06521472 | 1 |   | 37 | 16 | 88990232 | CBFA2T3; CBFA2T3 | NM_175931; NM_005187 | 5UTR; Body | chr16: 88994137-88994442 | N_Shelf |
| cg06525193 |   | 1 | 37 | 2 | 238145456 |   |   |   |   |   |
| cg06525491 |   | 5 | 37 | 11 | 71353991 |   |   |   | chr11: 71350345-71350998 | S_Shelf |
| cg06528306 |   | 1 | 37 | 8 | 53852661 | NPBWR1 | NM_005285 | 1stExon | chr8: 53851701-53854426 | Island |
| cg06546406 | 2 |   | 37 | 1 | 39269756 |   |   |   | chr1: 39269729-39270251 | Island |
| cg06577604 |   | 1 | 37 | 3 | 184279443 | EPHB3 | NM_004443 | TSS200 | chr3: 184279194-184280721 | Island |
| cg06594186 |   | 1 | 37 | 7 | 129711260 |   |   |   |   |   |
| cg06638787 | 1 |   | 37 | 6 | 5997243 |   |   |   | chr6: 5997027-5997414 | Island |
| cg06677013 | 1 |   | 37 | 6 | 84570388 | CYB5R4 | NM_016230 | Body | chr6: 84569263-84569619 | S_Shore |
| cg06681324 | 2 |   | 37 | 2 | 165000237 |   |   |   |   |   |
| cg06681324 |   | 1 | 37 | 2 | 165000237 |   |   |   |   |   |

TABLE 5-continued

| TargetID | Beta counts | M counts | GENOME BUILD | CHR | MAPINFO | UCSC_REFGENE_NAME | UCSC_REFGENE_ACCESSION | UCSC_REFGENE_GROUP | UCSC_CPG_ISLANDS_NAME | RELATION_TO_UCSC_CPG_ISLAND |
|---|---|---|---|---|---|---|---|---|---|---|
| cg06731021 | | 1 | 37 | 6 | 116442866 | COL10A1; NT5DC1 | NM_000493; NM_152729 | Body; Body | | S_Shore |
| cg06766273 | | 2 | 37 | 11 | 62521983 | ZBTB3 | NM_024784 | TSS1500 | chr11: 62521370-62521962 | |
| cg06796869 | | 1 | 37 | 1 | 228471009 | OBSCN; OBSCN | NM_052843; NM_001098623 | Body; Body | chr1: 228473835-228474043 | N_Shelf |
| cg06800849 | | | 37 | 16 | 89180587 | ACSF3; ACSF3; ACSF3 | NM_174917; NR_023316; NM_001127214 | Body; Body; Body | | |
| cg06816239 | 2 | | 37 | 1 | 169679199 | SELL; SELL | NM_000655; NR_029467 | Body; TSS1500 | | |
| cg06894723 | | 1 | 37 | 13 | 110398142 | | | | | |
| cg06900229 | 1 | | 37 | 17 | 48556928 | RSAD1 | NM_018346 | Body | chr17: 48556004-48556509 | S_Shore |
| cg06902609 | | 2 | 37 | 7 | 985719 | ADAP1 | NM_006869 | Body | chr7: 985613-985913 | Island |
| cg06916315 | 1 | | 37 | 5 | 174178587 | | | | chr5: 174178214-174178928 | Island |
| cg06996175 | 1 | | 37 | 19 | 2546877 | GNG7 | NM_052847 | 5UTR | chr19: 2546620-2546983 | Island |
| cg07054668 | | 1 | 37 | 3 | 52811637 | ITIH1; ITIH1 | NM_002215; NM_001166434 | 1stExon; TSS1500 | | |
| cg07061145 | 1 | | 37 | 15 | 78556178 | DNAJA4; DNAJA4 | NM_018602; NM_001130182 | TSS1500; TSS1500 | chr15: 78556405-78557542 | N_Shore |
| cg07089698 | | | 37 | 3 | 5161802 | | | | chr3: 5163838-5164540 | N_Shelf |
| cg07102406 | 1 | | 37 | 16 | 2294639 | DCI | NM_001919 | Body | | |
| cg07102406 | | 3 | 37 | 16 | 2294639 | DCI | NM_001919 | Body | | |
| cg07115206 | | 1 | 37 | 16 | 6425686 | A2BP1; A2BP1 | NM_001142333; NM_018723 | 5UTR; 5UTR | | |
| cg07119830 | | | 37 | 10 | 104412306 | TRIMS | NM_030912 | Body | | |
| cg07139514 | 1 | | 37 | 2 | 10665727 | | | | chr2: 10666541-10666765 | N_Shore |
| cg07145255 | 1 | | 37 | 5 | 59995354 | DEPDC1B; DEPDC1B | NM_018369; NM_001145208 | Body; Body | chr5: 59995374-59996331 | N_Shore |
| cg07163173 | | | 37 | 2 | 67624373 | ETAA1 | NM_019002 | TSS200 | chr2: 67624372-67624844 | Island |
| cg07165115 | | | 37 | 2 | 82756475 | | | | | |
| cg07165756 | | 1 | 37 | 11 | 66311422 | ZDHHC24 | NM_207340 | Body | chr11: 66313169-66313822 | N_Shore |
| cg07170752 | 1 | | 37 | 1 | 225427173 | DNAH14 | NM_001373 | Body | | |
| cg07184658 | 2 | | 37 | 9 | 96722329 | | | | | |
| cg07190543 | | 1 | 37 | 7 | 8261154 | ICA1; ICA1; ICA1 | NM_004968; NM_001136020; NM_022307 | Body; Body; Body | chr9: 96720886-96723189 | Island |
| cg07216337 | | 1 | 37 | 8 | 75233610 | JPH1 | NM_020647 | TSS200 | chr8: 75232649-75234101 | Island |
| cg07258847 | 2 | | 37 | 6 | 66708570 | | | | | |
| cg07258847 | | 6 | 37 | 6 | 66708570 | | | | | |
| cg07266964 | 1 | | 37 | 2 | 135941054 | | | | | |
| cg07276861 | | 1 | 37 | 4 | 76862355 | NAAA; NAAA | NM_014435; NM_001042402 | TSS200; TSS200 | chr4: 76861089-76862426 | Island |
| cg07288557 | | 3 | 37 | 12 | 47226301 | SOX2OT | NR_004053 | Body | chr12: 47224912-47225664 | S_Shore |
| cg07304175 | 1 | | 37 | 3 | 181414139 | PCLO; PCLO | NM_014510; NM_033026 | Body; Body | chr3: 181413014-181414022 | S_Shore |
| cg07321237 | | 1 | 37 | 7 | 82754608 | | | | | |
| cg07331204 | | 1 | 37 | 6 | 74998385 | | | | | |
| cg07367469 | | 1 | 37 | 5 | 115988245 | | | | | |
| cg07379140 | 5 | | 37 | 1 | 95538546 | ALG14 | NM_144988 | TSS200 | chr1: 95538251-95538551 | Island |
| cg07379140 | | 1 | 37 | 1 | 95538546 | ALG14 | NM_144988 | TSS200 | chr1: 95538251-95538551 | Island |
| cg07476643 | | 1 | 37 | 10 | 102729063 | | | | chr10: 102729299-102729710 | N_Shore |
| cg07483064 | 1 | | 37 | 1 | 8938751 | ENO1; ENO1 | NM_001428; NM_001428 | 1stExon; 5UTR | chr1: 8938098-8939409 | Island |
| cg07487925 | | 1 | 37 | 17 | 25620950 | WSB1; WSB1 | NM_015626; NM_134265 | TSS200; TSS200 | chr17: 25620999-25621730 | N_Shore |
| cg07493834 | | | 37 | 2 | 22114272 | | | | | |
| cg07499372 | 1 | | 37 | 19 | 57631232 | USP29 | NM_020903 | TSS1500 | chr19: 57630339-57630633 | S_Shore |
| cg07517948 | | 1 | 37 | 15 | 67801494 | | | | | |
| cg07549590 | | | 37 | 16 | 15018862 | | | | chr16: 15018805-15019032 | Island |
| cg07554478 | 1 | | 37 | 3 | 113449074 | ATP6V1A | NM_001690 | 5UTR | | |

TABLE 5-continued

| TargetID | Beta counts | M counts | GENOME BUILD | CHR | MAPINFO | UCSC_REFGENE_NAME | UCSC_REFGENE_ACCESSION | UCSC_REFGENE_GROUP | UCSC_CPG_ISLANDS_NAME | RELATION_TO_UCSC_CPG_ISLAND |
|---|---|---|---|---|---|---|---|---|---|---|
| cg07562918 | 2 | | 37 | 9 | 21994435 | CDKN2A; CDKN2BAS | NM_058195; NR_003529 | 1stExon; TSS1500 | chr9: 21994101-21995910 | Island |
| cg07576142 | 1 | | 37 | 13 | 93879769 | GPC6 | NM_005708 | 1stExon | chr13: 93879245-93880877 | Island |
| cg07581226 | | 2 | 37 | 2 | 2939627 | | | | | |
| cg07588141 | 1 | | 37 | 3 | 105588208 | CBLB | NM_170662 | TSS1500 | chr3: 105587279-105588218 | Island |
| cg07596845 | | 1 | 37 | 6 | 82957841 | IBTK | NM_015525 | TSS1500 | chr6: 82957625-82957842 | Island |
| cg07602984 | 1 | | 37 | 1 | 36790927 | FAM176B | NM_018166 | TSS1500 | chr1: 36786500-36789402 | S_Shore |
| cg07605410 | | 1 | 37 | 1 | 16828163 | | | | chr1: 16825138-16826377 | S_Shore |
| cg07633317 | | | 37 | 6 | 49732623 | ZNF423 | NM_015069 | Body | chr6: 49732348-49732712 | Island |
| cg07695475 | 1 | | 37 | 16 | 102358936 | OR4F15 | NM_001001674 | 1stExon | | |
| cg07741793 | 1 | | 37 | 15 | 26989030 | SDF2; SUPT6H | NM_006923; NM_003170 | TSS200; TSS1500 | chr17: 26988721-26989391 | Island |
| cg07743117 | | 2 | 37 | 17 | 77146278 | | | | chr5: 77146998-77147785 | N_Shore |
| cg07749943 | 1 | | 37 | 5 | 3468188 | DOK7; DOK7 | NM_173660; NM_001164673 | Body; Body | chr4: 3464799-3465440 | S_Shelf |
| cg07772660 | 1 | | 37 | 4 | 17085863 | MST1P9 | NR_002729 | Body | chr1: 17085411-17086974 | Island |
| cg07772660 | | 9 | 37 | 1 | 17085863 | MST1P9 | NR_002729 | Body | chr1: 17085411-17086974 | Island |
| cg07781162 | 1 | | 37 | 1 | 74533951 | CYGB | NM_134268 | TSS200 | chr17: 74533281-74534566 | Island |
| cg07812819 | 1 | | 37 | 17 | 89975908 | GTPBP10; GTPBP10 | NM_001042717; NM_033107 | TSS200; TSS1500 | chr7: 89975785-89976027 | Island |
| cg07813249 | 1 | | 37 | 7 | 46392253 | GABRA2; GABRA2 | NM_000807; NM_001114175 | TSS200; TSS1500 | chr4: 46391903-46392572 | Island |
| cg07813747 | | 1 | 37 | 4 | 21514953 | LOC100271836 | NR_027155 | TSS1500 | chr16: 21512854-21513971 | S_Shore |
| cg07817024 | 1 | | 37 | 16 | 119535500 | | | | chr1: 119535666-119535987 | N_Shore |
| cg07855814 | 1 | | 37 | 1 | 32077669 | CBFA2T2 | NM_001032999 | TSS1500 | chr20: 32077657-32078469 | Island |
| cg07864467 | 1 | | 37 | 20 | 134246595 | | | | | |
| cg07883117 | 1 | | 37 | 10 | 101005846 | EMID2 | NM_133457 | TSS1500 | chr7: 101005899-101007443 | N_Shore |
| cg07908805 | | 2 | 37 | 7 | 427022 | SHC2 | NM_012435 | Body | chr6: 426792-427819 | Island |
| cg07919744 | 1 | | 37 | 19 | 52873609 | KIAA1370 | NM_019600 | 3UTR | | |
| cg07962315 | | | 37 | 15 | 77704473 | OSTF1; C9orf95; C9orf95; C9orf95 | NM_012383; NR023352; NM_001127603; NM_017881 | Body; TSS1500; TSS1500; TSS1500 | chr9: 77702885-77703819 | S_Shore |
| cg07966388 | 1 | | 37 | 9 | 93363564 | | | | | |
| cg08028004 | 1 | | 37 | 15 | 109336023 | RANBP2; RANBP2 | NM_006267; NM_006267 | 1stExon; 5UTR | chr2: 109335768-109336670 | Island |
| cg08035555 | 1 | | 37 | 2 | 3558417 | C19orf28; C19orf28; C19orf28 | NM_021731; NM_001042680; NM_174983 | TSS1500; TSS1500; TSS1500 | chr19: 3556962-3558293 | S_Shore |
| cg08076266 | 1 | | 37 | 19 | 120190202 | TMEM37 | NM_183240 | Body | chr2: 120190030-120190308 | Island |
| cg08237220 | 1 | | 37 | 2 | 156332967 | | | | | |
| cg08242475 | | | 37 | 3 | 1327791 | | | | chr7: 1328525-1329029 | N_Shore |
| cg08269037 | 1 | | 37 | 7 | 117516160 | MAD2L2; C1orf187; MAD2L2 | NM_001127325; NM_001127325 | 5UTR; TSS200; 1stExon | chr1: 117750701-117752651 | Island |
| cg08318726 | 1 | | 37 | 1 | 114844265 | TBX5; TBX5; TBX5 | NM_181486; NM_000192; NM_080717 | TSS1500; 5UTR; 5UTR | chr12: 114845861-114847650 | N_Shore |
| cg08356503 | 1 | | 37 | 12 | 88105836 | BANP; BANP | NM_017869; NM_079837 | Body; Body | chr16: 88105640-88105908 | Island |
| cg08376824 | 1 | | 37 | 16 | 5987738 | CRLS1; CRLS1 | NM_019095; NM_001127458 | Body; TSS200 | chr20: 5986399-5987297 | S_Shore |
| cg08447792 | | 1 | 37 | 20 | 110600020 | CCDC109B | NM_017918 | Body | | |
| cg08453096 | | 1 | 37 | 4 | 44065893 | ABCG5; ABCG8; ABCG5 | NM_022436; NM_022437; NM_022436 | 5UTR; TSS1500; 1stExon | | |
| cg08476757 | 1 | | 37 | 2 | 107940931 | IFT57 | NM_018010 | Body | chr3: 107940930-107941503 | Island |
| cg08514765 | 2 | | 37 | 3 | 58058888 | MMP15 | NM_002428 | TSS1500 | chr16: 58058712-58058928 | Island |
| cg08521684 | 1 | | 37 | 16 | 195488725 | MUC4; MUC4; MUC4 | NM_018406; NM_138297; NM_004532 | Body; Body; Body | chr3: 195488595-195489381 | Island |

TABLE 5-continued

| TargetID | Beta counts | M counts | GENOME BUILD | CHR | MAPINFO | UCSC_REFGENE_NAME | UCSC_REFGENE_ACCESSION | UCSC_REFGENE_GROUP | UCSC_CPG_ISLANDS_NAME | RELATION_TO_UCSC_CPG_ISLAND |
|---|---|---|---|---|---|---|---|---|---|---|
| cg08561442 | 1 | | 37 | 16 | 49891857 | LARP6; LARP6 | NM_197958; NM_018357 | Body; Body | chr16: 49888474-49893354 | Island |
| cg08592761 | 1 | 1 | 37 | 15 | 71146185 | PARD3B; PARD3B; PARD3B | NM_152526; NM_057177; NM_205863 | Body; Body; Body | chr15: 71145995-71146820 | Island |
| cg08623277 | | | 37 | 2 | 206004876 | PARD3B | | | | |
| cg08643994 | | 1 | 37 | 4 | 141500606 | DPYSL4 | NM_006426 | TSS1500 | chr10: 133998912-134001500 | Island |
| cg08658621 | 1 | | 37 | 10 | 133999287 | PCDH7; PCDH7; PCDH7 | NM_032456; NM_032457; NM_002589 | 1stExon; Body; 1stExon | chr4: 30721204-30724842 | Island |
| cg08671647 | 1 | | 37 | 4 | 30724564 | PCDH7 | NM_032456; NM_032457; NM_002589 | 1stExon; Body; 1stExon | chr4: 30721204-30724842 | Island |
| cg08671647 | | 2 | 37 | 4 | 30724564 | PCDH7 | NM_144770 | 1stExon | | |
| cg08727867 | 1 | | 37 | 21 | 15588349 | RBM11 | NM_144770 | TSS200 | chr21: 15588439-15588908 | N_Shore |
| cg08728848 | 6 | 3 | 37 | 17 | 30437958 | | | | | |
| cg08728848 | | | 37 | 17 | 30437958 | | | | | |
| cg08751971 | 1 | | 37 | 7 | 128587827 | IRF5; IRF5; IRF5; IRF5; IRF5 | NM_032643; NM_001098629; NM_001098628; NM_001098631; NM_001098630; NM_001098627; NM_002200 | Body; Body; Body; Body; Body | | |
| cg08753297 | 2 | | 37 | 6 | 56716612 | DST; DST; DST | NM_001144771; NM_001144770; NM_001144770; NM_001144769 | TSS200; 5UTR; 1stExon; Body | | |
| cg08782158 | 4 | | 37 | 2 | 927755 | | | | | |
| cg08813539 | | 1 | 37 | 10 | 29011452 | | | | chr10: 29011053-29011453 | Island |
| cg08852245 | 1 | 3 | 37 | 4 | 175138785 | | | | chr4: 175135259-175135496 | S_Shelf |
| cg08864035 | | | 37 | 1 | 114471711 | HIPK1; HIPK1 | NM_198268; NM_152696 | TSS1500; TSS1500 | chr1: 114471965-114472899 | N_Shore |
| cg08866633 | 1 | | 37 | 13 | 113968514 | LAMP1 | NM_005561 | Body | | |
| cg08891883 | 1 | | 37 | 4 | 8347266 | | | | chr4: 8347476-8347889 | N_Shore |
| cg08905496 | 3 | | 37 | 1 | 165414332 | RXRG; RXRG; RXRG | NM_001099598; NM_006917; NM_001009598 | 5UTR; 5UTR; 1stExon; TSS200 | | |
| cg08943292 | | | 37 | 4 | 40337370 | CHRNA9 | NM_017581 | Body; Body | | |
| cg08983429 | 1 | | 37 | 16 | 3577455 | CLUAP1; CLUAP1 | NM_015041; NM_024793 | Body; Body | chr6: 32811494-32811839 | N_Shelf |
| cg08992729 | | 1 | 37 | 6 | 32809425 | PSMB8; PSMB8 | NM_004159; NM_148919 | 1stExon; 1stExon | chr5: 140165958-140166214 | Island |
| cg09032973 | | | 37 | 5 | 140165998 | PCDHA1; PCDHA1; PCDHA1 | NM_031410; NM_031411; NM_018900 | 1stExon | | |
| cg09119967 | 1 | | 37 | 20 | 9494838 | C20orf103 | NM_012261 | TSS1500 | chr20: 9495253-9495597 | N_Shore |
| cg09214993 | 1 | | 37 | 15 | 64673618 | KIAA0101; KIAA0101; KIAA0101 | NM_001029989; NM_014736; NM_001029989; NM_014736 | 1stExon; 1stExon; 5UTR; 5UTR | | |
| cg09222892 | | 1 | 37 | 1 | 25734099 | RHCE; RHCE; RHCE | NM_138616; NM_138617; NM_138618; NM_020485 | Body; Body; Body; Body | | |
| cg09272909 | 1 | | 37 | 9 | 71736999 | TIP2 | NM_001170414 | 5UTR | chr9: 71736074-71737367 | Island |
| cg09292409 | | 2 | 37 | 16 | 15461083 | | | | | |
| cg09334915 | 1 | | 37 | 1 | 239450936 | | | | | |
| cg09343402 | 1 | | 37 | 19 | 24216269 | | | | | |
| cg09365557 | 1 | | 37 | 17 | 59477564 | TBX2 | NM_005994 | 1stExon | chr17: 59473060-59483266 | Island |
| cg09413529 | | 1 | 37 | 12 | 115112225 | TBX3; TBX3 | NM_005996; NM_016569 | Body; Body | chr2: 115112014-115112627 | Island |
| cg09418673 | 3 | | 37 | 11 | 76372128 | LRRC32; LRRC32 | NM_001128922; NM_005512 | Body; Body | | |
| cg09418673 | | 4 | 37 | 11 | 76372128 | LRRC32; LRRC32 | NM_001128922; NM_005512 | Body; Body | | |
| cg09463211 | 1 | | 37 | 15 | 99093248 | | | | | |
| cg09499421 | 1 | | 37 | 16 | 31020735 | STX1B | NM_052874 | Body | chr15: 99091355-99091812 | S_Shore |
| cg09507411 | 1 | | 37 | 5 | 82395650 | XRCC4; XRCC4; XRCC4 | NM_022550; NM_003401; NM_022406 | 5UTR; 5UTR; 5UTR | | |

TABLE 5-continued

| TargetID | Beta counts | M counts | GENOME BUILD | CHR | MAPINFO | UCSC_REFGENE_NAME | UCSC_REFGENE_ACCESSION | UCSC_REFGENE_GROUP | UCSC_CPG_ISLANDS_NAME | RELATION_TO_UCSC_CPG_ISLAND |
|---|---|---|---|---|---|---|---|---|---|---|
| cg09600829 |  | 2 | 37 | 9 | 96216052 | FAM120A; FAM120AOS | NM_014612; NM_198841 | Body; TSS200 | chr9: 96213340-96214953 | S_Shore |
| cg09653641 | 1 |  | 37 | 7 | 92455499 | CDK6; CDK6 | NM_001259; NM_001145306 | Body; Body |  |  |
| cg09672383 | 2 |  | 37 | 2 | 25390540 | POMC; POMC | NM_000939; NM_001035256 | 5UTR; 5UTR | chr2: 25391072-25391875 | N_Shore |
| cg09672383 |  | 1 | 37 | 2 | 25390540 | POMC; POMC | NM_000939; NM_001035256 | 5UTR; 5UTR | chr2: 25391072-25391875 | N_Shore |
| cg09717927 |  | 1 | 37 | 13 | 112630399 |  |  |  | chr13: 112630568-112630796 | N_Shore |
| cg09788029 | 3 |  | 37 | 12 | 103004347 |  |  |  |  |  |
| cg09814034 |  | 1 | 37 | 20 | 44876346 | CDH22 | NM_021248 | Body |  |  |
| cg09822136 | 1 |  | 37 | 5 | 14144123 | TRIO | NM_007118 | Body | chr5: 14143017-14145350 | S_Shore |
| cg09952395 | 1 |  | 37 | 11 | 63258712 | HRASLS5; HRASLS5; HRASLS5 | NM_001146728; NM_001146729; NM_054108 | TSS200; TSS200; TSS200 | chr11: 63258378-63258804 | Island |
| cg10006235 | 2 |  | 37 | 11 | 49226370 | FOLH1; FOLH1 | NM_004476; NM_001014986 | Body; Body | chr1: 49229717-49230040 | N_Shelf |
| cg10045446 | 1 |  | 37 | 7 | 32530734 | LSM5; LSM5 | NM_001139499; NM_012322; NM_001130710 | 5UTR; TSS1500; 5UTR | chr7: 32529753-32530146 | S_Shore |
| cg10045446 |  | 2 | 37 | 7 | 32530734 | LSM5; LSM5; LSM5 | NM_001139499; NM_012322; NR_024466; NM_001130710 | TSS1500; 5UTR; TSS1500; 5UTR | chr7: 32529753-32530146 | S_Shore |
| cg10077985 | 1 |  | 37 | 10 | 833127 |  | NR_024466; NM_001130710 |  |  |  |
| cg10091458 | 3 |  | 37 | 9 | 116858634 | KIF12 | NM_138424 | TSS1500; 5UTR; TSS1500; 5UTR; 5UTR | chr9: 116860473-116860695 | N_Shore |
| cg10128416 |  | 1 | 37 | 1 | 75198403 | TYW3; CRYZ; TYW3; CRYZ; TYW3; CRYZ; CRYZ | NM_001162916; NM_001130042; NM_001130043; NR_027962; NM_138467; NM_001134759; NM_001889 |  |  |  |
| cg10159215 |  | 1 | 37 | 1 | 99470560 | LPPR5; LPPR5 | NM_001010861; NM_001037317 | TSS200; TSS200 | chr1: 99469932-99470968 | Island |
| cg10174031 | 1 |  | 37 | 16 | 31408898 | ITGAD | NM_005353 | Body |  |  |
| cg10202874 | 1 |  | 37 | 16 | 32165225 | HERC2P4 | NR_002827 | TSS1500 |  |  |
| cg10206440 | 4 |  | 37 | 1 | 16353594 | CLCNKA; CLCNKA | NM_001042704; NM_004070 | Body; Body |  |  |
| cg10206440 |  | 1 | 37 | 1 | 16353594 | CLCNKA; CLCNKA | NM_001042704; NM_004070 | Body; Body |  |  |
| cg10211414 | 1 |  | 37 | 1 | 8875053 | RERE; RERE | NM_012102; NM_001042681 | 5UTR; 5UTR | chr1: 8877012-8877283 | N_Shore |
| cg10211414 |  | 1 | 37 | 1 | 8875053 | RERE; RERE | NM_012102; NM_001042681 | 5UTR; 5UTR | chr1: 8877012-8877283 | N_Shore |
| cg10261325 | 1 |  | 37 | 10 | 29874759 | SVIL; SVIL | NM_021738; NM_003174 | 5UTR; 5UTR |  |  |
| cg10261325 |  | 1 | 37 | 10 | 29874759 | SVIL; SVIL | NM_021738; NM_003174 | 5UTR; 5UTR |  |  |
| cg10306485 | 7 |  | 37 | 13 | 114881556 | RASA3 | NM_007368 | Body | chr13: 114879041-114879530 | S_Shelf |
| cg10306485 |  | 3 | 37 | 13 | 114881556 | RASA3 | NM_007368 | Body | chr13: 114879041-114879530 | S_Shelf |
| cg10368533 | 1 |  | 37 | 12 | 22778127 | ETNK1; ETNK1 | NM_001039481; NM_018638 | 1stExon; 1stExon | chr2: 22777988-22778301 | Island |
| cg10368935 |  | 1 | 37 | 10 | 18240316 | SLC39A12; SLC39A12 | NM_001145195; NM_152725 | TSS1500; TSS1500 |  |  |
| cg10405239 | 1 |  | 37 | 17 | 26733360 | SLC46A1 | NM_080669 | TSS200 | chr17: 26732812-26733396 | Island |
| cg10423227 |  | 1 | 37 | 2 | 64752200 | AFTPH; AFTPH; AFTPH | NM_203437; NM_001002243; NM_017657 | 5UTR; 5UTR; 5UTR | chr2: 64751141-64752083 | S_Shore |
| cg10490795 | 1 |  | 37 | 5 | 150035893 | SYNPO | NM_007286 | Body | chr5: 150035968-150036629 | N_Shore |
| cg10514235 |  | 1 | 37 | 4 | 150030844 |  |  |  | chr4: 150030059-15006761 | Island |
| cg10579818 | 1 |  | 37 | 19 | 34117242 | CHST8; CHST8 | NM_001127895; NM_001127896 | 5UTR; 5UTR | chr19: 34112279-34114353 | S_Shelf |
| cg10596590 | 1 |  | 37 | 6 | 51814836 | PKHD1; PKHD1 | NM_138694; NM_170724 | Body; Body |  |  |
| cg10601972 |  | 1 | 37 | 3 | 12851576 | CAND2; CAND2 | NM_001162499; NM_012298 | Body; Body | chr3: 12851516-12851823 | Island |
| cg10607939 | 1 |  | 37 | 7 | 112091280 | IFRD1;IFRD1 | NM_001550; NM_001007245 | Body; Body | chr7: 112090122-112091412 | Island |
| cg10609068 | 4 |  | 37 | 12 | 45609265 | ANO6; ANO6; PLEKHA9; ANO6 | NM_001142680; NM_001142679; NM_015899; NM_001025356 | TSS1500; TSS1500; 5UTR; TSS1500 | chr12: 45609713-45610752 | N_Shore |
| cg10609068 |  | 1 | 37 | 12 | 45609265 | ANO6; ANO6; PLEKHA9; ANO6 | NM_001142680; NM_001142679; NM_015899; NM_001025356 | TSS1500; TSS1500; 5UTR; TSS1500 | chr12: 45609713-45610752 | N_Shore |
| cg10674754 | 4 |  | 37 | 4 | 8456019 | C4orf23 | NM_152544 | TSS200 |  |  |
| cg10674754 |  | 3 | 37 | 4 | 8456019 | C4orf23 | NM_152544 | TSS200 |  |  |

TABLE 5-continued

| TargetID | Beta counts | M counts | GENOME BUILD | CHR | MAPINFO | UCSC_REFGENE_NAME | UCSC_REFGENE_ACCESSION | UCSC_REFGENE_GROUP | UCSC_CPG_ISLANDS_NAME | RELATION_TO_UCSC_CPG_ISLAND |
|---|---|---|---|---|---|---|---|---|---|---|
| cg10688514 | 1 | | 37 | 10 | 48354852 | ZNF488 | NM_153034 | TSS1500 | chr10: 48354459-48355197 | Island |
| cg10703619 | 1 | | 37 | 7 | 155014511 | | | | | |
| cg10711996 | | 1 | 37 | 10 | 32635917 | EPC1; EPC1 | NM_025209; NM_025209 | 5UTR; 1stExon | chr10: 32635217-32636655 | Island |
| cg10722444 | | 1 | 37 | 13 | 112630569 | PCNX | NM_014982 | Body | chr13: 112630568-112630796 | Island |
| cg10776643 | 1 | | 37 | 14 | 71527576 | | | | | |
| cg10829413 | 1 | | 37 | 12 | 125755229 | | | | | |
| cg10843276 | 1 | | 37 | 4 | 726697 | PCGF3 | NM_006315 | 5UTR | chr4: 724335-726070 | S_Shore |
| cg10895973 | | 1 | 37 | 17 | 14212636 | HS3ST3B1 | NM_006041 | Body | chr17: 14212363-14212788 | Island |
| cg10902101 | | 1 | 37 | 22 | 48899955 | FAM19A5 | NM_001082967 | Body | chr22: 48896375-48896591 | S_Shelf |
| cg10909154 | 1 | | 37 | 16 | 2723619 | | | | chr16: 2722923-2723674 | Island |
| cg10932815 | | | 37 | 12 | 68294240 | | | | | |
| cg10966582 | 1 | 5 | 37 | 1 | 17085860 | MST1P9 | NR_002729 | Body | chr1: 17085411-17086974 | Island |
| cg10966582 | | 1 | 37 | 1 | 17085860 | MST1P9 | NR_002729 | Body | chr1: 17085411-17086974 | Island |
| cg10988062 | | | 37 | 7 | 64034234 | ZNF680; ZNF680 | NM_001130022; NM_178558; NM_001130022 | 1stExon; 5UTR; 1stExon; 5UTR | | |
| cg11005250 | 3 | | 37 | 12 | 108297742 | PARS2 | NM_152268 | TSS1500 | chr12: 108297426-108297743 | Island |
| cg11084629 | | 3 | 37 | 1 | 55230770 | TAGLN3; TAGLN3; TAGLN3 | NM_013259; NM_001008272; NM_001008273 | TSS200; TSS200; TSS1500 | chr1: 55229992-55230369 | S_Shore |
| cg11104313 | | 1 | 37 | 3 | 111717534 | ATG7; ATG7; ATG7 | NM_001136031; NM_001144912; NM_006395 | Body; Body; Body | chr3: 11529784-11530120 | N_Shore |
| cg11159141 | | 1 | 37 | 3 | 11529333 | | | | | |
| cg11199172 | | | 37 | 17 | 46707338 | | | | chr17: 46710812-46711419 | N_Shelf |
| cg11203397 | 1 | | 37 | 13 | 46870454 | | | | | |
| cg11222065 | 1 | 1 | 37 | 6 | 33240468 | VPS52; RPS18 | NM_022553; NM_022551 | TSS1500; Body | chr6: 33239326-33240099 | S_Shore |
| cg11273848 | | | 37 | 10 | 130506845 | | | | chr10: 130508443-130508658 | N_Shore |
| cg11303425 | | 1 | 37 | 12 | 6798826 | ZNF384; ZNF384; ZNF384; ZNF384 | NM_001039916; NM_001039920; NM_001135734; NM_001039918; NM_001039917; NM_133476; NM_001039919 | TSS1500; TSS200; TSS200; TSS1500; TSS200; TSS1500; TSS200 | | |
| cg11322849 | | 1 | 37 | 11 | 2182783 | INS; INS-IGF2; INS-IGF2 | NM_000207; NR_003512; NM_001042376 | TSS1500; TSS1500; TSS1500 | | |
| cg11336643 | | | | 12 | 124432686 | CCDC92 | NM_025140 | 5UTR | | |
| cg11350208 | 1 | 1 | 37 | 2 | 133033202 | | | | | |
| cg11386711 | 1 | 1 | 37 | 3 | 186651116 | ST6GAL1; ST6GAL1 | NM_173216; NM_173217 | 5UTR; 5UTR | chr3: 186648174-186649103 | S_Shelf |
| cg11461030 | 1 | | 37 | 1 | 46932239 | | | | chr1: 46932130-46932892 | Island |
| cg11498652 | 1 | | 37 | 22 | 38507451 | BAIAP2L2 | NM_025045 | TSS1500 | | |
| cg11542394 | 2 | | 37 | 5 | 40834691 | RPL37 | NM_000997 | Body | chr5: 40835241-40835873 | N_Shore |
| cg11551464 | 2 | | 37 | 15 | 101419011 | ALDH1A3 | NM_000693 | TSS1500 | chr15: 101419261-101421133 | N_Shore |
| cg11553116 | | 3 | 37 | 8 | 49955738 | | | | | |
| cg11575929 | | 1 | 37 | 6 | 2871823 | | | | chr6: 2875601-2875811 | N_Shelf |
| cg11677722 | 1 | 1 | 37 | 6 | 28414894 | | | | | |
| cg11723795 | 1 | | 37 | 19 | 39881393 | MED29; PAF1 | NM_017592; NM_019088 | TSS1500; Body | chr19: 39881332-39882164 | Island |
| cg11746846 | 3 | | 37 | 14 | 91975931 | SMEK1 | NM_032560 | Body | chr14: 91975670-91977326 | Island |
| cg11746846 | 3 | | 37 | 18 | 3067337 | MYOM1; MYOM1 | NM_019856; NM_003803 | Body; Body | chr18: 3067297-3067533 | Island |
| cg11750736 | 1 | | 37 | 18 | 3067337 | MYOM1; MYOM1 | NM_019856; NM_003803 | Body; Body | chr18: 3067297-3067533 | Island |
| cg11781564 | 1 | | 37 | 17 | 10634140 | TMEM220 | NM_001044313 | TSS1500 | chr17: 10632789-10633490 | S_Shore |
| cg11801727 | | | 37 | 5 | 73016764 | RGNEF | NM_001080479 | Body | | |
| cg11832722 | 1 | 1 | 37 | 1 | 228659093 | | | | chr1: 228658937-228659152 | Island |
| cg11832722 | 1 | 1 | 37 | 18 | 28623060 | DSC3; DSC3 | NM_001941; NM_024423 | TSS1500; TSS1500 | chr18: 28621489-28623117 | Island |

TABLE 5-continued

| TargetID | Beta counts | M counts | GENOME BUILD | CHR | MAPINFO | UCSC_REFGENE_NAME | UCSC_REFGENE_ACCESSION | UCSC_REFGENE_GROUP | UCSC_CPG_ISLANDS_NAME | RELATION_TO_UCSC_CPG_ISLAND |
|---|---|---|---|---|---|---|---|---|---|---|
| cg11865413 | 15 | | 37 | 10 | 72969054 | | | | chr10: 72972075-72973895 | N_Shelf |
| cg11865413 | | 9 | 37 | 10 | 72969054 | | | | chr10: 72972075-72973895 | N_Shelf |
| cg11958128 | 1 | | 37 | 12 | 3226445 | TSPAN9; TSPAN9 | NM_001168320; NM_006675 | 5UTR; 5UTR | chr17: 30185764-30186580 | S_Shore |
| cg12000587 | 1 | | 37 | 17 | 30186630 | C17orf79 | NM_018405 | TSS1500 | chr16: 30346052-30346865 | Island |
| cg12014145 | | 1 | 37 | 16 | 30346812 | LOC595101 | NM_002453 | TSS200 | chr18: 55315730-55315932 | S_Shelf |
| cg12015279 | 1 | | 37 | 18 | 55318716 | ATP8B1 | NM_005603 | Body | chr7: 96650221-96651551 | N_Shore |
| cg12041387 | | 2 | 37 | 18 | 96650171 | DLX5 | NM_005221 | Body | chr4: 132896360-132896778 | N_Shore |
| cg12068833 | 1 | | 37 | 7 | 132896266 | | | | chr4: 132896360-132896778 | N_Shore |
| cg12068833 | | 1 | 37 | 4 | 132896266 | | | | chr11: 20690579-20691845 | Island |
| cg12071328 | 1 | | 37 | 4 | 20690930 | NELL1; NELL1 | NM_201551; NM_006157 | TSS200; TSS200 | | |
| cg12102432 | 1 | | 37 | 11 | 119378641 | | | | chr3: 105088072-105088339 | N_Shore |
| cg12226306 | 1 | | 37 | 11 | 105087718 | ALCAM | NM_001627 | Body | chr3: 105088072-105088339 | N_Shore |
| cg12226306 | | 1 | 37 | 3 | 105087718 | ALCAM | NM_001627 | Body | chr7: 149469542-149469748 | S_Shelf |
| cg12243858 | | 1 | 37 | 3 | 149473178 | SSPO | NM_198455 | 1stExon | chr19: 49931203-49931804 | Island |
| cg12285737 | 1 | | 37 | 7 | 49931759 | | | | chr10: 105991899-105992248 | Island |
| cg12329460 | 1 | | 37 | 19 | 105992247 | C10orf79 | NM_025145 | TSS200 | chr10: 116527524-116528474 | N_Shore |
| cg12378753 | | 1 | 37 | 10 | 116527201 | LPCAT1 | NM_024830 | Body | chr5: 1489799-1490071 | S_Shore |
| cg12400434 | 1 | | 37 | 5 | 1491377 | SPSB1 | NM_025106 | 5UTR | chr18: 35144907-35147628 | Island |
| cg12458866 | 1 | | 37 | 1 | 9353610 | | | | | |
| cg12466737 | 2 | | 37 | 18 | 35146589 | BRUNOL4; BRUNOL4; BRUNOL4; BRUNOL4 | NM_001025089; NM_001025087; NM_020180; NM_001025088 | TSS1500; TSS1500; TSS1500; TSS1500 | chr11: 68201118-68201321 | Island |
| cg12467960 | 2 | | 37 | 11 | 68201194 | LRP5 | NM_002335 | Body | chr19: 48229072-48229507 | S_Shore |
| cg12473849 | 1 | | 37 | 3 | 136882749 | | | | chr7: 65958470-65959121 | Island |
| cg12489353 | | 1 | 37 | 19 | 48231499 | EHD2 | NM_014601 | Body | chr17: 64831193-64831574 | Island |
| cg12494529 | 1 | | 37 | 10 | 1082432 | C10orf110; C10orf110; C10orf110 | NR_024629; NR_027708; NR_027709; NR_024628 | Body; Body; Body; Body | | |
| cg12512039 | 1 | | 37 | 7 | 65958832 | | | | chr8: 116657773-11666045 | S_Shore |
| cg12522342 | 2 | | 37 | 17 | 64831573 | COPS4 | NM_016129 | TSS200 | | |
| cg12532563 | | 1 | 37 | 4 | 83956223 | FDFT1 | NM_004462 | Body | chr7: 44058608-44058988 | S_Shore |
| cg12568669 | 1 | | 37 | 8 | 11666485 | D4S234E; D4S234E | NM_014392; NM_001040101 | Body; Body | | |
| cg12583367 | | 1 | 37 | 4 | 4412229 | CCDC147 | NM_001008723 | TSS1500 | | |
| cg12624829 | 2 | | 37 | 10 | 106113175 | POLR2I4 | NR_003655 | TSS1500 | | |
| cg12791476 | 1 | | 37 | 7 | 44059249 | RBM9; RBM9; RBM9; RBM9; RBM9; RBM9 | NM_014309; NM_001082578; NM_014309; NM_001082579; NM_001082576; NM_001031695; NM_001082576; NM_014309; 1stExon; NM_001082577; NM_001082577; NM_001082577 | 5UTR; Body; Body; 5UTR; 5UTR; 1stExon; 1stExon; 1stExon; 5UTR; 1stExon | | |
| cg12797594 | | 1 | 37 | 22 | 36236395 | | | | chr8: 127568676-127570873 | S_Shore |
| cg12822242 | 1 | | 37 | 8 | 127572993 | VENTXP7 | NR_002311 | TSS1500 | chr8: 19569026-1957177 | S_Shelf |
| cg12877889 | 1 | | 37 | 3 | 21446874 | | | | chr11: 16626053-16629180 | Island |
| cg12934366 | 2 | | 37 | 8 | 1960466 | | | | chr1: 637823944-63790471 | Island |
| cg13016524 | 1 | | 37 | 11 | 16628944 | | | | chr3: 126854106-126854848 | Island |
| cg13066016 | 1 | | 37 | 1 | 63786083 | | | | chr11: 63258378-63258804 | Island |
| cg13074470 | | 1 | 37 | 3 | 126854308 | | | | | |
| cg13112361 | 1 | | 37 | 11 | 63258739 | HRASLS5; HRASLS5 | NM_001146728; NM_001146729; NM_054108 | TSS200; TSS200; TSS200 | | |
| cg13130934 | 1 | | 37 | 15 | 25449922 | SNORD115-21; SNORD115-20; SNORD115-15 | NR_003313; NR_003312; NR_003307 | TSS1500; TSS1500; TSS1500 | | |

TABLE 5-continued

| TargetID | Beta counts | M counts | GENOME BUILD | CHR | MAPINFO | UCSC_REFGENE NAME | UCSC_REFGENE ACCESSION | UCSC_REFGENE GROUP | UCSC_CPG_ ISLANDS_NAME | RELATION TO_UCSC_ CPG_ISLAND |
|---|---|---|---|---|---|---|---|---|---|---|
| cg13193962 | | 2 | 37 | 4 | 156875105 | CTSO | NM_001334 | TSS200 | chr4: 156874740-156875083 | S_Shelf |
| cg13209388 | | 1 | 37 | 1 | 6355060 | ACOT7; ACOT7; ACOT7 | NM_181864; NM_181865; NM_007274; NM_181866 | Body; Body; Body; Body | | |
| cg13229233 | | | 37 | 17 | 67326602 | | | | chr17: 67322709-67323837 | S_Shelf |
| cg13229345 | 1 | | 37 | 4 | 187984633 | | | | chr4: 187984505-187984762 | Island |
| cg13230424 | | 3 | 37 | 17 | 45930033 | SP6 | NM_199262 | 5UTR | chr17: 45928211-45928710 | S_Shore |
| cg13230424 | 2 | | 37 | 17 | 45930033 | SP6 | NM_199262 | 5UTR | chr17: 45928211-45928710 | S_Shore |
| cg13279956 | | 1 | 37 | 11 | 55653268 | SPRYD5 | NM_032681 | Body | | |
| cg13286318 | | 1 | 37 | 8 | 57906058 | IMPAD1 | NM_017813 | 1stExon | chr8: 57905700-57906452 | Island |
| cg13306164 | 1 | | 37 | 1 | 33352184 | HPCA | NM_002143 | 5UTR | chr1: 33351686-33352397 | Island |
| cg13312403 | 1 | | 37 | 8 | 71246470 | NCOA2 | NM_006540 | 5UTR | | |
| cg13401339 | 1 | | 37 | 2 | 24272928 | FKBP1B; FKBP1B | NM_054033; NM_004116 | Body; Body | chr2: 24272582-24273313 | Island |
| cg13411336 | | 1 | 37 | 11 | 43968842 | | | | chr11: 43963626-43966048 | S_Shelf |
| cg13424673 | | 2 | 37 | 1 | 50489744 | AGBL4 | NM_032785 | TSS200 | chr1: 50489417-50489846 | Island |
| cg13426079 | | 3 | 37 | 1 | 41284948 | KCNQ4; KCNQ4 | NM_004700; NM_172163 | Body; Body | chr1: 41284847-41285149 | Island |
| cg13462158 | 3 | | 37 | 1 | 55522104 | PCSK9 | NM_174936 | Body | | |
| cg13473576 | | 1 | 37 | 7 | 97601586 | MGC72080 | NR_002822 | Body | chr7: 97601307-97601813 | Island |
| cg13488605 | 2 | | 37 | 19 | 38908709 | RASGRP4; RASGRP4; RASGRP4; RASGRP4; RASGRP4 | NM_001146205; NM_001146204; NM_001146202; NM_001146206 | Body; Body; Body; Body; Body | chr19: 38908487-38909240 | Island |
| cg13523386 | 1 | | 37 | 4 | 71457838 | AMBN | NM_016519 | TSS200 | | |
| cg13560904 | 1 | | 37 | 1 | 149982854 | OTUD7B | NM_020205 | TSS200 | chr1: 149982153-149982860 | Island |
| cg13565382 | | 4 | 37 | 10 | 63628787 | | | | | |
| cg13565382 | | 1 | 37 | 10 | 63628787 | | | | | |
| cg13568258 | | | 37 | 19 | 48823427 | CCDC114 | NM_144577 | TSS200 | chr19: 48824529-48825493 | N_Shore |
| cg13605988 | 1 | | 37 | 15 | 45421612 | DUOX1; DUOX1; DUOXA1 | NM_175940; NM_017434; NM_144565 | TSS1500; TSS1500; 5UTR | chr15: 45421236-45422394 | Island |
| cg13612295 | | 1 | 37 | 18 | 72124791 | FAM69C | NM_001044369 | TSS1500 | chr18: 72123606-72124717 | S_Shore |
| cg13614440 | 2 | | 37 | 17 | 76471012 | DNAH17 | NM_173628 | Body | chr17: 76472296-76472533 | N_Shore |
| cg13648161 | 1 | | 37 | 9 | 36328161 | | | | | |
| cg13663218 | | 1 | 37 | 12 | 72666976 | LOC283392; TRHDE; LOC283392 | NR_026837; NM_013381; NR_026836 | Body; 1stExon; Body | chr2: 72665683-72667551 | Island |
| cg13667739 | 1 | | 37 | 14 | 105944604 | CRIP2 | NM_001312 | Body | chr14: 105944421-105945700 | Island |
| cg13667739 | | 1 | 37 | 14 | 105944604 | CRIP2 | NM_001312 | Body | chr14: 105944421-105945700 | Island |
| cg13684188 | | 1 | 37 | 9 | 135282273 | TTF1 | NM_007344 | TSS200 | chr9: 135282052-135282315 | Island |
| cg13686622 | 1 | | 37 | 13 | 41634589 | WBP4 | NM_007187 | TSS1500 | chr13: 41634172-41636120 | Island |
| cg13857186 | | 1 | 37 | 9 | 116173257 | C9orf43; POLE3; C9orf43; POLE3 | NM_152786; NR_027261; NM_152786; NM_017443 | 5UTR; Body; 1stExon; TSS1500 | chr9: 116172303-116173090 | S_Shore |
| cg13861904 | 1 | | 37 | 9 | 139428006 | NOTCH1 | NM_017617 | Body | chr9: 139428318-139428527 | N_Shore |
| cg13892902 | | 1 | 37 | 15 | 43478040 | CCNDBP1; CCNDBP1; CCNDBP1 | NM_037370; NM_012142; NR_027513; NR_027514 | TSS200; Body; Body; Body | chr15: 43477588-43477816 | S_Shore |
| cg13896879 | 1 | | 37 | 1 | 150785718 | ARNT; ARNT; ARNT | NM_178427; NM_001668; NM_178426 | Body; Body; Body | | |
| cg13918350 | 1 | | 37 | 7 | 1153507 | C7orf50; C7orf50; C7orf50 | NM_001134395; NM_032350; NM_001134396 | Body; Body; Body | chr7: 1155303-1157445 | N_Shore |

TABLE 5-continued

| TargetID | Beta counts | M counts | GENOME BUILD | CHR | MAPINFO | UCSC_REFGENE_NAME | UCSC_REFGENE_ACCESSION | UCSC_REFGENE_GROUP | UCSC_CPG_ISLANDS_NAME | RELATION_TO_UCSC_CPG_ISLAND |
|---|---|---|---|---|---|---|---|---|---|---|
| cg13918350 | | 1 | 37 | 7 | 1153507 | C7orf50; C7orf50; C7orf50 | NM_001134395; NM_032350; NM_001134396 | Body; Body; Body | chr7: 1155303-1157445 | N_Shore |
| cg13944505 | | | 37 | 1 | 187460781 | | | | | |
| cg13995006 | 1 | 1 | 37 | 8 | 118533813 | MED30 | NM_080651 | TSS200 | chr8: 118532855-118533311 | N_Shore |
| cg13999514 | | 1 | 37 | 7 | 106302548 | FLJ36031 | NM_175884 | TSS1500 | chr7: 106300402-106301573 | S_Shore |
| cg14022105 | 2 | | 37 | 11 | 78288793 | | | | chr11: 78285405-78285995 | S_Shelf |
| cg14022105 | | 3 | 37 | 11 | 78288793 | | | | chr11: 78285405-78285995 | S_Shelf |
| cg14048880 | | 1 | 37 | 9 | 139069897 | | | | chr9: 139069755-139070076 | Island |
| cg14056644 | | 1 | 37 | 4 | 111559105 | PITX2; PITX2 | NM_153427; NM_153426 | TSS1500; TSS1500 5UTR | chr4: 111560563-111560808 | N_Shore |
| cg14097440 | | 1 | 37 | 14 | 74251018 | C14orf43 | NM_001043318 | 5UTR; 1stExon; | chr14: 74253387-74254188 | N_Shelf |
| cg14109799 | 2 | 1 | 37 | 14 | 31495427 | AP4S1; STRN3; STRN3; STRN3; AP4S1 | NM_007077; NM_014574; NM_014574; NM_001083893; NM_001128126 | 5UTR; 1stExon; 5UTR; 5UTR | | |
| cg14157578 | | | 37 | 9 | 110764967 | | | | | |
| cg14185808 | 1 | 1 | 37 | 2 | 105653893 | MRPS9 | NM_182640 | TSS1500 | chr2: 105654249-105654771 | N_Shore |
| cg14200609 | | 1 | 37 | 12 | 94853950 | CCDC41; CCDC41; LOC144486 | NM_016122; NM_001042399; NR_027035 | TSS200; TSS200; Body | chr12: 94853336-94854307 | Island |
| cg14237674 | 1 | | 37 | 17 | 43239170 | HEXIM2 | NM_144608 | 5UTR | chr17: 43238260-43239233 | Island |
| cg14249856 | | 1 | 37 | 7 | 77167329 | PTPN12; PTPN12; PTPN12 | NM_001131009; NM_001131008; NM_002835 | TSS200; TSS200; Body | chr7: 77166610-77167337 | Island |
| cg14279842 | 2 | | 37 | 14 | 50159788 | KLHDC1 | NM_172193 | TSS200 | chr14: 50159667-50160424 | Island |
| cg14280905 | | 5 | 37 | 9 | 136424187 | ADAMTSL2; ADAMTSL2 | NM_014694; NM_001145320 | Body; Body | chr9: 136426124-136426390 | N_Shore |
| cg14294250 | | 3 | 37 | 17 | 1957154 | HIC1 | NM_006497 | TSS1500 | chr17: 1952919-1962328 | Island |
| cg14314896 | 1 | | 37 | 19 | 430690 | SHC2 | NM_012435 | Body | chr19: 429260-429581 | S_Shore |
| cg14330460 | 4 | | 37 | 6 | 168559427 | | | | | |
| cg14330460 | | 7 | 37 | 6 | 168559427 | | | | | |
| cg14351127 | | 1 | 37 | 9 | 102956206 | INVS; INVS | NM_014425; NM_183245 | Body; Body | chr9: 124981535-124982835 | N_Shore |
| cg14361033 | 1 | 1 | 37 | 9 | 124981504 | LHX6; LHX6 | NM_199160; NM_014368 | Body; Body | | |
| cg14397696 | | | 37 | 13 | 105792284 | | | | | |
| cg14414764 | 1 | | 37 | 8 | 67741966 | SGK3; SGK3; SGK3 | NM_170709; NM_001033578; NM_013257 | Body; Body; Body | | |
| cg14447152 | 1 | | 37 | 9 | 140153393 | COBRA1 | NM_015456 | Body | chr9: 140149205-140150502 | S_Shelf |
| cg14447152 | | 2 | 37 | 9 | 140153393 | COBRA1 | NM_015456 | Body | chr9: 140149205-140150502 | S_Shelf |
| cg14455170 | 1 | | 37 | 13 | 42002398 | | | | | |
| cg14466759 | 1 | | 37 | 7 | 101518899 | CUX1; CUX1; CUX1 | NM_181500; NM_181552; NM_001913 | Body; Body; Body | | |
| cg14466759 | | 1 | 37 | 7 | 101518899 | CUX1; CUX1; CUX1 | NM_181500; NM_181552; NM_001913 | Body; Body; Body | | |
| cg14467066 | 1 | | 37 | 17 | 79419739 | BAHCC1 | NM_001080519 | Body | chr17: 79420144-79420437 | N_Shore |
| cg14482093 | | 1 | 37 | 8 | 22461488 | KIAA1967; C8orf58; KIAA1967 | NM_021174; NM_001013842; NM_199205 | TSS1500; 3UTR; TSS1500 | chr8: 22462092-22462868 | N_Shore |
| cg14540650 | 1 | | 37 | 9 | 6683274 | HIST1H3E | NM_003532 | TSS1500 | chr9: 6680856-6681758 | S_Shore |
| cg14543412 | 1 | | 37 | 6 | 26224100 | | | | chr6: 26225386-26225790 | N_Shore |
| cg14555127 | | 3 | 37 | 7 | 35841578 | SEPT7; SEPT7 | NM_001011553; NM_001788 | Body; Body | chr7: 35840132-35841591 | Island |
| cg14616423 | 7 | | 37 | 9 | 16315271 | | | | | |
| cg14616423 | | 1 | 37 | 9 | 16315271 | | | | | |
| cg14639163 | 1 | | 37 | 2 | 219738529 | WNT6 | NM_006522 | Body | chr2: 219738081-219738788 | Island |
| cg14657159 | | 2 | 37 | 12 | 56211136 | ORMDL2; SARNP; SARNP; SARNP | NM_014182; NR_026723; NR_026722; NM_033082 | TSS1500; Body; Body; Body | chr12: 56211325-56211553 | N_Shore |

TABLE 5-continued

| TargetID | Beta counts | M counts | GENOME BUILD | CHR | MAPINFO | UCSC_REFGENE_NAME | UCSC_REFGENE_ACCESSION | UCSC_REFGENE_GROUP | UCSC_CPG_ISLANDS_NAME | RELATION_TO_UCSC_CPG_ISLAND |
|---|---|---|---|---|---|---|---|---|---|---|
| cg14710040 | 4 |   | 37 | 19 | 3985464 | EEF2 | NM_001961 | TSS200 | chr19: 3984962-3985722 | Island |
| cg14737877 |   | 1 | 37 | 8 | 664783 | ERICH1 | NM_207332 | Body | chr8: 663998-664794 | Island |
| cg14780600 | 1 |   | 37 | 2 | 240281345 | HDAC4 | NM_006037 | 5UTR |   |   |
| cg14795305 |   | 2 | 37 | 7 | 150974453 | SMARCD3; SMARCD3 | NM_001003802; NM_003078 | TSS1500; TSS200 | chr7: 150974116-150974535 | Island |
| cg14834675 |   | 1 | 37 | 12 | 70083105 | BEST3; BEST3 | NM_032735; NM_152439 | Body; TSS200 |   |   |
| cg14857851 | 1 |   | 37 | 3 | 15115139 | ZFYVE20 | NM_022340 | 3UTR | chr3: 15116003-15116219 | N_Shore |
| cg14858469 |   | 1 | 37 | 15 | 96874050 | NR2F2; NR2F2 | NM_021005; NM_001145155 | TSS200; Body | chr15: 96873408-96877721 | Island |
| cg14866032 |   | 1 | 37 | 15 | 98195808 |   |   |   | chr15: 98196021-98196391 | N_Shore |
| cg14870156 | 1 |   | 37 | 6 | 33048540 | HLA-DPB1 | NM_002121 |   | chr6: 33048416-33048814 | Island |
| cg14871601 |   | 1 | 37 | 7 | 64030039 |   |   | Body | chr7: 64029902-64030972 | Island |
| cg14877741 | 1 |   | 37 | 9 | 125703099 | RABGAP1 | NM_012197 | TSS200 | chr9: 125703098-125703597 | Island |
| cg14938587 |   | 1 | 37 | 7 | 155790392 |   |   |   |   |   |
| cg14965968 | 1 |   | 37 | 3 | 44803235 | KIF15; KIF15; KIAA1143 | NM_020242; NM_020242; NM_020696 | 1stExon; 5UTR; TSS200 | chr3: 44802852-44803618 | Island |
| cg15002362 | 1 |   | 37 | 6 | 129796899 | LAMA2; LAMA2 | NM_001079823; NM_000426 | Body; Body |   |   |
| cg15002362 |   | 1 | 37 | 6 | 129796899 | LAMA2; LAMA2 | NM_001079823; NM_000426 | Body; Body |   |   |
| cg15002580 | 1 |   | 37 | 8 | 98636815 |   |   |   | chr8: 98636694-98636904 | Island |
| cg15025054 |   | 2 | 37 | 1 | 212964885 | TAIDN3; NSL1; TAIDN3; NSL1; TAIDN3; TAIDN3; TAIDN3 | NM_00U46171; NM_015471; NM_001042553; NM_001042549; NM_001042552; NM_001146170; NM_001146169 | TSS1500; 1stExon; TSS1500; 1stExon; TSS1500; TSS1500; TSS1500 | chr1: 212964866-212965347 | Island |
| cg15109571 | 2 |   | 37 | 10 | 104264023 | SUFU | NM_016169 | 1stExon | chr10: 104263676-104264155 | Island |
| cg15119076 |   | 1 | 37 | 19 | 19976606 | ZNF253 | NM_021047 | TSS200 |   |   |
| cg15140902 |   | 1 | 37 | 6 | 21667815 | FLJ22536 | NR_015410 | Body | chr6: 21665715-21666031 | S_Shore |
| cg15196058 |   | 1 | 37 | 4 | 130934318 |   |   |   |   |   |
| cg15228928 | 2 |   | 37 | 13 | 112727521 |   |   |   | chr13: 112726281-112728419 | Island |
| cg15330255 |   | 1 | 37 | 10 | 103454985 | FBXW4 | NM_022039 | TSS1500 | chr10: 103454126-103454478 | S_Shore |
| cg15333277 | 2 |   | 37 | 8 | 41733931 | ANK1 | NM_001142446 | Body | chr8: 41733535-41733911 | S_Shore |
| cg15347484 | 2 |   | 37 | 2 | 79515194 |   |   |   |   |   |
| cg15490897 |   | 1 | 37 | 7 | 55038020 | ACOT11; ACOT11 | NM_015547; NM_147161 | Body; Body | chr5: 72415611-72416766 | Island |
| cg15518950 |   | 1 | 37 | 5 | 72415770 | TMEM171; TMEM171 | NM_001161342; NM_173490 | TSS1500; TSS200 | chr11: 92930760-92931391 | Island |
| cg15554438 | 1 |   | 37 | 11 | 92931280 | SLC36A4 | NM_152313 | TSS200 |   |   |
| cg15590056 |   | 1 | 37 | 7 | 149725379 |   |   |   |   |   |
| cg15595333 | 1 |   | 37 | 11 | 117689733 |   |   |   |   |   |
| cg15602420 |   | 1 | 37 | 1 | 20205059 |   |   |   | chr1: 20208807-20209462 | N_Shelf |
| cg15651394 | 1 |   | 37 | 2 | 36584981 | CRIM1 | NM_016441 | Body | chr2: 36584500-36584982 | Island |
| cg15681626 | 1 |   | 37 | 11 | 64739253 |   |   |   | chr11: 64739010-64739750 | Island |
| cg15685834 | 1 |   | 37 | 1 | 18970180 | PAX7; PAX7; PAX7 | NM_013945; NM_002584; NM_001135254 | Body; Body; Body | chr1: 18969548-18970739 | N_Shore |
| cg15705470 | 1 |   | 37 | 5 | 87972265 | LOC645323; LOC645323 | NR_024383; NR_015436 | 5UTR | chr5: 87973951-87974294 | N_Shore |
| cg15709065 |   | 1 | 37 | 3 | 134090737 | AMOTL2 | NM_016201 | TSS1500 | chr3: 134092257-134093741 | S_Shore |
| cg15714041 | 1 |   | 37 | 9 | 32384344 | ACO1 | NM_002197 |   | chr9: 32384420-32384911 | Island |
| cg15745910 | 1 |   | 37 | 13 | 112874219 |   |   |   |   |   |
| cg15760986 |   | 1 | 37 | 7 | 98249103 | NPTX2 | NM_002523 | Body | chr7: 98245805-98247759 | S_Shore |
| cg15760840 | 1 |   | 37 | 7 | 27225222 | HOXA11AS; HOXA11 | NR_002795; NM_005523 | Body; TSS1500 | chr7: 27225050-27225629 | Island |
| cg15810744 |   | 1 | 37 | 11 | 67211300 | CORO1B; CORO1B | NM_001018070; NM_020441 | TSS200; TSS1500 |   |   |
| cg15812873 | 1 |   | 37 | 16 | 28635015 | SULT1A1 | NM_177536 | TSS200 | chr16: 28634440-28635031 | Island |
| cg15840462 | 1 |   | 37 | 1 | 969744 | AGRN | NM_198576 | Body | chr1: 967966-970238 | Island |
| cg15846886 | 1 |   | 37 | 17 | 79790116 | FAM195B; FAM195B | NM_207368; NM_001093767 | 5UTR; 5UTR | chr17: 79790530-79791553 | N_Shore |

TABLE 5-continued

| TargetID | Beta counts | M counts | GENOME BUILD | CHR | MAPINFO | UCSC_REFGENE_NAME | UCSC_REFGENE_ACCESSION | UCSC_REFGENE_GROUP | UCSC_CPG_ISLANDS_NAME | RELATION_TO_UCSC_CPG_ISLAND |
|---|---|---|---|---|---|---|---|---|---|---|
| cg15877233 | 1 | | 37 | 7 | 40611688 | C7orf10 | NM_024728 | Body | | |
| cg15892650 | | 1 | 37 | 5 | 150524635 | ANXA6; ANXA6 | NM_001155; NM_004033 | Body; Body | | Island |
| cg15913680 | | 3 | 37 | 11 | 72353343 | PDE2A; PDE2A; PDE2A; PDE2A | NM_001143839; NR026572; NM_001144209; NM_002599 | 1stExon; Body; Body; Body | chr11: 72353222-72354358 | Island |
| cg15917344 | 1 | | 37 | 7 | 89975873 | GTPBP10; GTPBP10 | NM_001042717; NM_033107 | TSS200; TSS200 | chr7: 89975785-89976027 | |
| cg15959921 | 1 | | 37 | 4 | 8702279 | | | | | Island |
| cg15974085 | 1 | | 37 | 18 | 71815641 | C18orf55; FBXO15; FBXO15 | NM_014177; NM_152676; NM_001142958 | TSS1500; TSS1500; TSS1500 | chr18: 71814555-71815716 | Island |
| cg15974085 | | 15 | 37 | 18 | 71815641 | C18orf55; FBXO15; FBXO15 | NM_014177; NM_152676; NM_001142958 | TSS200; TSS1500; TSS1500 | chr18: 71814555-71815716 | Island |
| cg15994467 | 1 | | 37 | 12 | 52401523 | GRASP | NM_181711 | Body | chr12: 52400467-52401696 | Island |
| cg16000637 | | 1 | 37 | 7 | 1274142 | UNCX | NM_001080461 | Body | chr7: 1269165-1282864 | Island |
| cg16001460 | 3 | | 37 | 6 | 57181802 | PRIM2 | NM_000947 | TSS1500 | | Island |
| cg16001460 | | 8 | 37 | 6 | 57181802 | PRIM2 | NM_000947 | TSS1500 | | Island |
| cg16009381 | 2 | | 37 | 5 | 173043599 | BOD1; BOD1; BOD1; BOD1 | NM_138369; NM_138369; NM_001159651; NM_001159651 | 5UTR; 1stExon; 5UTR; 1stExon | chr5: 173043123-173043895 | Island |
| cg16009381 | | 1 | 37 | 5 | 173043599 | BOD1; BOD1; BOD1; BOD1 | NM_138369; NM_138369; NM_001159651; NM_001159651 | 5UTR; 1stExon; 5UTR; 1stExon | chr5: 173043123-173043895 | Island |
| cg16013630 | 2 | | 37 | 1 | 1406606 | ATAD3B | NM_031921 | TSS1500 | chr1: 1406844-1407821 | N_Shore |
| cg16026088 | 1 | | 37 | 9 | 132565261 | TOR1B | NM_014506 | TSS200 | chr9: 132565316-132566033 | N_Shore |
| cg16060163 | | 3 | 37 | 17 | 80454814 | | | | chr17: 80454652-80455632 | Island |
| cg16084014 | 1 | | 37 | 7 | 114585003 | MDFIC; MDFIC | NM_199072; NM_001166345 | Body; Body | | N_Shore |
| cg16091269 | | 1 | 37 | 3 | 197183271 | | | | chr3: 197183404-197183724 | N_Shore |
| cg16091269 | 1 | | 37 | 3 | 197183271 | | | | chr3: 197183404-197183724 | S_Shore |
| cg16101346 | 1 | | 37 | 1 | 186650479 | PTGS2 | NM_000963 | Body | chr1: 186649310-186650081 | N_Shelf |
| cg16101636 | 1 | | 37 | 6 | 29711438 | LOC285830; LOC285830 | NR_026972; NR_026973 | Body; Body | | Island |
| cg16101636 | | 1 | 37 | 6 | 29711438 | LOC285830; LOC285830 | NR_026972; NR_026973 | Body; Body | | Island |
| cg16121685 | | 5 | 37 | 1 | 162467625 | UHMK1 | NM_175866 | TSS200 | chr1: 162467599-162468027 | Island |
| cg16143319 | | 2 | 37 | 2 | 32230813 | MEMO1; MEMO1 | NM_015955; NM_001137602 | Body; Body | chr2: 32234653-32236248 | Island |
| cg16208269 | | 1 | 37 | 3 | 45665937 | LIMD1 | NM_014240 | Body | | |
| cg16226310 | 1 | | 37 | 5 | 843633 | ZDHHC11 | NM_024786 | Body | chr5: 843458-843767 | Island |
| cg16226310 | | 1 | 37 | 5 | 843633 | ZDHHC11 | NM_024786 | Body | chr5: 843458-843767 | Island |
| cg16233210 | 1 | | 37 | 3 | 171778391 | FNDC3B; FNDC3B | NM_022763; NM_001135095 | 5UTR; 5UTR | | |
| cg16234298 | 1 | | 37 | 22 | 17091297 | psiTPTE22 | NR_001591 | Body | chr22: 17090455-17091224 | S_Shore |
| cg16271221 | | 1 | 37 | 3 | 188656237 | | | | | |
| cg16315155 | 1 | | 37 | 19 | 55249794 | KIR2DL3; KIR2DL3 | NM_015868; NM_014511 | TSS200; TSS200 | chr2: 128180294-128181381 | Island |
| cg16348316 | 1 | | 37 | 2 | 128181325 | PROC | NM_000312 | Body | chr7: 50849752-50850871 | N_Shore |
| cg16349612 | 1 | | 37 | 7 | 50849723 | GRB10 | NM_001001555 | 5UTR | chr12: 65218245-65219143 | S_Shore |
| cg16355305 | | 1 | 37 | 12 | 65220152 | | | | chr14: 38091469-38092176 | N_Shelf |
| cg16404784 | 1 | | 37 | 14 | 38087605 | | | | | |
| cg16410115 | 2 | | 37 | 1 | 24240000 | CNR2 | NM_001841 | TSS200 | | |
| cg16410115 | | 1 | 37 | 1 | 24240000 | CNR2 | NM_001841 | TSS200 | | |
| cg16459519 | 1 | | 37 | 10 | 46970584 | SYT15; SYT15; SYT15; SYT15 | NM_031912; NM_181519; NM_031912; NM_181519 | 1stExon; 5UTR; 5UTR; 1stExon | chr10: 46969991-46971557 | Island |
| cg16481280 | 1 | | 37 | 6 | 32120955 | PPT2; PRRT1; PPT2 | NM_005155; NM_030651; NM_138717 | TSS1500; TSS1500; TSS1500 | chr6: 32121829-32122529 | N_Shore |
| cg16506566 | 1 | | 37 | 5 | 10426680 | 43530 | NM_005885 | Body | | |
| cg16517838 | | 1 | 37 | 14 | 106154914 | | | | chr14: 106153128-106153364 | S_Shore |
| cg16542426 | | 1 | 37 | 15 | 23205622 | WHAMML1 | NR_003521 | | chr15: 23207949-23208796 | N_Shelf |

TABLE 5-continued

| TargetID | Beta counts | M counts | GENOME BUILD | CHR | MAPINFO | UCSC_REFGENE_NAME | UCSC_REFGENE_ACCESSION | UCSC_REFGENE_GROUP | UCSC_CPG_ISLANDS_NAME | RELATION_TO_UCSC_CPG_ISLAND |
|---|---|---|---|---|---|---|---|---|---|---|
| cg16573957 | | 1 | 37 | 8 | 21970273 | ZNF649 | NM_023074 | TSS200 | chr8: 21966485-21967329 | S_Shelf |
| cg16619071 | 1 | | 37 | 19 | 52408324 | COL18A1 | NM_130445 | Body | chr21: 46824531-46826234 | Island |
| cg16626809 | 1 | | 37 | 21 | 46825856 | HSPA4 | NM_002154 | Body | chr5: 132387100-132388369 | Island |
| cg16668042 | | 1 | 37 | 5 | 132388215 | HSPA4 | NM_002154 | Body | chr5: 132387100-132388369 | Island |
| cg16668042 | | 1 | 37 | 5 | 132388215 | UCKL1AS; UCKL1 | NR_027287; NM_017859 | Body; Body | chr20: 62586919-62588218 | Island |
| cg16681830 | | 1 | 37 | 20 | 62586920 | WIPF1; WIPF1 | NM_003387; NM_001077269 | Body; Body | chr11: 925183-926083 | S_Shelf |
| cg16707641 | 1 | | 37 | 2 | 175436630 | AP2A2 | NM_012305 | Body | | |
| cg16730825 | 1 | | 37 | 11 | 928439 | | | | | |
| cg16788797 | | 1 | 37 | 8 | 75132833 | NEU1 | NM_000434 | Body | chr6: 31830299-31830948 | N_Shore |
| cg16790849 | 5 | | 37 | 6 | 31829511 | NEU1 | NM_000434 | Body | chr6: 31830299-31830948 | N_Shore |
| cg16790849 | | 3 | 37 | 6 | 31829511 | MATN4; MATN4; RBPJL | NM_003833; NM_030592; NM_030590; NM_014276 | 5UTR; 5UTR; 5UTR; TSS1500 | chr20: 43935199-43935633 | Island |
| cg16837441 | 1 | | 37 | 20 | 43935222 | P2RY2; P2RY2; P2RY2 | NM_176071; NM_176072; NM_002564 | TSS1500; TSS1500; TSS1500 | chr11: 72928982-72929885 | Island |
| cg16872520 | | 1 | 37 | 11 | 72929124 | FLJ43663; FLJ43663 | NR_015431; NR_024153 | Body; Body | | |
| cg17001464 | 1 | | 37 | 7 | 130679521 | STBD1 | NM_003943 | TSS1500 | chr4: 77227354-77228482 | N_Shore |
| cg17010112 | | 1 | 37 | 4 | 77227123 | FGF3 | NM_005247 | Body | chr11: 69632033-69634710 | Island |
| cg17038667 | 1 | | 37 | 11 | 69632883 | | | | | |
| cg17049418 | | 1 | 37 | 6 | 3722453 | USP36 | NM_025090 | Body | chr17: 76798154-76798461 | Island |
| cg17278466 | | 2 | 37 | 17 | 76798203 | SLC25A17; SLC25A17 | NM_006358; NM_006358 | 1stExon; 5UTR | chr22: 41215135-41215576 | Island |
| cg17310773 | 4 | | 37 | 22 | 41215357 | SLC25A17; SLC25A17 | NM_006358; NM_006358 | 1stExon; 5UTR | chr22: 41215135-41215576 | Island |
| cg17310773 | | 1 | 37 | 22 | 41215357 | GBA; GBA; GBA; GBA | NM_001005749; NM_001005750; NM_001005742; NM_001005741 | TSS200; TSS200; TSS200; TSS200 | | |
| cg17319849 | | 1 | 37 | 1 | 155214564 | PPM1E | NM_014906 | Body | chr17: 56832961-56833986 | S_Shore |
| cg17330305 | 1 | | 37 | 17 | 56834361 | PPM1E | NM_014906 | Body | chr17: 56832961-56833986 | S_Shore |
| cg17330305 | | 2 | 37 | 17 | 56834361 | GLTPD2 | NM_001014985 | TSS200 | chr17: 4692249-4693977 | N_Shore |
| cg17351882 | 1 | | 37 | 17 | 4692162 | CALD1; CALD1; CALD1; CALD1 | NM_033139; NM_033157; NM_033140; NM_033138 | Body; Body; Body; Body | | |
| cg17392018 | 1 | | 37 | 7 | 134590119 | HK3 | NM_002115 | TSS200 | chr5: 176326365 | |
| cg17393572 | | 1 | 37 | 5 | 176326365 | BGLAP | NM_199173 | TSS1500 | chr1: 156215368-156215899 | N_Shelf |
| cg17419597 | 1 | | 37 | 1 | 156211529 | SERPINF2; SERPINF2; SERPINF2 | NM_000934; NM_001165921; NM_001165920 | Body; Body; Body | chr17: 1657447-1657677 | Island |
| cg17514665 | 1 | | 37 | 17 | 1657533 | IQSEC3 | NM_001170738 | 1stExon | chr1: 25174560-25175367 | Island |
| cg17599471 | 1 | | 37 | 1 | 25174745 | MUM1; MUM1 | NR_024247; NM_032853 | Body; Body | chr12: 175666-176400 | S_Shore |
| cg17656474 | | 1 | 37 | 12 | 176424 | C10orf140 | NM_207371 | Body | chr19: 1360038-1360347 | Island |
| cg17690515 | 11 | 2 | 37 | 19 | 1360278 | C10orf140 | NM_207371 | Body | chr10: 21805879-21806630 | Island |
| cg17745251 | | 7 | 37 | 10 | 21806139 | SMARCA4; SMARCA4; SMARCA4 | NM_003072; NM_001128849; NM_001128844 | TSS1500; TSS1500; TSS1500 | chr19: 11071116-11072340 | Island |
| cg17745251 | 1 | | 37 | 19 | 11071239 | CCDC93 | NM_019044 | Body | | |
| cg17747332 | 1 | | 37 | 2 | 118692673 | SDHAP3 | NR_003263 | | | |
| cg17749356 | | 1 | 37 | 5 | 1584233 | NKIRAS1; RPL15 | NM_020345; NM_002948 | TSS200; 5UTR | chr3: 23957941-23959181 | Island |
| cg17775382 | 1 | | 37 | 3 | 23958698 | CYP11A1; CYP11A1 | NM_000781; NM_001099773 | Body; TSS200 | chr15: 74658038-74658574 | S_Shore |
| cg17782025 | 1 | | 37 | 15 | 74658653 | | | | chr18: 54789959-54789194 | |
| cg17794241 | | 1 | 37 | 18 | 54790380 | EEF1DP3 | NR_027062 | | | |
| cg17815035 | | | 37 | 13 | 32497491 | AUTS2; AUTS2 | NM_015570; NM_001127231 | Body; Body | chr7: 70060834-70061456 | S_Shore |
| cg17877237 | 2 | | 37 | 7 | 70061616 | AUTS2; AUTS2 | NM_015570; NM_001127231 | Body; Body | chr7: 70060834-70061456 | S_Shore |
| cg17892069 | 2 | 3 | 37 | 7 | 70061616 | | | | | |

TABLE 5-continued

| TargetID | Beta counts | M counts | GENOME BUILD | CHR | MAPINFO | UCSC_REFGENE_NAME | UCSC_REFGENE_ACCESSION | UCSC_REFGENE_GROUP | UCSC_CPG_ISLANDS_NAME | RELATION_TO_UCSC_CPG_ISLAND |
|---|---|---|---|---|---|---|---|---|---|---|
| cg17897445 | 1 | | 37 | 8 | 7537473 | | | | chr8: 7537626-7538267 | N_Shore |
| cg17918201 | | 1 | 37 | 10 | 27150106 | ABI1; ABI1; ABI1; ABI1 | NM_005470; NM_001012752; NM_001012751; NM_001012750 | TSS200; TSS200; TSS200; TSS200 | chr10: 27149166-27150229 | Island |
| cg17956079 | 10 | | 37 | 11 | 73358572 | PLEKHB1; PLEKHB1; PLEKHB1; PLEKHB1 | NM_001130035; NM_001130036; NM_001130034; NM_001130033; NM_021200 | TSS200; TSS1500; TSS200; Body; Body | | |
| cg17956079 | | 4 | 37 | 11 | 73358572 | PLEKHB1; PLEKHB1; PLEKHB1; PLEKHB1 | NM_001130035; NM_001130G36; NM_001130034; NM_001130033; NM_021200 | TSS200; TSS1500; TSS200; Body; Body | | |
| cg17987505 | 1 | | 37 | 5 | 179246106 | SQSTM1; SQSTM1 | NM_001142298; NM_001142299 | 5UTR; 5UTR | chr5: 179247784-179248711 | N_Shore |
| cg18007959 | 1 | | 37 | 5 | 153863525 | | | | chr5: 153862142-153862451 | S_Shore |
| cg18056133 | | 1 | 37 | 11 | 60609408 | CCDC86 | NM_024098 | TSS200 | chr11: 60609392-60609786 | Island |
| cg18099523 | 3 | | 37 | 6 | 146285676 | SHPRH; SHPRH | NM_173082; NM_001042683 | TSS1500; TSS1500 | chr6: 146284795-146285701 | Island |
| cg18111500 | | 10 | 37 | 14 | 61655727 | | | | | |
| cg18111500 | | 1 | 37 | 14 | 61655727 | | | | | |
| cg18193219 | 1 | | 37 | 3 | 53164697 | RFT1 | NM_052859 | TSS1500 | chr3: 53164206-53164698 | Island |
| cg18207011 | | 1 | 37 | 14 | 68861095 | RAD51L1; RAD51L1; RAD51L1 | NM_133509; NM_002877; NM_133510 | Body; Body; Body | | |
| cg18217175 | 2 | | 37 | 1 | 18967020 | PAX7; PAX7; PAX7 | NM_013945; NM_002584; NM_001135254 | Body; Body; Body | chr1: 18967251-18968119 | N_Shore |
| cg18217175 | | 1 | 37 | 1 | 18967020 | PAX7; PAX7; PAX7 | NM_013945; NM_002584; NM_001135254 | Body; Body; Body | chr1: 18967251-18968119 | N_Shore |
| cg18220799 | 1 | | 37 | 18 | 44099340 | LOXHD1; LOXHD1; LOXHD1 | NM_001145473; NM_144612; NM_001145472 | TSS1500; Body; Body | | |
| cg18239858 | | 1 | 37 | 7 | 101712363 | CUX1; CUX1; CUX1 | NM_181500; NM_181552; NM_001913 | Body; Body; Body | | |
| cg18325160 | 1 | | 37 | 3 | 193311041 | OPA1; OPA1; OPA1; OPA1; OPA1; OPA1; OPA1; OPA1 | NM_130836; NM_130831; NM_130832; NM_130834; NM_130833; NM_130837; NM_130835; NM_130836; NM_130832; NM_130831; NM_015560; NM_130834; NM_130833; NM_130835; NM_015560 | 5UTR; 5UTR; 5UTR; 1stExon; 5UTR; 1stExon; 1stExon; 1stExon; 5UTR; 1stExon; 5UTR; 1stExon; 5UTR; 1stExon; 5UTR; 1stExon | chr3: 193310824-193311188 | Island |
| cg18337963 | 1 | | 37 | 11 | 46383209 | DGKZ; DGKZ; DGKZ; DGKZ | NM_001105540; NM_201533; NM_001105540; NM_003646; NM_201532 | 1stExon; Body; 5UTR; Body; Body | | |
| cg18391209 | 1 | | 37 | 1 | 223747670 | CAPN8 | NM_001143962 | Body | chr1: 223741965-223744525 | S_Shelf |
| cg18415822 | 1 | | 37 | 7 | 155857781 | | | | chr7: 155856030-155856349 | S_Shore |
| cg18452149 | 1 | | 37 | 3 | 108308268 | KIAA1524; DZIP3; KIAA1524 | NM_020890; NM_014648; NM_020890 | 5UTR; TSS200; 1stExon | chr3: 108308227-108308604 | Island |
| cg18460938 | 1 | | 37 | 15 | 86842630 | AGBL1 | NM_152336 | Body | | |
| cg18496140 | | 1 | 37 | 11 | 44286375 | ALX4 | NM_021926 | 3UTR | | |
| cg18501555 | | 1 | 37 | 4 | 111554966 | | | | chr4: 111554965-111555504 | Island |
| cg18561676 | 2 | | 37 | 1 | 148855262 | PITX2; PITX2 | NM_153427; NM_153426 | 5UTR; 5UTR | chr1: 148853996-148855761 | Island |
| cg18561676 | | 4 | 37 | 1 | 148855262 | PITX2; PITX2 | NM_153427; NM_153426 | 5UTR; 5UTR | chr1: 148853996-148855761 | Island |

TABLE 5-continued

| TargetID | Beta counts | M counts | GENOME BUILD | CHR | MAPINFO | UCSC_REFGENE NAME | UCSC_REFGENE ACCESSION | UCSC_REFGENE GROUP | UCSC_CPG_ ISLANDS_NAME | RELATION TO UCSC CPG ISLAND |
|---|---|---|---|---|---|---|---|---|---|---|
| cg18580296 | 1 |  | 37 | 7 | 15726411 | MEOX2 | NM_005924 | TSS200 |  |  |
| cg18580296 |  | 2 | 37 | 7 | 15726411 | MEOX2 | NM_005924 | TSS200 |  | S_Shore |
| cg18633379 |  | 1 | 37 | 18 | 59855274 | PIGN; PIGN; KIAA1468 | NM_012327; NM_176787; NM_020854 | TSS1500; TSS1500; Body |  | N_Shore |
| cg18633561 |  |  | 37 | 7 | 121943354 | FEZF1; FEZF1 | NM_001160264; NM_001024613 | Body; Body | chr7: 121943867-121944538 |  |
| cg18676488 | 1 |  | 37 | 5 | 70848105 | BDP1 | NM_018429 | Body |  |  |
| cg18676488 |  | 2 | 37 | 5 | 70848105 | BDP1 | NM_018429 | Body |  |  |
| cg18686165 | 1 |  | 37 | 3 | 57200492 | IL17RD | NM_017563 | TSS1500 | chr3: 57198243-57199378 | S_Shore |
| cg18700813 |  | 3 | 37 | 14 | 102702123 | RAGE | NM_014226 | Body |  |  |
| cg18710412 |  |  | 37 | 5 | 90654191 |  |  |  |  |  |
| cg18724069 | 1 |  | 37 | 5 | 39721760 |  |  |  | chr5: 39721548-39721835 | Island |
| cg18762036 |  |  | 37 | 2 | 107872062 |  |  |  |  |  |
| cg18779296 | 1 |  | 37 | 4 | 41878119 |  |  |  | chr4: 41880224-41880500 | N_Shelf |
| cg18855674 |  | 1 | 37 | 8 | 72469553 |  |  |  | chr8: 72468560-72469561 | Island |
| cg18862888 | 4 |  | 37 | 10 | 31346162 |  |  |  |  |  |
| cg18902057 | 1 |  | 37 | 16 | 88636444 | ZC3H18 | NM_144604 | TSS1500 | chr16: 88636176-88637333 | Island |
| cg18927185 |  |  | 37 | 6 | 33091634 | HLA-DPB2 | NR_001435 | Body |  |  |
| cg18954388 |  |  | 37 | 11 | 20621495 | SLC6A5 | NM_004211 | Body |  | N_Shore |
| cg19037304 | 1 | 2 | 37 | 7 | 19812760 | TMEM196 | NM_152774 | TSS1500 | chr7: 19812569-19813005 | Island |
| cg19132477 | 1 |  | 37 | 3 | 8484313 |  |  |  |  |  |
| cg19132477 |  | 1 | 37 | 3 | 8484313 |  |  |  |  |  |
| cg19154754 |  |  | 37 | 11 | 48977527 |  |  |  |  |  |
| cg19157696 | 1 |  | 37 | 11 | 27384984 | CCDC34; CCDC34 | NM_080654; NM_030771 | TSS200; TSS200 | chr11: 27384359-27384870 | S_Shore |
| cg19190016 | 1 |  | 37 | 17 | 81025684 |  |  |  | chr17: 81024122-81024360 | S_Shore |
| cg19207486 | 1 |  | 37 | 19 | 22323107 |  |  |  | chr19: 22320743-22320976 | S_Shelf |
| cg19227053 |  | 1 | 37 | 20 | 60116795 | CDH4 | NM_001794 | Body | chr20: 60119507-60119712 | N_Shelf |
| cg19265948 | 2 |  | 37 | 12 | 23229286 |  |  |  |  |  |
| cg19265948 |  | 1 | 37 | 12 | 23229286 |  |  |  |  |  |
| cg19327615 | 1 |  | 37 | 20 | 19955436 | RIN2 | NM_018993 | Body | chr20: 19955536-19956034 | N_Shore |
| cg19327615 |  | 1 | 37 | 20 | 19955436 | RIN2 | NM_018993 | Body | chr20: 19955536-19956034 | N_Shore |
| cg19380675 | 1 |  | 37 | 22 | 32808489 | C22orf28 | NM_014306 | TSS1500 | chr22: 32807825-32808285 | S_Shore |
| cg19409687 |  |  | 37 | 11 | 65682960 |  |  |  | chr11: 65685100-65685364 | N_Shelf |
| cg19441646 |  |  | 37 | 14 | 102695456 | RAGE | NM_014226 | 3UTR | chr14: 102695455-102695804 | Island |
| cg19448318 | 1 | 2 | 37 | 6 | 30698784 | FLOT1 | NM_005803 | Body |  |  |
| cg19469087 | 1 |  | 37 | 7 | 98556941 | TRRAP | NM_003496 | Body | chr7: 98552746-98552962 | S_Shelf |
| cg19480277 | 1 |  | 37 | 20 | 37109327 |  |  |  | chr20: 37101171-37101742 | N_Shelf |
| cg19484381 | 1 |  | 37 | 6 | 28890673 | TRIM27 | NM_006510 | Body | chr6: 28890951-28892013 | N_Shore |
| cg19488906 | 1 |  | 37 | 6 | 161694840 | AGPAT4 | NM_020133 | 5UTR |  |  |
| cg19513744 | 1 | 2 | 37 | 3 | 56836209 | ARHGEF3; ARHGEF3 | NM_001128615; NM_019555 | Body; TSS1500 | chr3: 56835650-56836210 | Island |
| cg19514542 |  | 1 | 37 | 10 | 125614284 | CPXM2 | NM_198148 | Body | chr10: 125617057-125617329 | N_Shore |
| cg19559392 | 7 |  | 37 | 2 | 39103372 | MORN2; DHX57 | NM_001145450; NM_198963 | 5UTR; TSS1500 | chr2: 39102805-39103214 | S_Shore |
| cg19562312 | 1 |  | 37 | 10 | 44069847 | ZNF239; ZNF239; ZNF239 | NM_001099284; NM_001099282; NM_001099283 | 5UTR; 5UTR; 5UTR | chr10: 44069359-44070179 | Island |
| cg19625088 | 1 |  | 37 | 5 | 87976156 | LOC645323 | NR_015436 | Body | chr5: 87976094-87976546 | Island |
| cg19627869 |  | 1 | 37 | 12 | 56391069 | SUOX; SUOX; SUOX; SUOX | NM_001032386; NM_001032387; NM_001032387; NM_000456; NM_000456 | 5UTR; 1stExon; 1stExon; 5UTR; 5UTR; 1stExon |  |  |
| cg19693446 | 1 |  | 37 | 14 | 102144192 |  |  |  |  |  |
| cg19749898 | 1 |  | 37 | 11 | 1712765 | HCCA2 | NM_053005 | Body | chr11: 1715347-1715607 | N_Shelf |

TABLE 5-continued

| TargetID | Beta counts | M counts | GENOME BUILD | CHR | MAPINFO | UCSC_REFGENE_NAME | UCSC_REFGENE_ACCESSION | UCSC_REFGENE_GROUP | UCSC_CPG_ISLANDS_NAME | RELATION_TO_UCSC_CPG_ISLAND |
|---|---|---|---|---|---|---|---|---|---|---|
| cg19777001 | 1 | | 37 | 14 | 103150180 | RCOR1 | NM_015156 | Body | | |
| cg19837938 | 1 | | 37 | 5 | 23507458 | PRDM9 | NM_020227 | TSS1500 | | |
| cg19837938 | | 2 | 37 | 5 | 23507458 | PRDM9 | NM_020227 | TSS1500 | | |
| cg19852211 | 1 | | 37 | 5 | 140187240 | PCDHA2; PCDHA1; PCDHA3; PCDHA4 | NM_018905; NM_031411; NM_018900; NM_018907; NM_018906; NM_031500 | Body; Body; Body; 1stExon; Body; 1stExon | chr5: 140186792-140187268 | Island |
| cg19852211 | | 1 | 37 | 5 | 140187240 | PCDHA2; PCDHA1; PCDHA3; PCDHA4 | NM_018905; NM_031411; NM_018900; NM_018907; NM_018906; NM_031500 | Body; Body; Body; 1stExon; Body; 1stExon | chr5: 140186792-140187268 | Island |
| cg19855573 | 2 | | 37 | 1 | 152297873 | FLG | NM_002016 | TSS200 | | |
| cg19865375 | 1 | | 37 | 7 | 86629801 | KIAA1324L; KIAA1324L | NM_001142749; NR030672 | Body; Body | | |
| cg19875976 | 1 | | 37 | 9 | 114246783 | KIAA0368 | NM_001080398 | Body | chr9: 114245044-114246784 | Island |
| cg19875976 | | 1 | 37 | 9 | 114246783 | KIAA0368 | NM_001080398 | Body | chr9: 114245044-114246784 | Island |
| cg19991948 | 1 | | 37 | 10 | 121335173 | TIAL1; TIAL1 | NM_001033925; NM_003252 | 3UTR; 3UTR | chr2: 37458398-37459199 | Island |
| cg19998654 | | 1 | 37 | 2 | 37458983 | CEBPZ; C2orf56; C2orf56 | NM_005760; NM_144736; NM_001083946 | TSS1500; Body; Body | chr2: 37458398-37459199 | Island |
| cg20059151 | 1 | | 37 | 1 | 95286311 | SLC44A3; SLC44A3 | NM_152369; NM_001114106 | 5UTR; Body | chr1: 95285602-95286319 | Island |
| cg20069765 | 1 | | 37 | 6 | 33036464 | HLA-DPA1 | NM_033554 | Body | | |
| cg20081364 | 1 | | 37 | 20 | 13202225 | ISM1 | NM_080826 | TSS200 | chr20: 13200670-13202616 | Island |
| cg20155875 | 1 | | 37 | 17 | 66452567 | WIPI1 | NM_017983 | Body | chr17: 66453349-66454137 | N_Shore |
| cg20162076 | 3 | | 37 | 6 | 6588089 | LY86; LOC285780 | NM_004271; NR_026970 | TSS1500; Body | | |
| cg20162076 | | 5 | 37 | 6 | 6588089 | LY86; LOC285780 | NM_004271; NR_026970 | TSS1500; Body | | |
| cg20183094 | | 1 | 37 | 6 | 127441199 | RSPO3 | NM_032784 | Body | chr6: 127441553-127441760 | N_Shore |
| cg20172795 | | 4 | 37 | 7 | 121950924 | | | | chr7: 121950249-121950927 | Island |
| cg20200361 | | 6 | 37 | 2 | 43775888 | THADA; THADA | NM_022065; NM_001083953 | Body; Body | | |
| cg20268522 | | 2 | 37 | 11 | 112832152 | NCAM1; NCAM1; NCAM1; NCAM1 | NM_001076682; NM_001076682; NM_000615; NM_181351; NM_181351; NM_000615 | 1stExon; 5UTR; 5UTR; 1stExon; 5UTR; 1stExon | | |
| cg20274430 | | 1 | 37 | 22 | 41075992 | MCHR1 | NM_005297 | Body | | |
| cg20294319 | 1 | | 37 | 13 | 47253842 | LRCH1; LRCH1; LRCH1 | NM_015116; NM_001164213; NM_001164211 | Body; Body; Body | | |
| cg20319405 | | 1 | 37 | 11 | 10830230 | EIF4G2; EIF4G2 | NM_001418; NM_001042559 | 5UTR; 5UTR | chr11: 10829361-10831121 | Island |
| cg20327784 | 1 | | 37 | 17 | 73703307 | SAP30BP | NM_013260 | 3UTR | | |
| cg20327784 | 1 | | 37 | 17 | 73703307 | SAP30BP | NM_013260 | 3UTR | | |
| cg20458353 | | 2 | 37 | 7 | 21260293 | | | | | |
| cg20500836 | | 1 | 37 | 17 | 78818645 | RPTOR; RPTOR | NM_001163034; NM_020761 | Body; Body | chr17: 78818440-78818696 | Island |
| cg20532937 | 1 | | 37 | 10 | 13748985 | FRMD4A | NM_018027 | Body | | |
| cg20555922 | 1 | | 37 | 20 | 33880266 | FAM83C | NM_178468 | TSS200 | chr20: 33879904-33880215 | S_Shore |
| cg20587808 | 1 | | 37 | 3 | 184320123 | | | | chr3: 184320005-184320218 | Island |
| cg20593868 | 1 | | 37 | 20 | 62588672 | UCKL1; ZNF512B | NM_017859; NM_020713 | TSS1500; 3UTR | chr20: 62586919-62588218 | S_Shore |
| cg20593868 | | 1 | 37 | 20 | 62588672 | UCKL1; ZNF512B | NM_017859; NM_020713 | TSS1500; 3UTR | chr20: 62586919-62588218 | S_Shore |
| cg20684251 | 3 | | 37 | 19 | 51840554 | VSIG10L | NM_001163922 | Body | chr19: 51842128-51842353 | N_Shore |
| cg20684251 | | 1 | 37 | 19 | 51840554 | VSIG10L | NM_001163922 | Body | chr19: 51842128-51842353 | N_Shore |
| cg20707630 | 1 | | 37 | 15 | 25018449 | | | | chr15: 25018174-25018533 | Island |
| cg20743744 | 1 | | 37 | 4 | 1243849 | C4orf42; CTBP1; CTBP1 | NM_052861; NM_001328; NM_001012614 | TSS1500; TSS1500 | chr4: 1241412-1244111 | Island |
| cg20888142 | 1 | | 37 | 3 | 12045662 | SYN2; SYN2 | NM_003178; NM_133625 | TSS200; TSS200 | chr3: 12045652-12046627 | Island |
| cg20914725 | 1 | | 37 | 2 | 74776831 | LOXL3 | NM_032603 | Body | chr2: 74776016-74776897 | Island |
| cg21000072 | 1 | | 37 | 1 | 3567408 | WDR8 | NM_017818 | TSS1500 | chr1: 3566445-3569636 | Island |

TABLE 5-continued

| TargetID | Beta counts | M counts | GENOME BUILD | CHR | MAPINFO | UCSC_REFGENE_NAME | UCSC_REFGENE_ACCESSION | UCSC_REFGENE_GROUP | UCSC_CPG_ISLANDS_NAME | RELATION_TO_UCSC_CPG_ISLAND |
|---|---|---|---|---|---|---|---|---|---|---|
| cg21007262 | | 1 | 37 | 20 | 18122863 | PET117; CSRP2BP | NM_001164811; NM_020536 | Body; TSS200 | chr20: 18117962-18118989 | S_Shelf |
| cg21102950 | | 4 | 37 | 3 | 155524173 | C3orf33 | NM_173657 | TSS200 | chr3: 155523740-155524174 | Island |
| cg21117978 | | 1 | 37 | 2 | 64957132 | | | | | S_Shelf |
| cg21200923 | | 1 | 37 | 18 | 9481257 | RALBP1 | NM_006788 | 5UTR | chr18: 9478452-9478920 | S_Shelf |
| cg21211367 | | | 37 | 2 | 162094118 | | | | chr2: 162094460-162096195 | N_Shore |
| cg21231400 | 2 | 2 | 37 | 5 | 155108085 | | | | chr5: 155107504-155108934 | Island |
| cg21234471 | | | 37 | 9 | 92023797 | SEMA4D; SEMA4D | NM_001142287; NM_006378 | 5UTR; 5UTR | | |
| cg21242508 | 2 | 1 | 37 | 22 | 28199621 | | | | chr22: 28192793-28198592 | S_Shore |
| cg21251791 | | 1 | 37 | 2 | 3129858 | | | | | |
| cg21263471 | 1 | | 37 | 17 | 56395584 | BZRAP1; BZRAP1 | NM_004758; NM_024418 | Body; Body | chr17: 56401728-56402343 | N_Shelf |
| cg21314304 | 1 | | 37 | 17 | 41135517 | RUNDC1 | NM_173079 | Body | chr17: 41132462-41133367 | S_Shelf |
| cg21434114 | | 1 | 37 | 18 | 3450282 | TGIF1; TGIF1; TGIF1; TGIF1; TGIF1 | NM_174886; NM_173208; NM_003244; NM_173209; NM_170695; NM_173210; NM_003244; NM_173207 | 5UTR; 5UTR; 5UTR; 5UTR; TSS1500; TSS1500; 1stExon; Body | chr18: 3448006-3452360 | Island |
| cg21441716 | | | 37 | 1 | 176317762 | | | | | |
| cg21450738 | 1 | 1 | 37 | 8 | 100909366 | | | | chr8: 100905657-100906003 | S_Shelf |
| cg21481322 | 1 | | 37 | 8 | 40984072 | | | | | Island |
| cg21503582 | | | 37 | 7 | 151001017 | | | | chr7: 151000579-151001042 | Island |
| cg21503582 | | 1 | 37 | 7 | 151001017 | | | | chr7: 151000579-151001042 | Island |
| cg21549195 | 1 | | 37 | 19 | 52452368 | | | | chr19: 52452316-52452543 | Island |
| cg21552319 | 1 | | 37 | 6 | 24356996 | DCDC2; KAAG1 | NM_016356; NM_181337 | Body; TSS200 | chr6: 24357719-24358309 | N_Shore |
| cg21552319 | | 2 | 37 | 6 | 24356996 | DCDC2; KAAG1 | NM_016356; NM_181337 | Body; TSS200 | chr6: 24357719-24358309 | N_Shore |
| cg21584710 | | 1 | 37 | 17 | 72306141 | DNAI2 | NM_023036 | Body | | |
| cg21584983 | 1 | | 37 | 19 | 11640070 | ECSIT; ECSIT; ECSIT; ECSIT | NM_001142464; NR_024551; NM_001142465; NM_016581 | TSS200; TSS1500; TSS200; TSS1500 | chr19: 11639614-11639897 | S_Shore |
| cg21584983 | | 1 | 37 | 19 | 11640070 | ECSIT; ECSIT; ECSIT; ECSIT | NM_001142464; NR_024551; NM_001142465; NM_016581 | TSS200; TSS1500; TSS200; TSS1500 | chr19: 11639614-11639897 | S_Shore |
| cg21590497 | 1 | | 37 | 19 | 23299649 | | | | chr19: 23299727-23300167 | N_Shore |
| cg21593588 | 1 | | 37 | 4 | 109574236 | OSTC | NM_021227 | Body | chr4: 109571693-109572039 | S_Shelf |
| cg21643086 | 15 | 12 | 37 | 6 | 27243037 | | | | | |
| cg21643086 | | | 37 | 6 | 27243037 | | | | | |
| cg21686797 | 1 | | 37 | 6 | 30303645 | TRIM39; TRIM39 | NM_172016; NM_021253 | Body; Body | chr15: 92459266-92459678 | S_Shelf |
| cg21715599 | 1 | | 37 | 15 | 92463554 | SLCO3A1; SLCO3A1 | NM_145044; NM_013272 | Body; Body | chr6: 24357719-24358309 | N_Shore |
| cg21729798 | | 1 | 37 | 6 | 24357078 | DCDC2; KAAG1 | NM_016356; NM_181337 | Body; TSS200 | chr4: 8271214-8272091 | Island |
| cg21737039 | 1 | | 37 | 4 | 8271391 | HTRA3 | NM_053044 | TSS200 | chr4: 8271214-8272091 | Island |
| cg21737039 | | 2 | 37 | 4 | 8271391 | HTRA3 | NM_053044 | TSS200 | chr14: 60336951-60337461 | S_Shore |
| cg21857885 | 3 | | 37 | 14 | 60337864 | RTN1 | NM_021136 | TSS1500 | chr14: 60336951-60337461 | S_Shore |
| cg21857885 | | 2 | 37 | 14 | 60337864 | RTN1 | NM_021136 | TSS1500 | chr16: 2185139-2186406 | Island |
| cg21947488 | 2 | | 37 | 16 | 2185289 | PKD1; PKD1 | NM_001009944; NM_000296 | Body; Body | chr16: 2185139-2186406 | Island |
| cg21947488 | | 2 | 37 | 16 | 2185289 | PKD1; PKD1 | NM_001009944; NM_000296 | Body; Body | | |
| cg22028161 | | 1 | 37 | 2 | 95658954 | | | | | |
| cg22078976 | 1 | | 37 | 20 | 58515561 | C20orf177; C20orf177; PPP1R3D | NM_022106; NM_022106; NM_006242 | 1stExon; 5UTR; TSS1500 | chr20: 58514071-58515636 | Island |
| cg22079902 | | 1 | 37 | 5 | 23507644 | PRDM9 | NM_020227 | TSS200 | | |
| cg22169384 | | 2 | 37 | 12 | 129417623 | GLT1D1 | NM_144669 | Body | | |
| cg22199410 | 1 | | 37 | 12 | 51985016 | SCN8A | NM_014191 | Body | chr12: 51984474-51985284 | Island |
| cg22205573 | 4 | | 37 | 13 | 113968561 | LAMP1 | NM_005561 | Body | | |
| cg22205573 | | 1 | 37 | 13 | 113968561 | LAMP1 | NM_005561 | Body | | |

TABLE 5-continued

| TargetID | Beta counts | M counts | GENOME BUILD | CHR | MAPINFO | UCSC_REFGENE_NAME | UCSC_REFGENE_ACCESSION | UCSC_REFGENE_GROUP | UCSC_CPG_ISLANDS_NAME | RELATION_TO_UCSC_CPG_ISLAND |
|---|---|---|---|---|---|---|---|---|---|---|
| cg22240520 | 1 | | 37 | 7 | 158855297 | VIPR2 | NM_003382 | Body | chr7: 158856817-158857209 | N_Shore |
| cg22380533 | | 1 | 37 | 19 | 55690741 | SYT5 | NM_003180 | 5UTR | chr19: 55690182-55691623 | Island |
| cg22384904 | | 1 | 37 | 1 | 227975220 | | | | chr1: 227975295-227976570 | N_Shore |
| cg22389137 | 1 | | 37 | 4 | 113432227 | | | | chr4: 113431825-113432596 | Island |
| cg22491379 | 2 | | 37 | 2 | 120553625 | PTPN4 | NM_002830 | 5UTR | | |
| cg22491379 | | 1 | 37 | 2 | 120553625 | PTPN4 | NM_002830 | 5UTR | | |
| cg22499893 | 1 | | 37 | 1 | 24307535 | SFRS13A; SFRS13A | NM_054016; NM_006625 | TSS1500; TSS1500 | chr1: 24306363-24307017 | S_Shore |
| cg22510362 | 1 | | 37 | 16 | 87251839 | | | | chr6: 87251634-87251840 | Island |
| cg22630628 | 1 | | 37 | 10 | 73337125 | CDH23; CDH23 | NM_052836; NM_022124 | Body; Body | | |
| cg22657457 | | 1 | 37 | 5 | 75469969 | SV2C | NM_014979 | Body | chr5: 75469968-75470173 | Island |
| cg22730967 | 1 | | 37 | 1 | 203097454 | ADORA1; ADORA1 | NM_001048230; NM_000674 | 5UTR; 5UTR | chr1: 203097233-203097496 | Island |
| cg22730967 | | 1 | 37 | 1 | 203097454 | ADORA1; ADORA1 | NM_001048230; NM_000674 | 5UTR; 5UTR | chr1: 203097233-203097496 | Island |
| cg22791936 | 1 | | 37 | 6 | 137243410 | SLC35D3; SLC35D3 | NM_001008783; NM_001008783 | 1stExon; 5UTR | chr6: 137242315-137245442 | Island |
| cg22819135 | 1 | | 37 | 5 | 41920822 | C5orf51 | NM_075921 | 3UTR | | |
| cg22821289 | 1 | | 37 | 11 | 115581830 | | | | | |
| cg22827060 | 1 | | 37 | 13 | 30424359 | UBL3; UBL3 | NM_007106; NM_007106 | 1stExon; 5UTR | chr13: 30423921-30424941 | Island |
| cg22836434 | | 1 | 37 | 11 | 86014570 | C11orf73; C11orf73; C11orf73 | NM_016401; NR_024597; NR_024596; NR_024598 | Body; Body; Body | | |
| cg22856949 | | | 37 | 10 | 127408044 | C10orf137 | NM_015608 | TSS200 | chr10: 127407627-127408566 | Island |
| cg22877380 | | 1 | 37 | 2 | 131804299 | ARHGEF4; ARHGEF4 | NM_032995; NM_015320 | 3UTR; 3UTR | | |
| cg22963777 | 1 | | 37 | 20 | 34115350 | C20orf173; C20orf173 | NM_001145350; NR026933 | 3UTR; Body | | |
| cg23013894 | | | 37 | 5 | 5025912 | | | | | |
| cg23067355 | | 1 | 37 | 6 | 125425012 | | | | chr6: 125420743-125421141 | S_Shelf |
| cg23078194 | 1 | | 37 | 6 | 27661566 | | | | | |
| cg23146197 | | 1 | 37 | 12 | 66271002 | HMGA2; HMGA2 | NM_003484; NM_003483 | Body; Body | chr8: 145555342-145562310 | Island |
| cg23191118 | | 1 | 37 | 8 | 145560718 | SCRT1 | NM_031309 | TSS1500 | chr10: 95653641-95654181 | N_Shore |
| cg23210118 | | 1 | 37 | 10 | 95653378 | TMEM20; TMEM20 | NM_153226; NM_001134658 | TSS1500; TSS1500 | chr1: 11865462-11866566 | Island |
| cg23226134 | | 5 | 37 | 1 | 11866389 | CLCN6; CLCN6; CLCN6; MTHFR | NM_001286; NM_021737; NM_021735; NM_021736; NM_005957 | 1stExon; 1stExon; 1stExon; TSS1500 | | |
| cg23232056 | 1 | | 37 | 1 | 121461578 | | | | | |
| cg23239690 | 3 | | 37 | 10 | 131505815 | MGMT | NM_002412 | Body | | |
| cg23239690 | | 1 | 37 | 10 | 131505815 | MGMT | NM_002412 | Body | | |
| cg23275972 | 1 | | 37 | 7 | 157224017 | | | | chr1: 45265534-45266783 | N_Shelf |
| cg23283362 | 1 | | 37 | 1 | 45263371 | | | | chr8: 38088735-38089956 | Island |
| cg23285761 | 2 | | 37 | 8 | 38089462 | DDHD2; DDHD2; DDHD2 | NM_015214; NM_001164234; NM_001164232 | 5UTR; 5UTR; TSS200 | | |
| cg23350744 | 1 | | 37 | 5 | 122422098 | GADD45A | NM_001924 | TSS1500 | chr5: 122424337-122424539 | N_Shelf |
| cg23369529 | | 1 | 37 | 1 | 68149989 | PARP15; PARP15 | NM_001113523; NM_001113523 | 5UTR; 1stExon | chr1: 68150913-68152270 | N_Shore |
| cg23442853 | | 1 | 37 | 3 | 122296488 | | | | chr3: 122296612-122296828 | N_Shore |
| cg23465289 | 1 | | 37 | 5 | 54909384 | | | | | |
| cg23509665 | | 2 | 37 | 7 | 158293697 | PTPRN2; PTPRN2 | NM_002847; NM_130842; NM_130843 | Body; Body; Body | | |
| cg23517116 | | | 37 | 8 | 65499841 | | | | chr8: 65499748-65500145 | Island |
| cg23574427 | 1 | 1 | 37 | 4 | 122746245 | BBS7; CCNA2 | NM_176824; NM_001237 | 3UTR; TSS1500 | chr4: 122744557-122745267 | S_Shore |
| cg23645639 | 1 | | 37 | 19 | 21203403 | ZNF430 | NM_025189 | TSS200 | | |
| cg23660155 | 1 | | 37 | 1 | 22915626 | | | | | |
| cg23692620 | 1 | | 37 | 19 | 19971862 | EPHA8; EPHA8 | NM_001006943; NM_020526 | Body; Body | chr19: 19971577-19971863 | Island |
| cg23730260 | | 1 | 37 | 11 | 8290409 | | | | chr11: 8289532-8290322 | S_Shore |

TABLE 5-continued

| TargetID | GENOME BUILD | CHR | MAPINFO | UCSC_REFGENE_NAME | UCSC_REFGENE_ACCESSION | UCSC_REFGENE_GROUP | UCSC_CPG_ISLANDS_NAME | RELATION_TO_UCSC_CPG_ISLAND | Beta counts | M counts |
|---|---|---|---|---|---|---|---|---|---|---|
| cg23777173 | 37 | 12 | 132698353 | GALNT9 | NM_001122636 | Body | chr12: 132696661-132697724 | S_Shore | | 2 |
| cg23802518 | 37 | 10 | 80827482 | ZMIZ1; LOC283050; LOC283050; LOC283050 | NM_020338; NR024431; NR024429; NR015429 | TSS1500; TSS1500; TSS1500; TSS1500 | chr10: 80827070-80830537 | Island | | 1 |
| cg23813156 | 37 | 20 | 47935243 | | | | chr20: 47934839-47935684 | Island | | 1 |
| cg23837438 | 37 | 10 | 135132457 | | | | chr10: 135132006-135132458 | Island | | 1 |
| cg23951961 | 37 | 4 | 42154912 | BEND4; BEND4 | NM_207406; NM_001159547 | TSS200; TSS200 | chr4: 42152766-42154984 | Island | 1 | |
| cg23970785 | 37 | 16 | 11036526 | DEXI | NM_014015 | TSS1500 | chr16: 11035496-11036696 | Island | 1 | |
| cg24030735 | 37 | 17 | 10533089 | MYH3 | NM_002470 | Body | | | | 1 |
| cg24099067 | 37 | 6 | 26758750 | | | | | | | 1 |
| cg24177983 | 37 | 11 | 2398403 | CD81 | NM_004356 | TSS200 | chr1: 2398223-2399598 | Island | | 1 |
| cg24216966 | 37 | 6 | 31540121 | LTA; LTA; LTA | NM_000595; NM_001159740; NM_000595 | 1stExon; 5UTR; 5UTR | | | | 1 |
| cg24243790 | 37 | 4 | 9760736 | | | | | | | 1 |
| cg24285811 | 37 | 9 | 139143869 | | | | chr9: 139143508-139144429 | Island | | |
| cg24300033 | 37 | 2 | 241640149 | | | | chr2: 241640409-241641359 | N_Shore | | |
| cg24330818 | 37 | 13 | 33002388 | N4BP2L1; N4BP2L1 | NM_052818; NM_001079691 | TSS200; TSS200 | chr13: 33001249-33002078 | S_Shore | | |
| cg24364491 | 37 | 6 | 32806906 | TAP2; TAP2 | NM_018833; NM_000544 | TSS1500; TSS1500 | chr6: 32806284-32806669 | S_Shore | 2 | |
| cg24408706 | 37 | 11 | 363484 | | | | | | | 2 |
| cg24453123 | 37 | 15 | 35374148 | | | | | | 1 | |
| cg24453123 | 37 | 15 | 35374148 | | | | | | | 1 |
| cg24533904 | 37 | 1 | 184467193 | C1orf21 | NM_030806 | Body | | | | 1 |
| cg24541871 | 37 | 2 | 55845713 | SMEK2; SMEK2 | NM_001122964; NM_020463 | TSS1500; TSS1500 | chr2: 55844267-55845065 | S_Shore | | 1 |
| cg24547359 | 37 | 1 | 53975500 | GLIS1 | NM_147193 | Body | | | 1 | |
| cg24550933 | 37 | 1 | 111932556 | LOC441897 | NR_029429 | TSS200 | | | 1 | |
| cg24563317 | 37 | 8 | 48872822 | MCM4; MCM4; PRKDC; PRKDC | NM_005914; NM_182746; NM_006904; NM_001081640 | TSS1500; TSS1500; TSS200; TSS200 | chr8: 48872458-48873907 | Island | | 1 |
| cg24594224 | 37 | 6 | 33136015 | COL11A2; COL11A2; COL11A2 | NM_080679; NM_080681; NM_080680 | Body; Body; Body | | | | 1 |
| cg24629356 | 37 | 1 | 35122551 | | | | | | 1 | |
| cg24706188 | 37 | 8 | 55088456 | | | | | | | 1 |
| cg24710435 | 37 | 10 | 14543847 | | | | | | | 1 |
| cg24734300 | 37 | 7 | 35677335 | HERPUD2 | NM_022373 | Body | | | 1 | |
| cg24766104 | 37 | 19 | 16309072 | AP1M1; AP1M1 | NM_032493; NM_001130524 | Body; Body | chr19: 16308557-16309313 | Island | 1 | |
| cg24766104 | 37 | 19 | 16309072 | AP1M1; AP1M1 | NM_032493; NM_001130524 | Body; Body | chr19: 16308557-16309313 | Island | | 2 |
| cg24779831 | 37 | 2 | 2799370 | | | | | | 1 | |
| cg24794433 | 37 | 9 | 124462172 | DAB2IP | NM_032552 | Body | chr9: 124461797-124462190 | Island | 1 | |
| cg24811352 | 37 | 5 | 140529499 | PCDHB6 | NM_018939 | TSS1500 | chr5: 140531157-140532017 | N_Shore | 1 | |
| cg24839562 | 37 | 6 | 31673423 | LY6G6F | NM_001003693 | TSS1500 | chr6: 31670594-31671274 | S_Shelf | 1 | |
| cg24856050 | 37 | 19 | 3192433 | NCLN | NM_020170 | Body | chr19: 3192416-3192705 | Island | | |
| cg24864663 | 37 | 15 | 43532243 | TGM5; TGM5 | NM_201631; NM_004245 | Body; Body | | | 1 | |
| cg24891539 | 37 | 8 | 55370407 | SOX17 | NM_022454 | TSS200 | chr8: 55370170-55372525 | Island | 3 | |
| cg24891539 | 37 | 8 | 55370407 | SOX17 | NM_022454 | TSS200 | chr8: 55370170-55372525 | Island | | 1 |
| cg24917945 | 37 | 10 | 120514927 | C10orf46 | NM_153810 | TSS200 | chr10: 120513949-120515108 | Island | 1 | |
| cg24968786 | 37 | 11 | 66360800 | CCDC87; CCS | NM_018219; NM_005125 | TSS1500; Body | chr11: 66360097-66360834 | Island | | |
| cg25013910 | 37 | 2 | 1478219 | TPO; TPO; TPO | NM_175719; NM_000547; NM_175721; NM_175722 | Body; Body; Body; Body | chr2: 1480758-1481631 | N_Shelf | 1 | |

TABLE 5-continued

| TargetID | Beta counts | M counts | GENOME BUILD | CHR | MAPINFO | UCSC_REFGENE_NAME | UCSC_REFGENE_ACCESSION | UCSC_REFGENE_GROUP | UCSC_CPG_ISLANDS_NAME | RELATION_TO_UCSC_CPG_ISLAND |
|---|---|---|---|---|---|---|---|---|---|---|
| cg25025455 | 1 | | | 3 | 134204912 | CEP63; CEP63; ANAPC13; CEP63; CEP63; ANAPC13 | NM_001042383; NM_001042400; NR_024400; NM_001042384; NM_025180; NM_015391; NM_001042400; NR_024401 | 5UTR; 5UTR; TSS200; 5UTR; TSS200; TSS200; 1stExon; TSS200 | chr3: 134204520-134205439 | Island |
| cg25092989 | 1 | | 37 | 8 | 10932494 | XKR6 | NM_173683 | Body | chr8: 10928984-10929211 | S_Shelf |
| cg25100962 | | 2 | 37 | 12 | 31782808 | | | | | |
| cg25124476 | 1 | | 37 | 7 | 150497738 | TMEM176B; TMEM176B; TMEM176A; TMEM176B; TMEM176B | NM_001101312; NM_0011101314; NM_018487; NM_014020; NM_001101311 | TSS200; TSS200; TSS200; 5UTR; TSS200 | chr7: 150496809-150498206 | Island |
| cg25149069 | 2 | 2 | 37 | 1 | 233464229 | KIAA1804 | NM_032435 | 1stExon | chr1: 233463526-233464414 | Island |
| cg25154733 | 2 | 2 | 37 | 13 | 28965632 | FLT1; FLT1; FLT1 | NM_001159920; NM_001160030; NM_002019 | Body; Body; Body | | |
| cg25161386 | | 1 | 37 | 17 | 27621177 | NUFIP2 | NM_020772 | TSS200 | chr17: 27621169-27621455 | Island |
| cg25181381 | 1 | | 37 | 11 | 134373655 | | | | | |
| cg25193384 | 1 | | 37 | 7 | 39837692 | | | | chr7: 39833494-39833725 | S_Shelf |
| cg25194328 | | 1 | 37 | 5 | 54472477 | | | | chr5: 54468783-54469324 | S_Shelf |
| cg25206705 | 2 | | 37 | 17 | 1082774 | ABR; ABR | NM_021962; NM_001159746 | Body; 5UTR | chr17: 1082376-1083833 | Island |
| cg25236028 | 1 | | 37 | 17 | 767334 | NXN | NM_022463 | Body | | |
| cg25246158 | 1 | | 37 | 19 | 1940184 | CSNK1G2 | NM_001319 | TSS1500 | chr19: 1940303-1941940 | N_Shore |
| cg25259296 | | 1 | 37 | 21 | 43235862 | PRDM15; PRDM15 | NM_022115; NM_001040424 | Body; Body | chr21: 43236025-43236510 | N_Shelf |
| cg25328184 | 1 | | 37 | 5 | 110406414 | TSLP | NM_033035 | TSS1500 | chr5: 110408704-110409039 | N_Shelf |
| cg25328184 | | 1 | 37 | 5 | 110406414 | TSLP | NM_033035 | TSS1500 | chr5: 110408704-110409039 | N_Shelf |
| cg25334660 | | 1 | 37 | 8 | 42270520 | | | | chr8: 42268436-42268759 | S_Shore |
| cg25356214 | 2 | | 37 | 12 | 51611871 | POU6F1 | NR_026893 | TSS1500 | chr12: 51610892-51611724 | S_Shore |
| cg25367905 | | 1 | 37 | 5 | 176790350 | RGS14 | NM_006480 | Body | chr5: 176789978-176790296 | S_Shore |
| cg25370231 | | 1 | 37 | 10 | 13391182 | SEPHS1 | NM_012247 | TSS1500 | | |
| cg25402787 | 1 | | 37 | 15 | 53084679 | | | | chr15: 53086629-53086858 | N_Shore |
| cg25409448 | 2 | | 37 | 19 | 49558849 | CGB7; CGB7 | NM_033142; NM_001488 | 5UTR; 1stExon | chr19: 49559222-49560497 | N_Shelf |
| cg25417551 | | 1 | 37 | 17 | 35767582 | TADA2A; TADA2A; ACACA; TADA2A; ACACA; TADA2A; TADA2A | NM_033142; NM_001488; NM_198834; NM_001166105; NM_198839; NM_001488; NM_133439 | 1stExon; 1stExon; TSS1500; 5UTR; TSS1500; 5UTR; 5UTR | chr7: 357666664-35767335 | S_Shore |
| cg25427880 | | 1 | 37 | 10 | 102322128 | | | | chr10: 102321832-102322395 | Island |
| cg25456593 | 1 | | 37 | 11 | 70672858 | SHANK2 | NM_012309 | Body | chr11: 70672834-70673055 | Island |
| cg25502179 | 1 | | 37 | 3 | 46875342 | PRSS42 | NM_182702 | Body | chr3: 46874892-46875769 | Island |
| cg25545088 | | 1 | 37 | 6 | 43398446 | ABCC10 | NM_033450 | TSS1500 | chr6: 43395188-43395894 | S_Shelf |
| cg25550629 | 1 | | 37 | 12 | 53546895 | | | | | |
| cg25714381 | | 1 | 37 | 7 | 76751893 | CCDC146 | NM_020879 | TSS200 | chr7: 76750995-76751394 | S_Shore |
| cg25734864 | 2 | | 37 | 13 | 113812986 | PROZ | NM_003891 | 1stExon | | |
| cg25756867 | | 1 | 37 | 3 | 180042726 | | | | | |
| cg25758828 | 1 | | 37 | 2 | 113976143 | PAX8; PAX8; PAX8; PAX8; LOC440839 | NM_013953; NM_003466; NM_013952; NM_013951; NM_013992; NR_029399 | 3UTR; Body; 3UTR; Body; 3UTR; Body | | |
| cg25778535 | | 1 | 37 | 11 | 8190572 | RIC3; RIC3; RIC3; RIC3 | NM_001135109; NM_024557; NM_001135109; NM_024557 | 1stExon; 5UTR; 5UTR; 1stExon | chr11: 8190226-8190671 | Island |
| cg25803630 | 2 | | 37 | 8 | 29885309 | | | | chr8: 29884771-29885310 | Island |
| cg25820279 | 1 | | 37 | 2 | 177001909 | | | | chr2: 177001221-177001783 | S_Shore |
| cg25824218 | 1 | | 37 | 12 | 25104798 | | | | chr12: 25101607-25102073 | S_Shelf |
| cg25824218 | | 1 | 37 | 12 | 25104798 | | | | chr12: 25101607-25102073 | S_Shelf |

TABLE 5-continued

| TargetID | Beta counts | M counts | GENOME BUILD | CHR | MAPINFO | UCSC_REFGENE_NAME | UCSC_REFGENE_ACCESSION | UCSC_REFGENE_GROUP | UCSC_CPG_ISLANDS_NAME | RELATION_TO_UCSC_CPG_ISLAND |
|---|---|---|---|---|---|---|---|---|---|---|
| cg25839012 | | 1 | 37 | 2 | 219524278 | BCS1L; ZNF142; BCS1L | NM_004328; NM_001105537; NM_001079866 | TSS200; TSS200; TSS200 | chr2: 219523901-219524577 | Island |
| cg25884094 | | 1 | 37 | 8 | 17785204 | PCM1 | NM_006197 | 5UTR | chr8: 17780032-17781272 | S_Shelf |
| cg25894839 | | 1 | 37 | 1 | 161696082 | FCRLB | NM_001002901 | Body | chr1: 161695637-161697298 | Island |
| cg25943588 | | 1 | 37 | 11 | 149933913 | CALCA; CALCA; CALCA | NM_001033952; NM_001033953; NM_001741 | TSS200; TSS200; TSS200 | chr11: 149951128-14995908 | N_Shore |
| cg26003814 | | 3 | 37 | 1 | 16444599 | ACTC1 | NM_005159 | 5UTR | | |
| cg26053864 | 1 | | 37 | 15 | 35087635 | GMNN | NM_015895 | 5UTR | chr6: 24775046-24775729 | S_Shore |
| cg26074111 | 1 | | 37 | 6 | 24776063 | | | | chr7: 20817455-20818227 | Island |
| cg26084511 | | | 37 | 7 | 20818226 | LOC100294362 | NR_029376 | Body | chr17: 78388437-78389722 | N_Shore |
| cg26091183 | 3 | | 37 | 17 | 78387382 | LOC100294362 | NR_029376 | Body | chr17: 78388437-78389722 | N_Shore |
| cg26091183 | | 2 | 37 | 17 | 78387382 | TP73; TP73; TP73 | NM_001126240; NM_005427; NM_001126241 | Body; Body; Body | chr1: 3623318-3623521 | S_Shore |
| cg26105278 | | 1 | 37 | 1 | 3624054 | EFCAB5; EFCAB5; EFCAB5 | NR_026738; NM_198529; NM_001145053 | Body; Body; Body | | |
| cg26114595 | 1 | | 37 | 17 | 28395749 | | | | | |
| cg26129303 | | | 37 | 8 | 142095375 | EFHD1; EFHD1 | NM_025202; NR_027663 | TSS1500; Body | chr2: 233497826-233499727 | Island |
| cg26148236 | 1 | | 37 | 2 | 233497957 | KCTD15; KCTD15; KCTD15 | NM_001129994; NM_024076; NM_001129995 | TSS1500; TSS1500; TSS1500 | chr19: 34286184-34289135 | Island |
| cg26149738 | | 1 | 37 | 19 | 34287125 | EIF4EBP3; ANKHD1-EIF4EBP3 | NM_003732; NM_020690 | TSS1500; Body | chr5: 139927157-139927491 | N_Shore |
| cg26163463 | 1 | | 37 | 5 | 139926773 | ABHD3; ABHD3 | NM_138340; NM_138340 | 1stExon; 5UTR | chr18: 19284165-19285052 | Island |
| cg26203055 | | 2 | 37 | 18 | 19284713 | | | | chr7: 19156050-19158042 | S_Shelf |
| cg26266950 | 2 | | 37 | 7 | 19160621 | ALG10B | NM_001013620 | TSS200 | chr12: 38710392-38710643 | Island |
| cg26384229 | 9 | | 37 | 12 | 38710491 | ALG10B | NM_001013620 | TSS200 | chr12: 38710392-38710643 | Island |
| cg26384229 | | 14 | 37 | 12 | 38710491 | GLIS2 | NM_032575 | Body | | |
| cg26490274 | | 1 | 37 | 16 | 4385435 | KCNQ1; KCNQ1 | NM_181798; NM_000218 | TSS1500; Body | chr6: 164256450-164256062 | Island |
| cg26524638 | 1 | | 37 | 11 | 2481449 | ADAMTS12 | NM_030955 | TSS200 | chr5: 33892191-33892403 | Island |
| cg26541533 | | 1 | 37 | 6 | 164256018 | | | | chr10: 65154656-65157664 | S_Shore |
| cg26573704 | | 2 | 37 | 5 | 33892223 | PWWP2B; PWWP2B | NM_001098637; NM_138499 | Body; Body | chr10: 134218268-134219615 | Island |
| cg26575535 | 1 | | 37 | 16 | 65157839 | GALNTL6; GALNTL6 | NM_001034845; NM_001034845 | 1stExon; 5UTR | chr4: 172734718-172735118 | Island |
| cg26586710 | 1 | | 37 | 10 | 134216688 | THSD7A | NM_015204 | 1stExon | chr7: 118715411-118715535 | |
| cg26588943 | | 2 | 37 | 4 | 172734718 | THSD7A | NM_015204 | 1stExon | | |
| cg26616283 | 1 | | 37 | 7 | 118715535 | NFXL1 | NM_152995 | TSS1500 | chr4: 47915861-47916880 | Island |
| cg26616283 | | 2 | 37 | 7 | 118715535 | | | | | |
| cg26634911 | | 1 | 37 | 4 | 47916863 | FLJ43860 | NM_207414 | TSS200 | | |
| cg26651514 | 1 | | 37 | 13 | 33864734 | | | | | |
| cg26654519 | | | 37 | 8 | 142517494 | LOC100134229; JHDM1D | NR_024451; NM_030647 | Body; TSS1500 | chr7: 139875411-139877493 | Island |
| cg26712605 | | | 37 | 6 | 37745367 | FLJ12825 | NR_026655 | Body | chr12: 54454249-54454458 | Island |
| cg26759552 | 2 | 2 | 37 | 7 | 139877471 | | | | | |
| cg26777456 | | 1 | 37 | 12 | 54454250 | | | | | |
| cg26835440 | 2 | | 37 | 8 | 55037773 | | | | chr6: 168501902-168502790 | Island |
| cg26919149 | 2 | | 37 | 6 | 168501903 | MED18; MED18 | NM_001273750; NM_017638 | 3UTR; 3UTR | chr10: 134891010-134893402 | N_Shore |
| cg26933136 | | 1 | 37 | 1 | 28661842 | RIMBP2 | NM_015347 | Body | chr12: 130908777-130909191 | S_Shore |
| cg26946235 | 2 | | 37 | 10 | 134890799 | ZNF799 | NM_001080821 | TSS200 | chr19: 12511608-12512144 | Island |
| cg26994413 | 1 | | 37 | 12 | 130909408 | | | | chr1: 77191061-77191571 | S_Shore |
| cg27037109 | | | 37 | 19 | 12512034 | SLC38A10; SLC38A10 | NM_001037984; NM_138570 | Body; Body | chr17: 79259282-79259537 | N_Shore |
| cg27042491 | | 2 | 37 | 1 | 77191686 | | | | | |
| cg27062060 | | 1 | 37 | 17 | 79258687 | | | | | |

TABLE 5-continued

| TargetID | Beta counts | M counts | GENOME BUILD | CHR | MAPINFO | UCSC_REFGENE_NAME | UCSC_REFGENE_ACCESSION | UCSC_REFGENE_GROUP | UCSC_CPG_ISLANDS_NAME | RELATION_TO_UCSC_CPG_ISLAND |
|---|---|---|---|---|---|---|---|---|---|---|
| cg27072218 | 1 | | 37 | 13 | 106912755 | | | | | |
| cg27101157 | 1 | | 37 | 17 | 62340122 | TEX2 | NM_018469 | 5UTR | chr17: 62339803-62340799 | Island |
| cg27140170 | | 1 | 37 | 2 | 231280096 | SP100; SP100 | NM_001080391; NM_003113 | TSS1500; TSS1500 | | |
| cg27181253 | | 2 | 37 | 1 | 113051846 | WNT2B; WNT2B; WNT2B | NM_004185; NM_024494; NM_024494 | Body; 1stExon; 5UTR | chr1: 113050813-113052301 | Island |
| cg27207308 | | 1 | 37 | 20 | 47935683 | | | | chr20: 47934839-47935684 | Island |
| cg27313674 | | 1 | 37 | 20 | 6035120 | | | | chr20: 6032675-6033517 | S_Shore |
| cg27323009 | | 1 | 37 | 5 | 110408974 | LRRN4 | NM_152611 | TSS1500 | chr5: 110408704-110409039 | Island |
| cg27343123 | 1 | | 37 | 2 | 62423136 | TSLP; TSLP | NM_138551; NM_033035 | TSS200; Body | chr2: 62422191-62424458 | Island |
| cg27391127 | 1 | | 37 | 10 | 104415919 | B3GNT2 | NM_006577 | TSS200 | chr10: 104416555-104417165 | N_Shore |
| cg27426287 | | 1 | 37 | 10 | 30025782 | TRIM8 | NM_030912 | Body | chr10: 30024072-30026077 | Island |
| cg27445005 | 1 | | 37 | 18 | 76190006 | SVIL | NM_003174 | TSS1500 | chr18: 76189718-76190190 | Island |
| cg27445005 | | 2 | 37 | 18 | 76190006 | | | | chr18: 76189718-76190190 | Island |
| cg27553486 | 1 | | 37 | 7 | 930964 | C7orf20 | NM_015949 | Body | chr7: 930913-931215 | Island |
| cg27633010 | 1 | | 37 | 10 | 135097477 | TUBGCP2 | NM_006659 | Body | chr10: 135097516-135097801 | N_Shore |
| cg27633010 | | 3 | 37 | 10 | 135097477 | TUBGCP2 | NM_006659 | Body | chr10: 135097516-135097801 | N_Shore |
| cg27640020 | 1 | | 37 | 19 | 19002253 | GDF1; LASS1; LASS1 | NM_001492; NM_198207; NM_021267 | 5UTR; Body; Body | chr19: 19006031-19007546 | N_Shelf |
| ch.16.1667936F | 1 | | 36 | 16 | 73947777 | | | | | |
| ch.2.3048096R | 1 | | 36 | 2 | 147986881 | | | | | |

Data preprocessing. Statistical analysis was performed using R (v. 3.5.0). Raw .IDAT files were processed using the minfi package (v. 1.26.2). ILLUMINA® 850k (EPIC) array data were subset to only those sites also included in the 450k array. Preprocessing and normalization were performed using the preprocess Funnorm function. All samples passed internal controls included on each chip and had detection p≤0.01 for ≥97% of cytosine-guanosine dinucleotide (CpG) positions included on each array. Epigenome-wide association studies traditionally have used DNA methylation beta values, defined as the fraction methylation (0-1 scale) for a particular CpG site. Beta values, however, are characterized by high heteroscedasticity (most beta values fall within extreme high- and low-percent methylation levels), and questions have been raised regarding statistical validity of beta value analysis [24]. Therefore, the inventors also analyzed M values (the $\log_2$ ratio of methylated: unmethylated probe intensities for a given CpG site), which are approximately homoscedastic. The inventors excluded from analysis CpG probes located on sex chromosomes, probes with known single nucleotide polymorphisms (SNPs) with minor allele frequency of ≥5%, and probes not detected in all samples, leaving a final n=435,118 CpG sites for analysis in each sample.

Modeling. Elastic-net regularized generalized linear models were developed using the glmnet package (v. 2.0-16). As model overfitting is a frequently-occurring problem when developing classifiers on high-dimensional data, the inventors implemented three strategies to reduce potential overfitting. First, the inventors performed 7-fold internal cross-validation during development via the cv.glmnet function, utilizing the 'one standard error rule' when selecting lambda values [69]. Second, the inventors tested models on lockbox data not used for training (FIG. 2). Finally, the inventors repeated the model development and testing with 40 cycles of random splits of data into development and lockbox (validation) subsets. During each cycle of development, data were first randomly split into 60% development and 40% lockbox sets. Development data were then used to generate regularized cross-validated models and these models were tested on lockbox data and performance characteristics recorded. Model performance was assessed by the mean c-statistic (area under the receiver operator characteristic curve AUC-ROC), diagnostic odds ratio, accuracy, sensitivity, and specificity. The identity of DNA methylation sites (features) selected by glmnet for inclusion in each model, and the total number of sites required by each model, were recorded and compared. The performance of models by chip type (450k vs. 850k) was assessed by comparing accuracies using Fisher's exact test of a 2×2 contingency table.

Ontology analysis. Genes associated with CpG sites selected at least once during model development (n=969) were analyzed using Ingenuity Pathway Analysis (IPA, QIAGEN®) v. 48207413 build 2019 Jun. 16 using default settings.

Case and control eligibility and Selection Process.
1. Subject Inclusion:
   1.1. A subject with one or two knees with symptomatic OA that are eligible to be a Fast Progressor and/or a Non Progressor**.
   An eligible knee is defined as:
      1.1a. Mild-moderate symptomatic OA at baseline: in the same knee, KLG 2-3 and frequent pain (pain on most days of a month in past year) at baseline.
      1.1b. Medial compartment JSW>=1.5 mm (VooMCMJSW>=1.5) at baseline since at <1.5 mm knee is already close to end stage and further fast progression is less unlikely to be preventable at that point; in addition JSW measurement is less reliable when knee approaches bone on bone.
      1.1c. JSN in medial compartment at baseline is equal to or worse than JSN in lateral compartment.
      1.1d. JSW data at BL, 24 m and 48 m time points. (Exception: Fast Progressor knees can be missing JSW due to a TKR at 36 or 48 m).
      1.1e. Adequate radiographic positioning at BL, 24 and 48 m time points defined as VxxTPCFDS<7.0 mm and change in VxxTPCFDS<2 mm in magnitude BL to 24 m or BL to 48 m.
   1.2. Subjects with only one eligible knee at baseline**:
      1.2a. The contralateral knee KLG is less than or equal to the eligible knee at baseline. (e.g., subjects with a KLG 2 symptomatic eligible knee can have a KLG 0-2 symptomatic or non-symptomatic. If the eligible knee is KLG 3, then the contralataeral knee can be a KLG 0-3 symptomatic or non-symptomatic knee. The contralateral knee must have a baseline medial JSW of >=1.5 mm.
2. Subject Exclusion.
   2.1 TKR in either knee at BL, 12 m or 24 m.
   2.2 RA diagnosis at any visit thru 72 m (RAVISIT is 0, 1, 2, 5, 6 or 8). What about subjects with self-reported psoriatic arthritis, AS, or reactive arthritis? How many are there?
   2.3 Oral Glucocorticoid use reported at >=2 visits from BL to 72 m. How many are there?
3. Classify Eligible Knees of Eligible Subjects as Fast Progressor or Non-Progressor Index Knees.
   3.1 Fast Progressor Index knees: JSW loss of more than 0.7 mm between BL and 24 m and remains narrowed more than 0.7 mm at 48 m or has a TKR by 48 m.
   3.2 Non-Progressor Index knees: JSW loss less than 0.5 mm between BL and 24 m and remains narrowed less than 0.5 mm at 48 m. Knee does not have TKR at 36 m or 48 m and does not have lateral JSN progression through 48 m.
4. Fast Progressor Subjects.
   A Fast Progressor subject has one or two Fast Progressor Index knees.
   For those with one Fast Progressor Index knee the contralateral knee can be:
      4.1 A Non Progressor Index knee with a KLG≤to the KLG of the progressor knee;
      4.2 An ineligible knee (e.g. KLG 0-1, KLG 2-3 nonsymptomatic and KLG≤to the KLG of Progressor knee) that meets Fast Progressor JSW criteria;
      4.3 An ineligible knee that does not meet Fast Progressor criteria and KLG≤to the KLG of Progressor knee; or
      4.4 An ineligible knee that does not meet conditions 1.1b to 1.1e and KLG≤to the KLG of Progressor knee.
5. Non Progressor Subjects
   A Non Progressor Subject has one or two Non Progressor Index knees.
   If a subject has only one Non Progressor Index knee:
      5.1. The contralateral knee cannot be a Fast Progressor Index knee;
      5.2. If the contralateral knee is not an eligible knee, then the contralateral knee must a) have KLG≤to the KLG of Progressor knee, b) allow assessment for Fast Progression (meet conditions 1.1b. to 1.1e.) and c) have JSW loss less than 0.5 mm between BL and 24 m and remain narrowed less than 0.5 mm at 48 m, d) does not have lateral JSN progression by 48 m and e) does not have TKR at 36 m or 48 m.

Example 2. Modeling Method and Development/Validation Sample Selection

Designed to differentiate rapid radiographic and/or pain progressors from nonprogressors. This study utilized the Foundation for the NIH cohort of the OAI using biochemical biomarker data (PMID 27296323).

Development and validation on 464 (to date, estimated 600 upon completion) patients, including 299 rapid radiographic- and/or pain-progressors and 165 nonprogressors. All participants had baseline Kellegren-Lawrence radiographic grade (KLG) of 1-3 in at least one knee without a history of total knee joint replacement through 24-months. Patients with radiographic and/or pain progression by 12-months were excluded.

Case definition. Radiographic progressors had radiographic progression in the medial tibiofemoral compartment by a longitudinal loss in the minimum JSW of at least 0.7 mm from baseline to 24-month follow-up in one index knee, with persistent narrowing in the same index knee at 48 months based on radiographs obtained from a non-fluoroscopic fixed flexion protocol (Synaflexor, Synarc, Newark, CA). Participants with a tibial plateau rim distance of 6.5 mm at baseline, or with a change in the rim distance of >2.0 mm between baseline and follow-up were excluded due to inappropriate and/or unreliable radiographic positioning. Non-radiographic progressors were defined as those with ≤0.5 mm of JSW loss from baseline to 48 months in either knee.

Pain progressors were defined as >=9 points at 2 or more timepoints on the Western Ontario McMasters (WOMAC) pain subscale from the 24-month to 60-month pain assessment.

Controls were frequency matched with cases by age category, sex, race, and BMI category (<25, 25-27.5, 27.5-30, 30-35, and >=35 kg/m2.

DNA methylation assays, PBMC composition assessment and adjustment. Five hundred nanograms of DNA was treated with sodium bisulfite (EZ DNA methylation kit, ZYMO®) and loaded onto ILLUMINA® Infinium HumanMethylation850k arrays. DNA methylation data were corrected for cell count variation using frozen surrogate variable analysis via the sva package (v. 3.28.0).

Data preprocessing. Statistical analysis was performed using R (v. 3.5.0). Raw .IDAT files were processed using the ChAMP package v.2.20.1. Preprocessing and normalization were performed using Beta-Mixture Quantile (BMIQ) normalization. Beta values, defined as the fraction methylation (0-1 scale) for a particular CpG site were used for model development. The inventors excluded from analysis CpG probes located on sex chromosomes, probes with known single nucleotide polymorphisms (SNPs) with minor allele frequency of ≥5%, and probes not detected in all samples, leaving a final n=710,589 CpG sites for analysis in each sample. The simplified method eliminated the need to correct for PBMC composition and batch correction using frozen surrogate variable analysis (fsva). This method also increased the random split to 1:10, and is 10-fold validated, with an increase to 664,736 CpGs+/–gimnet models.

Figure 4:
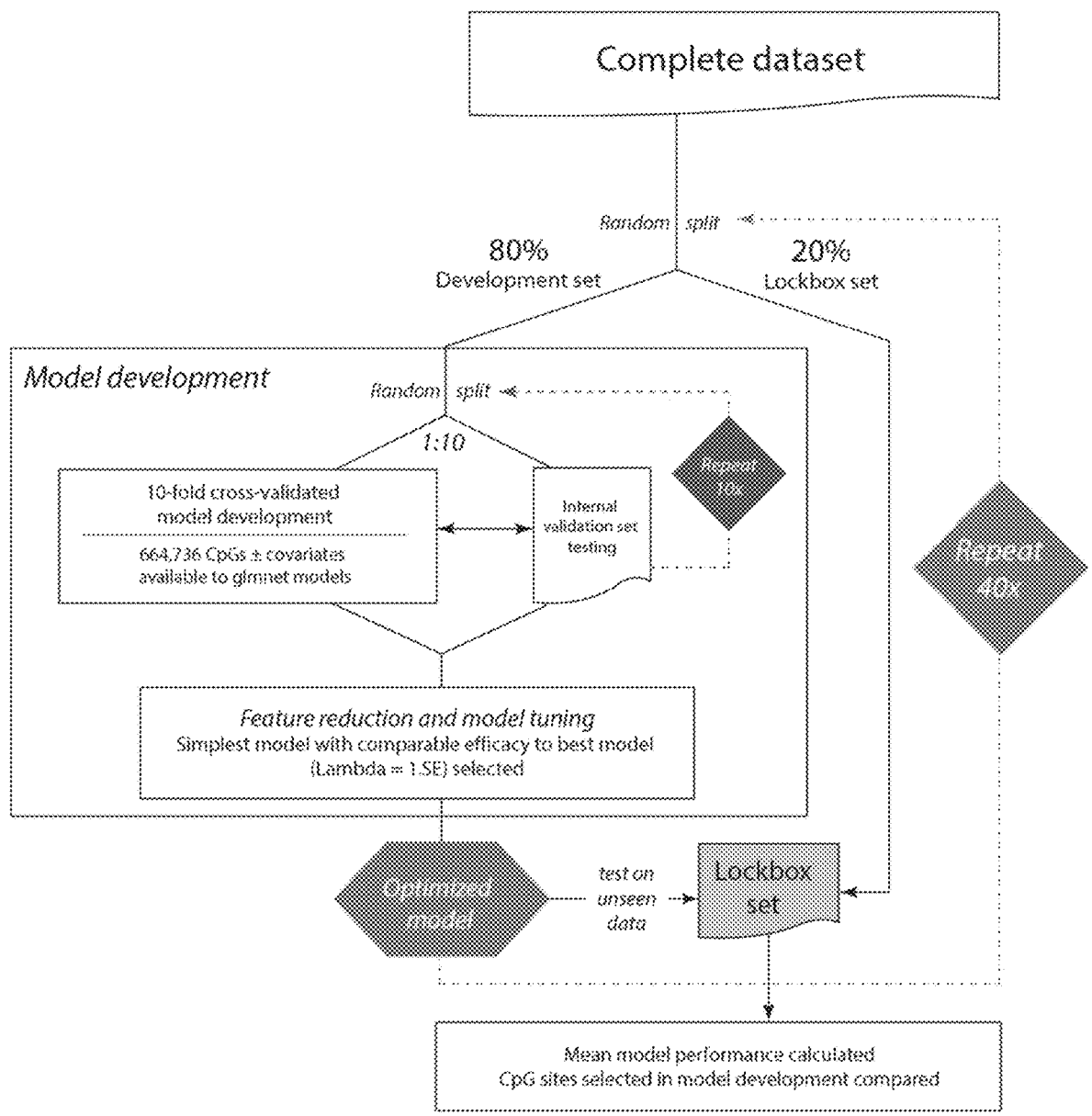
FIG. 4 is a flowchart that shows another Osteoarthritis (OA) rapid progressor PBMC DNA methylation-based machine learning discriminant model development plan.

Modeling. Elastic-net regularized generalized linear models were developed using the glmnet package (v. 2.0-16). First, 10-fold internal cross-validation was performed during development via the cv.glmnet function, utilizing the 'one standard error rule' when selecting lambda values. Second, the models were tested on lockbox data not used for training (FIG. 4). Finally, model development was repeated and tested with 40 cycles of random splits of data into development and lockbox (validation) subsets. During each cycle of development, data were first randomly split into 70% development and 30% lockbox sets. Development data were then used to generate regularized cross-validated models and these models were tested on lockbox data and performance characteristics recorded. Model performance was assessed by the mean c-statistic (area under the receiver operator characteristic curve AUC-ROC), diagnostic odds ratio, accuracy, sensitivity, and specificity. The identity of DNA methylation sites (features) selected by glmnet for inclusion in each model, and the total number of sites required by each model, were recorded and compared.

Differences between the two approaches in Example 1 and 2. Smaller number of development and validation groups in the initial approach. Inclusion of both pain and radiographic progressors in the new approach vs. radiographic progressors only. It is now possible to differentiate pain vs. radiographic vs. dual progressors using a stepwise learning approach. Different/more extensive DNA methylation arrays used for the new approach. Increased cross-validation folds used in the new approach (10 vs. 7). Different development/validation ratio can also be used in the new approach (80/20 vs. 70/30). The CpG sites selected by the new modeling approach were substantially different than the original study (owing to inclusion of pain progressors and much larger number of CpG sites made available to the modeling system with the use of 850k chips).

Additional variations between Example 1 and Example 2. OAI/FNIH samples were DNA obtained from Buffy coat (peripheral blood mononuclear cells+neutrophils). A second set of sample DNA (Johnson County (JoCo)) was obtained from peripheral blood mononuclear cells (no neutrophils). The difference in initial cell type, along with differences in radiographic measurements, contribute to reduced discrimination capability of the models; however, the accuracy the models display even given these differences speak to the robustness of the process and final models. The Beta- and M-models performed equivalently in this new modeling cohort; therefore, models based on beta values (more commonly used in DNA methylation analyses) were utilized.

Johnson County (JoCo) cohort. 121 total participants, 70 progressors, 51 control nonprogressors. Definition of progression (different than previous cohorts given lack of quantitative joint space measurements). Radiographic progressors: Increase in overall radiographic grade (Kellegren-Lawrence Grade, KLG) of at least 1 from baseline to 48 months. Non-radiographic-progressors: No increase, or within-grade increase, in KLG from baseline to 48 months.

TABLE 6

Model expansion and redevelopment (FNIH-OABC cohort (n = 471), JoCo cohort (n = 121)).

|  | FNIH-OABC cohort (mean ± SEM) | JoCo cohort (mean ± SEM) |
| --- | --- | --- |
| ROC-AUC (c-statistic) | 0.94 ± 0.004 | 0.85 ± 0.001 |
| Accuracy | 84 ± 1% | 70 ± 1% |
| Odds ratio | 73 ± 8 | — |
| Sensitivity | 81 ± 1% | — |
| Specificity | 93 ± 1% | — |

Example 3. Peripheral Blood DNA Methylation-Based Machine Learning Models to Predict Future OA Progression As outlined above, baseline peripheral blood cell DNA methylation patterns from a group of patients from the Osteoarthritis Initiative (OAI) and demonstrated methylation-based models distinguish future radiographic progressors from nonprogressors. In this example, the method to the FNIH OsteoArthritis Biomarkers Consortium (OABC) subcohort of the OAI that included pain-, radiographic-, and dual- (both pain and radiographic) progressors compared to nonprogressors controls was used.

Buffy coat DNA was obtained from the OAI from baseline visits of OABC patients (n=600). 500 ng of DNA was bisulfite treated and loaded onto ILLUMINA® EPIC arrays then imaged by the Clinical Genomics Center at the Oklahoma Medical Research Foundation. Raw data were extracted and Beta-Mixture Quantile (BMIQ) normalized using the Chip Analysis Methylation Pipeline (ChAMP) package. 46 samples were eliminated due to low quality or sex mismatch leaving 81 radiographic-, 91 pain-, 193 dual-, and 189 non-progressors. Elastic net-penalized generalized linear models (GLMs) were then developed. Following a 70%-development, 30%-validation data split, GLMs underwent further internal 10-fold cross validation and optimized models were tested on validation data. Model development was repeated for a total of 40 randomized data splits and mean performance calculated. Supervised 'reduced' models were developed by reducing the dataset to include those CpG sites selected in ≥10/40 development rounds in the any-vs. nonprogressor comparison (n=13 CpGs). An independent radiographic progressor validation cohort was obtained from the Johnston County Osteoarthritis Project (JoCo), including 89 future progressors (≥1 K/L grade worsening at 48 mo or joint replacement) and 56 nonprogressors (no- or within-grade K/L worsening). Peripheral blood mononuclear cells methylation was quantified, 33 samples were removed due to low quality. Models were also tested on DNA methylation data from our previous peripheral blood methylation publication, including 27 radiographic-only and 28 nonprogressors from the OAI cohort.

Baseline buffy coat DNA methylation patterns accurately predicted future radiographic (accuracy 87%±0.8% mean±SEM, see Table 7 for AUC-ROC c-statistic, pain (89%±0.9%), dual radiographic+pain (72%±0.7%), and 'all' progressors (radiographic, pain, or dual) (78%±0.4%). Intriguingly, pain-only and radiographic-only progressors were not reliably distinguished (accuracy 58%±1%). The inclusion of demographic characteristics did not alter model performance, nor the addition of baseline serum/urine analytes, nor the inclusion of methylation array batch data. Models included a mean of 13±1 CpG sites. Supervised reduced models including 13 CpG sites (cg04195161, cg22064129, cg04985016, cg12692919, cg04043957, cg08872579, cg02019955, cg01333532, cg23705082, cg05042110, cg00715363, cg01307007 and cg09239099) had similar discriminatory capability (Table 7). Despite differences in the definition of radiographic progression and the cell type input (buffy coat vs. PBMC) in the JoCo cohort, models accurately discriminated radiographic progressors from nonprogressors (81%±0.3%). Models also performed accurately when applied to our previous OAI DNA methylation dataset (80% 0.3%).

These results confirm the predictive capability of peripheral blood-based DNA methylation models in a large cohort of OA patients and confirmed these findings in two independent cohorts. These data show that a pain and structural progression share early systemic immune epigenotypes.

TABLE 7

| | Model performance characteristics | | | |
|---|---|---|---|---|
| | Unsupervised 'full' models | | Supervised 'reduced' models | |
| Comparison groups | Accuracy (mean ± SEM) | AUC-ROC (mean ± SEM) | Accuracy (mean ± SEM) | AUC-ROC (mean ± SEM) |
| Radiographic-only vs. nonprogressor | 87% ± 0.8% | 0.94 ± 0.004 | 89% ± 0.5% | 0.94 ± 0.003 |
| Pain-only vs. nonprogressor | 89% ± 0.9% | 0.97 ± 0.004 | 90% ± 0.7% | 0.95 ± 0.005 |
| Dual- vs. nonprogressor | 72% ± 0.7% | 0.79 ± 0.006 | 76% ± 0.6% | 0.85 ± 0.005 |
| Any (pain/radiographic/dual) vs. nonprogressor | 78% ± 0.4% | 0.86 ± 0.004 | 82% ± 0.3% | 0.89 ± 0.003 |
| Radiographic-only vs. pain-only | 0.58% ± 1% | 0.62 ± 0.01 | n/a | n/a |
| JoCo cohort: radiographic-only vs. nonprogressor | | | 81% ± 0.3% | 0.89 ± 0.002 |
| OAI cohort from our previous study: radiographic-only vs. nonprogressor | | | 80% ± 0.4% | 0.89 ± 0.002 |

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB.

Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Field of Invention," such claims should not be limited by the language under this heading to describe the so-called technical field. Further, a description of technology in the "Background of the Invention" section is not to be construed as an admission that technology is prior art to any invention(s) in this disclosure. Neither is the "Summary" to be considered a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

To aid the Patent Office, and any readers of any patent issued on this application in interpreting the claims appended hereto, applicants wish to note that they do not intend any of the appended claims to invoke paragraph 6 of 35 U.S.C. § 112, U.S.C. § 112 paragraph (f), or equivalent, as it exists on the date of filing hereof unless the words "means for" or "step for" are explicitly used in the particular claim.

For each of the claims, each dependent claim can depend both from the independent claim and from each of the prior dependent claims for each and every claim so long as the prior claim provides a proper antecedent basis for a claim term or element.

REFERENCES

1. Vos T, Flaxman A D, Naghavi M, Lozano R, Michaud C, Ezzati M, et al. Years lived with disability (YLDs) for 1160 sequelae of 289 diseases and injuries 1990-2010: a systematic analysis for the Global Burden of Disease Study 2010. Lancet. 2012; 380: 2163-2196.
2. Centers for Disease Control and Prevention (CDC). Prevalence of doctor-diagnosed arthritis and arthritis-attributable activity limitation—United States, 2010-2012. MMWR Morb Mortal Wkly Rep. 2013; 62: 869-873.
3. Singh J A, Saag K G, Bridges S L Jr, Akl E A, Bannuru R R, Sullivan M C, et al. 2015 American College of Rheumatology Guideline for the Treatment of Rheumatoid Arthritis. Arthritis Rheumatol. 2016; 68: 1-26.
4. Ramos Y F M, Bos S D, Lakenberg N, Böhringer S, den Hollander W J, Kloppenburg M, et al. Genes expressed in blood link osteoarthritis with apoptotic pathways. Ann Rheum Dis. 2014; 73: 1844-1853.
5. Li J, Lan C-N, Kong Y, Feng S-S, Huang T. Identification and Analysis of Blood Gene Expression Signature for Osteoarthritis With Advanced Feature Selection Methods. Front Genet. 2018; 9: 246.
6. Huang Z Y, Perry E, Huebner J L, Katz B, Li Y-J, Kraus V B. Biomarkers of inflammation—LBP and TLR—predict progression of knee osteoarthritis in the DOXY clinical trial. Osteoarthritis Cartilage. 2018. doi:10.1016/j.joca.2018.08.005

7. Hunter D, Nevitt M, Lynch J, Kraus V B, Katz J N, Collins J E, et al. Longitudinal validation of periarticular bone area and 3D shape as biomarkers for knee OA progression? Data from the FNIH OA Biomarkers Consortium. Ann Rheum Dis. 2016; 75: 1607-1614.
8. Hunter D J, Nevitt M, Losina E, Kraus V. Biomarkers for osteoarthritis: current position and steps towards further validation. Best Pract Res Clin Rheumatol. 2014; 28: 61-71.
9. Kraus V B, Collins J E, Hargrove D, Losina E, Nevitt M, Katz J N, et al. Predictive validity of biochemical biomarkers in knee osteoarthritis: data from the FNIH OA Biomarkers Consortium. Ann Rheum Dis. 2016. doi: 10.1136/annrheumdis-2016-209252
10. de Andres M C, Perez-Pampin E, Calaza M, Santaclara F J, Ortea I, Gomez-Reino J J, et al. Assessment of global DNA methylation in peripheral blood cell subpopulations of early rheumatoid arthritis before and after methotrexate. Arthritis Res Ther. 2015; 17: 233.
11. Zhao M, Zhou Y, Zhu B, Wan M, Jiang T, Tan Q, et al. IFI44L promoter methylation as a blood biomarker for systemic lupus erythematosus. Ann Rheum Dis. 2016; 75: 1998-2006.
12. Toperoff G, Aran D, Kark J D, Rosenberg M, Dubnikov T, Nissan B, et al. Genome-wide survey reveals predisposing diabetes type 2-related DNA methylation variations in human peripheral blood. Hum Mol Genet. 2012; 21: 371-383.
13. Nakatochi M, Ichihara S, Yamamoto K, Naruse K, Yokota S, Asano H, et al. Epigenome-wide association of myocardial infarction with DNA methylation sites at loci related to cardiovascular disease. Clin Epigenetics. 2017; 9: 54.
14. Rushton M D, Reynard L N, Barter M J, Refaie R, Rankin K S, Young D A, et al. Characterization of the cartilage DNA methylome in knee and hip osteoarthritis. Arthritis Rheumatol. 2014; 66: 2450-2460.
15. den Hollander W, Ramos Y F M, Bos S D, Bomer N, van der Breggen R, Lakenberg N, et al. Knee and hip articular cartilage have distinct epigenomic landscapes: implications for future cartilage regeneration approaches. Ann Rheum Dis. 2014; 73: 2208-2212.
16. Jeffries M A, Donica M, Baker L W. Genome☐Wide DNA Methylation Study Identifies Significant Epigenomic Changes in Osteoarthritic Subchondral Bone and Similarity to Overlying Cartilage. Arthritis. 2016. Available: https://onlinelibrary.wiley.com/doi/abs/10.1002/art.39555
17. Jeffries M A, Donica M, Baker L W. Genome☐wide DNA methylation study identifies significant epigenomic changes in osteoarthritic cartilage. Arthritis. 2014. Available: https://onlinelibrary.wiley.com/doi/abs/10.1002/art.38762
18. Fernández-Tajes J, Soto-Hermida A, Vázquez-Mosquera M E, Cortés-Pereira E, Mosquera A, Fernández-Moreno M, et al. Genome-wide DNA methylation analysis of articular chondrocytes reveals a cluster of osteoarthritic patients. Ann Rheum Dis. 2014; 73: 668-677.
19. LaValley M P, Lo G H, Price L L, Driban J B, Eaton C B, McAlindon T E. Development of a clinical prediction algorithm for knee osteoarthritis structural progression in a cohort study: value of adding measurement of subchondral bone density. Arthritis Res Ther. 2017; 19: 95.
20. Titus A J, Gallimore R M, Salas L A, Christensen B C. Cell-type deconvolution from DNA methylation: a review of recent applications. Hum Mol Genet. 2017; 26: R216-R224.
21. Houseman E A, Accomando W P, Koestler D C, Christensen B C, Marsit C J, Nelson H H, et al. DNA methylation arrays as surrogate measures of cell mixture distribution. BMC Bioinformatics. 2012; 13: 86.
22. Parker H S, Corrada Bravo H, Leek J T. Removing batch effects for prediction problems with frozen surrogate variable analysis. PeerJ. 2014; 2: e561.
23. Kaushal A, Zhang H, Karmaus W J J, Ray M, Torres M A, Smith A K, et al. Comparison of different cell type correction methods for genome-scale epigenetics studies. BMC Bioinformatics. 2017; 18: 216.
24. Du P, Zhang X, Huang C-C, Jafari N, Kibbe W A, Hou L, et al. Comparison of Beta-value and M-value methods for quantifying methylation levels by microarray analysis. BMC Bioinformatics. 2010; 11: 587.
25. Yamashita R, Suzuki Y, Sugano S, Nakai K. Genome-wide analysis reveals strong correlation between CpG islands with nearby transcription start sites of genes and their tissue specificity. Gene. 2005. pp. 129-136. doi: 10.1016/j.gene.2005.01.012
26. Collins J E, Losina E, Nevitt M C, Roemer F W, Guermazi A, Lynch J A, et al. Semiquantitative Imaging Biomarkers of Knee Osteoarthritis Progression: Data From the Foundation for the National Institutes of Health Osteoarthritis Biomarkers Consortium. Arthritis Rheumatol. 2016; 68: 2422-2431.
27. Kraus V B, Collins J E, Charles H C, Pieper C F, Whitley L, Losina E, et al. Predictive Validity of Radiographic Trabecular Bone Texture in Knee Osteoarthritis: The Osteoarthritis Research Society International/Foundation for the National Institutes of Health Osteoarthritis Biomarkers Consortium. Arthritis Rheumatol. 2018; 70: 80-87.
28. Janvier T, Jennane R, Valery A, Harrar K, Delplanque M, Lelong C, et al. Subchondral tibial bone texture analysis predicts knee osteoarthritis progression: data from the Osteoarthritis Initiative: Tibial bone texture & knee OA progression. Osteoarthritis Cartilage. 2017; 25: 259-266.
29. Joseph G B, McCulloch C E, Nevitt M C, Neumann J, Gersing A S, Kretzschmar M, et al. Tool for osteoarthritis risk prediction (TOARP) over 8 years using baseline clinical data, X-ray, and MRI: Data from the osteoarthritis initiative. J Magn Reson Imaging. 2018; 47: 1517-1526.
30. Halilaj E, Le Y, Hicks J L, Hastie T J, Delp S L. Modeling and predicting osteoarthritis progression: data from the osteoarthritis initiative. Osteoarthritis Cartilage. 2018; 26: 1643-1650.
31. Fernandez-Moreno M, Soto-Hermida A, Oreiro N, Pértega S, Fenández-López C, Rego-Pérez I, et al. Mitochondrial haplogroups define two phenotypes of osteoarthritis. Front Physiol. 2012; 3: 129.
32. Fernández-Moreno M, Soto-Hermida A, Vázquez-Mosquera M E, Cortés-Pereira E, Relaño S, Hermida-Gómez T, et al. Mitochondrial DNA haplogroups influence the risk of incident knee osteoarthritis in OAI and CHECK cohorts. A meta-analysis and functional study. Ann Rheum Dis. 2017; 76: 1114-1122.
33. Soto-Hermida A, Fernández-Moreno M, Oreiro N, Fernández-López C, Pértega S, Cortés-Pereira E, et al. Mitochondrial DNA (mtDNA) haplogroups influence the progression of knee osteoarthritis. Data from the Osteoarthritis Initiative (OAI). PLoS One. 2014; 9: e112735.
34. Aref-Eshghi E, Zhang Y, Liu M, Harper P E, Martin G, Furey A, et al. Genome-wide DNA methylation study of hip and knee cartilage reveals embryonic organ and skeletal system morphogenesis as major pathways involved in osteoarthritis. BMC Musculoskelet Disord. 2015; 16: 287.

35. Zhang Y, Fukui N, Yahata M, Katsuragawa Y, Tashiro T, Ikegawa S, et al. Identification of DNA methylation changes associated with disease progression in subchondral bone with site-matched cartilage in knee osteoarthritis. Sci Rep. 2016; 6: 34460.

36. Reynard L N. Analysis of genetics and DNA methylation in osteoarthritis: What have we learnt about the disease? Semin Cell Dev Biol. 2016. doi:10.1016/j.semcdb.2016.04.017

37. Minogue B M, Richardson S M, Zeef L A, Freemont A J, Hoyland J A. Transcriptional profiling of bovine intervertebral disc cells: implications for identification of normal and degenerate human intervertebral disc cell phenotypes. Arthritis Res Ther. 2010; 12: R22.

38. Lodewyckx L, Cailotto F, Thysen S, Luyten F P, Lories R J. Tight regulation of wingless-type signaling in the articular cartilage—subchondral bone biomechanical unit: transcriptomics in Frzb-knockout mice. Arthritis Res Ther. 2012; 14: R16.

39. Lin Q, Weidner C I, Costa I G, Marioni R E, Ferreira M R P, Deary I J, et al. DNA methylation levels at individual age-associated CpG sites can be indicative for life expectancy. Aging. 2016; 8: 394-401.

40. Inanir A, Yigit S, Tekcan A, Tural S, Kismali G. IL-4 and MTHFR gene polymorphism in rheumatoid arthritis and their effects. Immunol Lett. 2013; 152: 104-108.

41. Inanir A, Yigit S, Tural S, Cecen O, Yildirim E. MTHFR gene C677T mutation and ACE gene I/D polymorphism in Turkish patients with osteoarthritis. Dis Markers. 2013; 34: 17-22.

42. Dong Y, Wu G, Zhu T, Chen H, Zhu Y, Zhu G, et al. VEGF promotes cartilage angiogenesis by phospho-ERK1/2 activation of Dll4 signaling in temporomandibular joint osteoarthritis caused by chronic sleep disturbance in Wistar rats. Oncotarget. 2017; 8: 17849.

43. Yang Q, Guo X-P, Cheng Y-L, Wang Y. MicroRNA-143-5p targeting eEF2 gene mediates intervertebral disc degeneration through the AMPK signaling pathway. Arthritis Res Ther. 2019; 21: 97.

44. Zhou S, Lu W, Chen L, Ge Q, Chen D, Xu Z, et al. AMPK deficiency in chondrocytes accelerated the progression of instability-induced and ageing-associated osteoarthritis in adult mice. Sci Rep. 2017; 7: 43245.

45. Wang L, Shan H, Wang B, Wang N, Zhou Z, Pan C, et al. Puerarin Attenuates Osteoarthritis via Upregulating AMP-Activated Protein Kinase/Proliferator-Activated Receptor-γ Coactivator-1 Signaling Pathway in Osteoarthritis Rats. Pharmacology. 2018. pp. 117-125. doi: 10.1159/000490418

46. Richardson D, Pearson R G, Kurian N, Latif M L, Garle M J, Barrett D A, et al. Characterisation of the cannabinoid receptor system in synovial tissue and fluid in patients with osteoarthritis and rheumatoid arthritis. Arthritis Res Ther. 2008; 10: R43.

47. Meulenbelt I, Bos S D. Faculty of 1000 evaluation for Autophagy is a protective mechanism in normal cartilage, and its aging-related loss is linked with cell death and osteoarthritis. F1000—Post-publication peer review of the biomedical literature. 2010. doi:10.3410/f.2687957.2351056

48. Caramés B, Taniguchi N, Otsuki S, Blanco F J, Lotz M. Autophagy is a protective mechanism in normal cartilage, and its aging-related loss is linked with cell death and osteoarthritis. Arthritis & Rheumatism. 2010. pp. 791-801. doi:10.1002/art.27305

49. Zhang Y, Vasheghani F, Li Y-H, Blati M, Simeone K, Fahmi H, et al. Cartilage-specific deletion of mTOR upregulates autophagy and protects mice from osteoarthritis. Ann Rheum Dis. 2015; 74: 1432-1440.

50. Tornero-Esteban P, Peralta-Sastre A, Herranz E, Rodriguez-Rodriguez L, Mucientes A, Abásolo L, et al. Altered Expression of Wnt Signaling Pathway Components in Osteogenesis of Mesenchymal Stem Cells in Osteoarthritis Patients. PLoS One. 2015; 10: e0137170.

51. Park S, Oh J, Kim Y-I, Choe S-K, Chun C-H, Jin E-J. Suppression of ABCD2 dysregulates lipid metabolism via dysregulation of miR-141:ACSL4 in human osteoarthritis. Cell Biochemistry and Function. 2018. pp. 366-376. doi:10.1002/cbf.3356

52. Chen Q, Liu W, Sinha K M, Yasuda H, de Crombrugghe B. Identification and characterization of microRNAs controlled by the osteoblast-specific transcription factor Osterix. PLoS One. 2013; 8: e58104.

53. Jones S W, Watkins G, Le Good N, Roberts S, Murphy C L, Brockbank S M V, et al. The identification of differentially expressed microRNA in osteoarthritic tissue that modulate the production of TNF-alpha and MMP13. Osteoarthritis Cartilage. 2009; 17: 464-472.

54. Zhang H, Song B, Pan Z. Downregulation of microRNA-9 increases matrix metalloproteinase-13 expression levels and facilitates osteoarthritis onset. Mol Med Rep. 2018; 17: 3708-3714.

55. Zhang Y, Xie R-L, Croce C M, Stein J L, Lian J B, van Wijnen A J, et al. A program of microRNAs controls osteogenic lineage progression by targeting transcription factor Runx2. Proc Natl Acad Sci USA. 2011; 108: 9863-9868.

56. Davidson E, Vitters E L, van Lent P L, van de Loo F A J, van den Berg W B, van der Kraan P M. Elevated extracellular matrix production and degradation upon bone morphogenetic protein-2 (BMP-2) stimulation point toward a role for BMP-2 in cartilage repair and remodeling. Arthritis Research & Therapy. 2007. p. R102. doi:10.1186/ar2305

57. Wang C, Silverman R M, Shen J, O'Keefe R J. Distinct metabolic programs induced by TGF-β1 and BMP2 in human articular chondrocytes with osteoarthritis. J Orthop Translat. 2018; 12: 66-73.

58. Hicks J J, Rocha J L, Li H, Huard J, Wang Y, Hogan M V. Sustained Release of Bone Morphogenetic Protein 2 via Coacervate improves Muscle Derived Stem Cell Mediated Cartilage Regeneration in MIA-induced Osteoarthritis. Orthopaedic Journal of Sports Medicine. 2016. p. 2325967116S0015. doi:10.1177/2325967116s00152

59. Wirth W, Duryea J, Hellio Le Graverand M-P, John M R, Nevitt M, Buck R J, et al. Direct comparison of fixed flexion, radiography and MRI in knee osteoarthritis: responsiveness data from the Osteoarthritis Initiative. Osteoarthritis Cartilage. 2013; 21: 117-125.

60. Eckstein F, Collins J E, Nevitt M C, Lynch J A, Kraus V B, Katz J N, et al. Brief Report: Cartilage Thickness Change as an Imaging Biomarker of Knee Osteoarthritis Progression: Data From the Foundation for the National Institutes of Health Osteoarthritis Biomarkers Consortium. Arthritis Rheumatol. 2015; 67: 3184-3189.

61. Ruhdorfer A, Haniel F, Petersohn T, Dörrenberg J, Wirth W, Dannhauer T, et al. Between-group differences in infra-patellar fat pad size and signal in symptomatic and radiographic progression of knee osteoarthritis vs non-progressive controls and healthy knees—data from the FNIH Biomarkers Consortium Study and the Osteoarthritis Initiative. Osteoarthritis Cartilage. 2017; 25: 1114-1121.
62. Wirth W, Hunter D J, Nevitt M C, Sharma L, Kwoh C K, Ladel C, et al. Predictive and concurrent validity of cartilage thickness change as a marker of knee osteoarthritis progression: data from the Osteoarthritis Initiative. Osteoarthritis Cartilage. 2017; 25: 2063-2071.
63. Kraus V B, McDaniel G, Huebner J L, Stabler T V, Pieper C F, Shipes S W, et al. Direct in vivo evidence of activated macrophages in human osteoarthritis. Osteoarthritis Cartilage. 2016. doi:10.1016/j.joca.2016.04.010
64. Daghestani H N, Pieper C F, Kraus V B. Soluble macrophage biomarkers indicate inflammatory phenotypes in patients with knee osteoarthritis. Arthritis Rheumatol. 2015; 67: 956-965.
65. Zhang L, Xing R, Huang Z, Zhang N, Zhang L, Li X, et al. Inhibition of Synovial Macrophage Pyroptosis Alleviates Synovitis and Fibrosis in Knee Osteoarthritis. Mediators Inflamm. 2019; 2019: 2165918.
66. Kraus V B, Burnett B, Coindreau J, Cottrell S, Eyre D, Gendreau M, et al.
Application of biomarkers in the development of drugs intended for the treatment of osteoarthritis. Osteoarthritis Cartilage. 2011; 19: 515-542.
67. Ornetti P, Brandt K, Hellio-Le Graverand M-P, Hochberg M, Hunter D J, Kloppenburg M, et al. OARSI-OMERACT definition of relevant radiological progression in hip/knee osteoarthritis. Osteoarthritis Cartilage. 2009; 17: 856-863.
68. McGregor K, Bernatsky S, Colmegna I, Hudson M, Pastinen T, Labbe A, et al. An evaluation of methods correcting for cell type heterogeneity in DNA methylation studies. doi:10.1101/032185
69. Krstajic D, Buturovic L J, Leahy D E, Thomas S. Cross-validation pitfalls when selecting and assessing regression and classification models. J Cheminform. 2014; 6: 10.

What is claimed is:
1. A method for treating a human subject with knee osteoarthritis (OA) at increased risk for progression to severe OA within 12-24 months, the method comprising the steps of:
  (a) preparing a subject blood sample, the sample comprising PBMCs from the subject;
  (b) measuring the levels of DNA methylation in the PBMCs of the sample prepared in step (a);
  (c) comparing the DNA methylation levels measured in step (b) to control levels of DNA methylation in PBMCs from a control human subject or a group of control human subjects with knee OA that did not progress to severe OA, wherein the control levels are predetermined standards; and
  (d) detecting DNA methylation levels higher by at least 2 fold in the PBMCs in the subject sample compared to the control levels of DNA methylation at CpG markers comprising cg04195161, cg22064129, cg04985016, cg12692919, cg04043957, cg08872579, cg02019955, cg01333532, cg23705082, cg05042110, cg00715363, cg01307007, and cg09239099, and identifying the subject as being at increased risk for progression to severe knee OA within 12-24 months; and
  (e) administering to the human subject who is identified as being at increased risk for progression to severe OA within 12-24 months in step (d) at least one treatment of OA selected from: acetaminophen, steroids, hyaluronic acid, nonsteroidal anti-inflammatory drugs (NSAIDs), or Duloxetine.
2. The method of claim 1, further comprising the step of preprocessing an array of data by: excluding from analysis CpG probes located on sex chromosomes, probes with known single nucleotide polymorphisms (SNPs) with minor allele frequency of >5%.
3. The method of claim 1, wherein the control human subject (i) is matched to the human subject treated in step (e) by at least one of: age category, sex, BMI category, ethnicity, or a baseline Kellgren-Lawrence (KL) radiographic grade; and (ii) does not have osteoarthritis as determined by both radiographic and symptomatic examination.
4. The method of claim 1, wherein the DNA methylation is determined with an array that identifies DNA methylation levels of cg04195161, cg22064129, cg04985016, cg12692919, cg04043957, cg08872579, cg02019955, cg01333532, cg23705082, cg05042110, cg00715363, cg01307007, and cg09239099.
5. The method of claim 1, wherein the human subject treated in step (e) has a KL score of 1-3 in at least one knee.
6. The method of claim 1, wherein the blood sample prepared from the human subject has been prepared in the presence of heparin.
7. The method of claim 1, wherein the control levels of DNA methylation in PBMCs from a control human subject with knee OA that did not progress to severe OA, is a level of methylation in a blood sample from a control human subject or a mean level of several control human subjects.
8. The method of claim 1, further comprising measuring DNA methylation in a gene selected from: transcription factor PITX2, histone H3, histone H4, miR-141, miR-9, miR-137, bone morphogenic protein 2, and a TGF-3 superfamily member.

* * * * *